(12) United States Patent
Yuki et al.

(10) Patent No.: US 11,907,518 B2
(45) Date of Patent: Feb. 20, 2024

(54) COOKING RECIPE DISPLAY SYSTEM, INFORMATION TERMINAL, COOKING RECIPE DISPLAY METHOD, AND PROGRAM

(71) Applicant: Panasonic Intellectual Property Management Co., Ltd., Osaka (JP)

(72) Inventors: Yasuhiro Yuki, Kanagawa (JP); Yuki Taoka, Kyoto (JP); Taiki Terada, Shiga (JP); Emi Akutsu, Nara (JP); Sumiko Tanaka, Kyoto (JP); Hiroki Yamada, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 17/758,578

(22) PCT Filed: Feb. 25, 2021

(86) PCT No.: PCT/JP2021/007132
§ 371 (c)(1),
(2) Date: Jul. 10, 2022

(87) PCT Pub. No.: WO2021/172438
PCT Pub. Date: Sep. 2, 2021

(65) Prior Publication Data
US 2023/0066514 A1    Mar. 2, 2023

(30) Foreign Application Priority Data
Feb. 27, 2020 (JP) .................................. 2020-031169

(51) Int. Cl.
*G06F 3/048* (2013.01)
*G06F 3/04847* (2022.01)
*G06F 3/04817* (2022.01)

(52) U.S. Cl.
CPC ...... *G06F 3/04847* (2013.01); *G06F 3/04817* (2013.01)

(58) Field of Classification Search
None
See application file for complete search history.

(56) References Cited

U.S. PATENT DOCUMENTS

2004/0078759 A1* 4/2004 Ohashi .................. G06F 40/186
715/248
2018/0121848 A1* 5/2018 Kito ........................ G06Q 50/12

FOREIGN PATENT DOCUMENTS

EP       1041860 A2 * 10/2000 ............. H05B 6/688
JP       2004-118353         4/2004
(Continued)

OTHER PUBLICATIONS

International Search Report of PCT application No. PCT/JP2021/007132 dated Jun. 1, 2021.

*Primary Examiner* — Tuan S Nguyen
(74) *Attorney, Agent, or Firm* — Rimon P.C.

(57) ABSTRACT

A cooking-recipe display system (51) according to one aspect of the present disclosure includes, an information terminal (200) having a display screen and a controller (210), a data management part (110), and a determination part (120). The data management part (110) includes a recipe group master containing a plurality of cooking recipes, each of which contains both a plurality of procedures indicating a way of cooking a dish and a plurality of ingredients of the dish. The determination part (120) determines an allocation display format indicating an arrangement, on the display screen, of the plurality of procedures contained one cooking recipe selected from the plurality of cooking recipes. The controller (210) causes the cooking recipe to be displayed on the display screen in the allocation display format.

23 Claims, 49 Drawing Sheets

(56) References Cited

FOREIGN PATENT DOCUMENTS

| | | |
|---|---|---|
| JP | 2015-201210 | 11/2015 |
| JP | 2018-073383 | 5/2018 |
| JP | 2019-204337 | 11/2019 |

* cited by examiner

FIG. 3

[Recipe group master]

| Recipe ID | Recipe name | Advertising copy | Quantity | Classification |
|---|---|---|---|---|
| R001 | Gyoza with lattice | Crispy finish | 2-servings/4-servings | Main dish |
| R002 | Pumpkin gratin | Warm dish coloring dining table | 2-servings/4-servings | Main dish |
| R003 | Avocado salad | Easy& power charge | 2-servings/4-servings | Side dish |
| ... | ... | ... | ... | ... |

[Ingredient table (R001: gyoza with lattice: 2-servings)]

111a

| Group | Ingredient ID | Ingredient name | State | Quantity | Another name |
|---|---|---|---|---|---|
| - | 323 | Gyoza wrapper | | 12 sheets | |
| Filling | 22 | Ground pork | | 150g | Ground meat, minced meat |
| Filling | 233 | Cabbage | Finely chopped | 40g | Kyabetsu |
| Filling | 124 | White spring onion | Finely chopped | 10g | White green onion, white onion |
| Filling | 53 | Chinese chive | Finely chopped | 10g | Nira chive |
| Seasoning A | 43 | Water | | 150ml | |
| Seasoning A | 210 | Flour | | 1/2 tbsp | |
| Seasoning A | 56 | Vinegar | | 1 tbsp | |
| Seasoning A | 80 | Soy sauce | | 1 tbsp | shoyu |
| Seasoning B | 55 | Starch | | 1 tsp | |
| Seasoning B | 43 | Water | | 2 tbsp | |
| - | 69 | Oil | | 2 tsp | |

FIG. 5

[Procedure table (procedures 1 to 5)]

111b

| Procedure | 1 | 2 | 3 | 4 | 5 |
|---|---|---|---|---|---|
| Work content | Chop cabbage, Chinese chive, and green spring onion finely. Put 150 ml water and 1/2 tbsp flour in another bowl. Add 1 tbsp each of vinegar and soy sauce. | Put ground meat in a bowl, add seasoning, and mix them well. when becomes sticky, add cabbage, chinese chive, and green spring onion, and mix them. | Not wrap filling soon, but cover it with plastic wrap and let rest in fridge for about 1 hour. | Place 1/12 quantity of filling on the center of gyoza wrapper. put water along the rim of wrapper. fold it in half while gathering pleats to wrap filling. | Put oil (2 tsp) into A frying pan. warm it over medium heat for about 30 seconds. |
| Number of characters | 55 | 54 | 31 | 48 | 29 |
| Illustration | 001.jpg | 002.jpg | 003.jpg | 004.jpg | 005.jpg |
| Classification | Preparation | Preparation | Preparation | Finish | Finish |
| Work time | 15:00 | 4:00 | 1:00 | 4:00 | 0:20 |
| Standby time | | | (60:00) | | |
| Appliance cooperation Tip calling | | | Tip: let rest Fridge: transmit temperature | | IH cooking heater: transmit setting |
| Ingredient | Cabbage, chinese chive, green spring onion, water, flour, vinegar, and soy sauce | Ground pork, seasoning A, cabbage, chinese chive, and green spring onion | | Gyoza wrapper | Oil |

FIG. 6

[Procedure table (procedures 6 to 10)]  111b

| Procedure | 6 | 7 | 8 | 9 | 10 |
|---|---|---|---|---|---|
| Work content | Chop cabbage, chinese chive, and green spring onion finely. put 150 ml water and 1/2 tbsp flour in another bowl. add 1 tbsp each of vinegar and soy sauce. | Put ground meat in a bowl, add seasoning, and mix them well. when becomes sticky, add cabbage, chinese chive, and green spring onion, and mix them. | Not wrap filling soon, but cover it with plastic wrap and let rest in fridge for about 1 hour. | Place 1/12 quantity of filling on the center of gyoza wrapper. put water along the rim of wrapper. fold it in half while gathering pleats to wrap filling. | Put oil (2 tsp) into a frying pan. warm it over medium heat for about 30 seconds. |
| Number of characters | 53 | 36 | 20 | 24 | 17 |
| Illustration | 006.jpg | 007.jpg | 008.jpg | 009.jpg | 010.jpg |
| Classification | Finish | Finish | Finish | Finish | Finish |
| Work time | 0:20 | 1:00 | 2:30 | 1:30 | 0:20 |
| Standby time | | | | | |
| Appliance cooperation Tip calling | | Check tip Tip: pour while turning | Start timer 2:00 | Check tip Tip: why high heat? | |
| Ingredient | (Gyoza) | Starch, water | | | |

[Pattern A]

(a) Display screen 221

(b) Display restriction table

| Area | Number of lines | Number of characters /line | Number of characters | Total sum | illustration |
|---|---|---|---|---|---|
| Ingredient | 20 | 20 | 400 | - | - |
| Procedure 1 | 4 | 15 | 60 | 100 | 1 |
| Procedure 2 | 4 | 15 | 60 | | 1 |
| ... | ... | ... | ... | ... | ... |

FIG. 8

[Pattern A] (when the number of characters reaches upper limit)

(a) Display screen 221

(b) Display restriction table

| Area | Number of lines | Number of characters /line | Number of characters | Total sum | Illustration |
|---|---|---|---|---|---|
| Ingredient | 20 | 20 | 400 | - | - |
| Procedure 1 | 3 | 30 | 90 | 90 | 3 |
| ... | ... | ... | ... | ... | ... |

FIG. 10

Crispy finish! gyoza with lattice    X-san

| Ingredient | Gyoza wrapper | 12 sheets |
|---|---|---|
| | Ground pork | 150g |
| | Cabbage | 40g |
| | White spring onion | 10g |
| | Chinese chive | 10g |
| Seasoning A | Water | 150ml |
| | Flour | 1/2 tbsp |
| | Vinegar | 1 tbsp |
| | Soy sauce | 1 tbsp |
| Seasoning B | Starch | 1 tsp |
| | Water | 3 tbsp |
| | Oil | 2 tsp |

Procedure 1
Chop cabbage, chinese chive, and green spring onion finely. put 150 ml water and 1/2 tbsp flour in another bowl. add 1 tbsp each of vinegar and soy sauce.

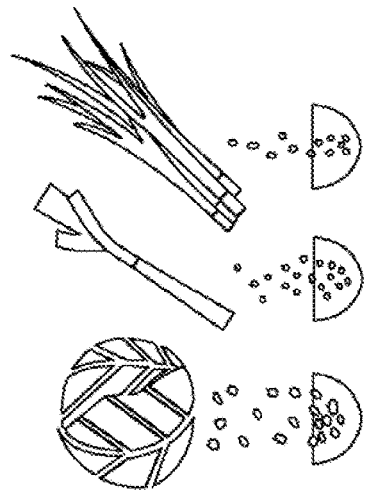

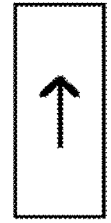
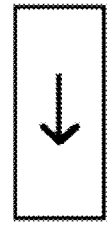

Return to top

221

[Pattern B] (when the number of appliance cooperation reaches upper limit)

(a) Display screen 221

(b) Display restriction table

| Area | Number of lines | Number of characters /line | Number of characters | Illustration | Cooperation |
|---|---|---|---|---|---|
| procedure 1 | 3 | 30 | 90 | 1 | Upper limit 2 |
| procedure 2 | 3 | 30 | 90 | 1 | |
| ... | ... | ... | ... | ... | ... |

FIG. 21

[Pattern A] (display example)

(a1) Display screen (Ingredient display) 221

Crispy finish! Gyoza with lattice — X-san

[Procedure] [←] [→]

| | Ingredient | | |
|---|---|---|---|
| | | Gyoza wrapper | 12 sheets |
| Ingredient | | Ground pork | 150g |
| | | Cabbage | 40g |
| | | White spring onion | 10g |
| | | Chinese chive | 10g |
| Seasoning A | | Water | 150ml |
| | | Flour | 1/2 tbsp |
| | | Vinegar | 1 tbsp |
| | | Soy sauce | 1 tbsp |
| Seasoning B | | Starch | 1 tsp |
| | | Water | 3 tbsp |
| | | Oil | 2 tsp |

Return to top (a2) Display screen (Procedure display) 221

Crispy finish! Gyoza with lattice — X-san

[Ingredient] [←] [→]

1. Chop cabbage, chinese chive, and green spring onion finely. put 150 ml water and 1/2 tbsp flour in another bowl. add 1 tbsp each of vinegar and soy sauce.

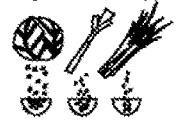

2. Put ground meat in a bowl, add seasoning, and mix them well. when becomes sticky, add cabbage, chinese chive, and green spring onion, and mix them.

Return to top

FIG. 22
[Pattern B]
(a1) Display screen (Ingredient display)    221
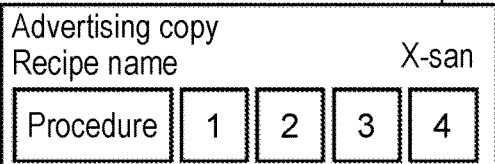
(a2) Display screen (Procedure display)    221
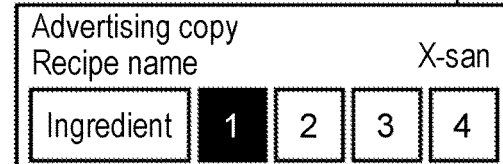
(b) Display restriction table
| Area | Number of lines | Number of characters /line | Number of characters | Illustration | cooperation |
|---|---|---|---|---|---|
| Procedure 1 | 5 | 12 | 60 | 1 | upper limit 2 |
| Procedure 2 | 5 | 12 | 60 | 1 | |
| ... | ... | ... | ... | ... | ... |

FIG. 23

[Pattern B] (display example)

(a1) Display screen (Ingredient display)     221

Crispy finish!
Gyoza with lattice    X-san

| Procedure | 1 | 2 | 3 | 4 |

Ingredient:
- Gyoza wrapper — 12 sheets
- Ground pork — 150g
- Cabbage — 40g
- White spring onion — 10g
- Chinese chive — 10g Seasoning A:
- Water — 150ml
- Flour — 1/2 tbsp
- Vinegar — 1 tbsp
- Soy sauce — 1 tbsp Seasoning B:
- Starch — 1 tsp
- Water — 3 tbsp Oil — 2 tsp ( Return to top )

(a2) Display screen (Ingredient display)     221

Crispy finish!
Gyoza with lattice    X-san

| Ingredient | 1 | 2 | 3 | 4 |

1. Chop cabbage, chinese chive, and green spring onion finely. put 150 ml water and 1/2 tbsp flour in another bowl. add 1 tbsp each of vinegar and soy sauce.

2. Put ground meat in a bowl, add seasoning, and mix them well. when becomes sticky, add cabbage, chinese chive, and green spring onion, and mix them.

( Return to top )

FIG. 39

Crispy finish! gyoza with lattice                    X-san

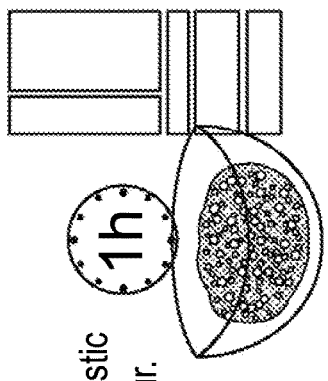
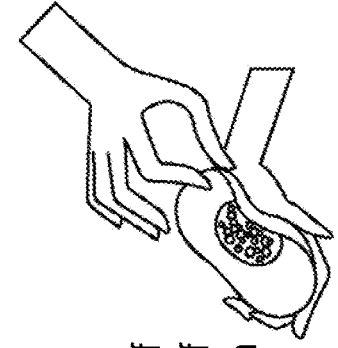
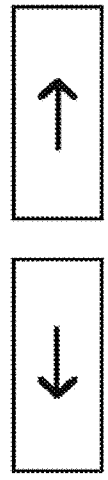

Procedure 3

Not wrap filling soon, but cover it with plastic wrap and let rest in fridge for about 1 hour.

Procedure 4

Place 1/12 quantity of filling on the center of gyoza wrapper. put water along the rim of wrapper. wrap filling by folding wrapper in half while gathering pleats.

| Ingredient | Gyoza wrapper | 12 sheets |
| | Ground pork | 150g |
| | Cabbage | 40g |
| | White spring onion | 10g |
| | Chinese chive | 10g |
| Seasoning A | Water | 150ml |
| | Flour | 1/2 tbsp |
| | Vinegar | 1 tbsp |
| | Soy sauce | 1 tbsp |
| Seasoning B | Starch | 1 tsp |
| | Water | 3 tbsp |
| | Oil | 2 tsp |

Return to top

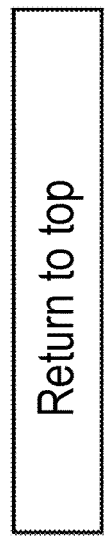

FIG. 41

| User ID | Portrait/landscape display mode | Smartphone allocation display format | Tablet allocation display format | Smart display allocation display format |
|---|---|---|---|---|
| User A | Portrait | Pattern B | - | - |
| | Landscape | Pattern B | Pattern B | Pattern B |
| User B | Portrait | Pattern D | - | - |
| | Landscape | Pattern A | Pattern A | Pattern B |
| User C | Portrait | Pattern C | - | - |
| | Landscape | Pattern B | Pattern A | Pattern A |
| ... | ... | ... | ... | ... |

FIG. 44
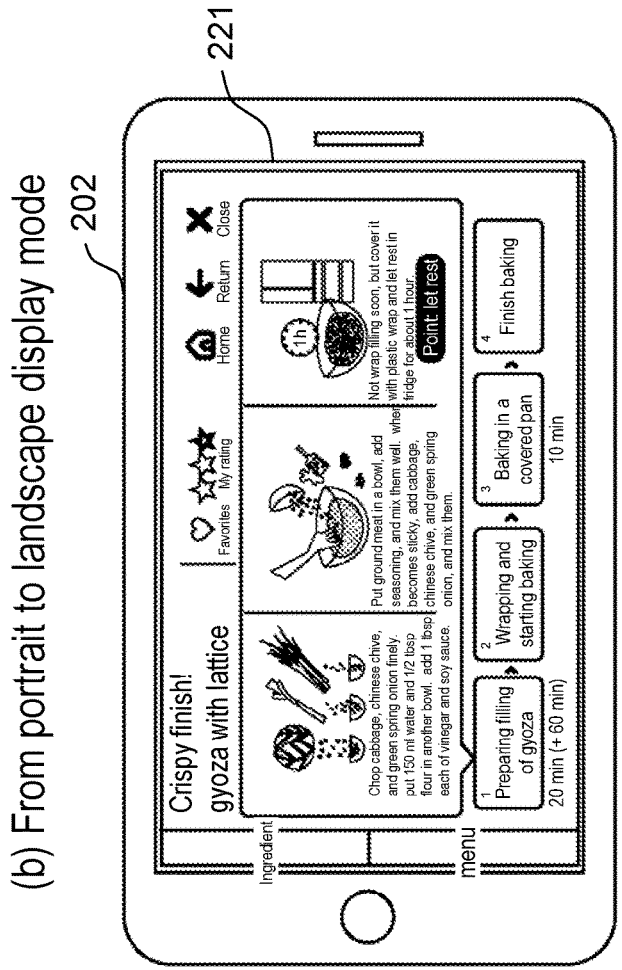
(b) From portrait to landscape display mode
Landscape display mode (pattern B)
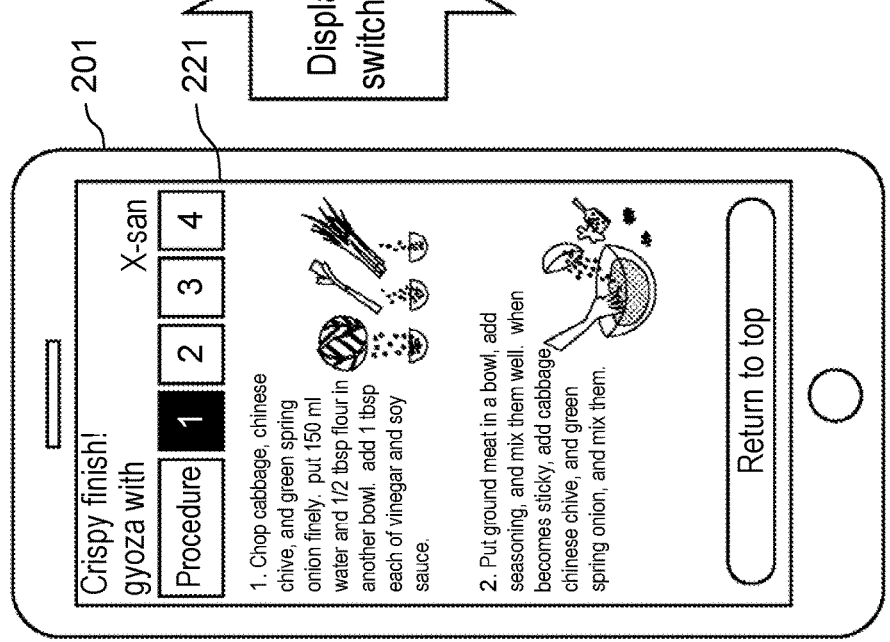
(a) View during moving
Portrait display mode (pattern B)

FIG. 45
(a) View during moving
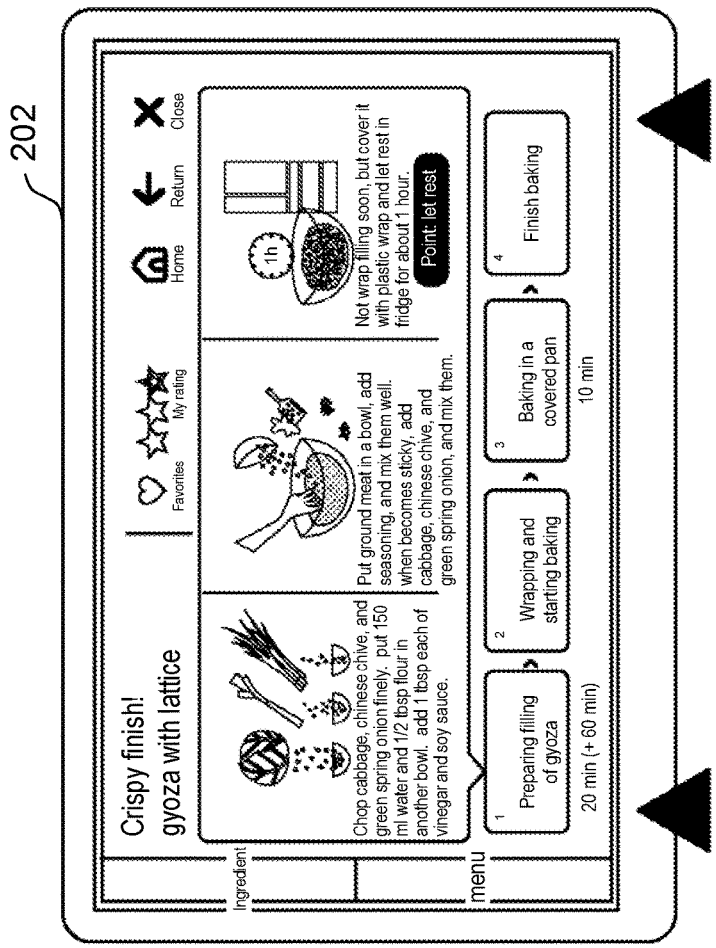
Portrait display mode (pattern B)
(b) View with second information terminal 202 after return home
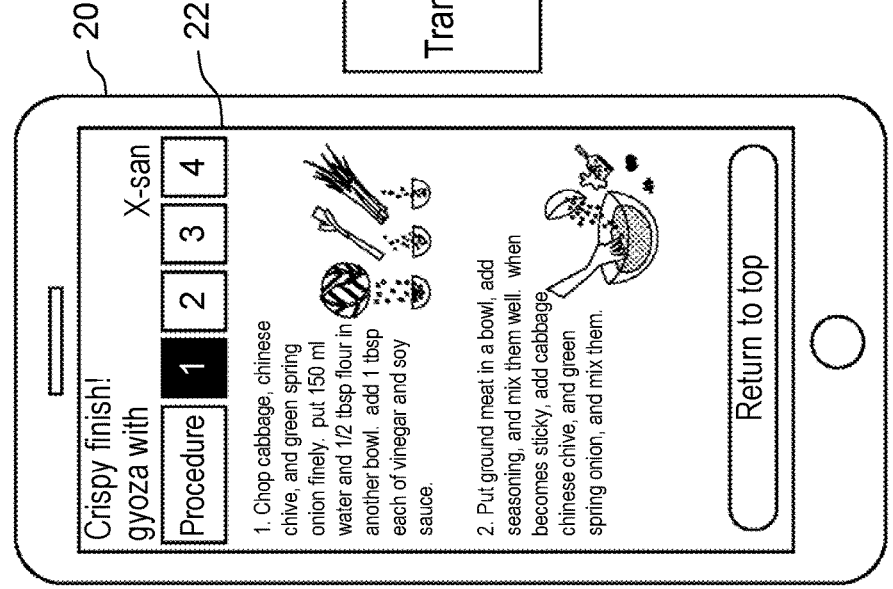
Landscape display mode (pattern B)

FIG. 47

COOKING RECIPE DISPLAY SYSTEM, INFORMATION TERMINAL, COOKING RECIPE DISPLAY METHOD, AND PROGRAM

TECHNICAL FIELD

The present disclosure relates to cooking-recipe display systems.

BACKGROUND ART

In recent years, a cooking-recipe display system has been introduced which displays cooking recipes on an information terminal such as a smartphone or a tablet terminal. With this system, a user can search the Internet for sites providing cooking recipes and download cooking recipes from the sites.

Patent Literature 1 discloses a cooking-recipe display system that classifies a plurality of cooking processes in a cooking recipe into preparation processes and finish processes, and then displays them separately on a classification basis.

CITATION LIST

Patent Literature

PTL 1: Japanese Patent Unexamined Publication No. 2018-73383

SUMMARY OF THE INVENTION

A cooking recipe contains an ingredient list indicating the ingredients of a dish, a plurality of procedures (cooking procedures) showing a way of cooking the dish, and images for evoking associations of the dish. A small-size information terminal such as a smartphone or tablet terminal is such that its display screen is small. When such a display screen is used to display the cooking recipe, only part of the cooking recipe can be displayed on it.

Therefore, in order to see the cooking recipe with the small-size information terminal, it is necessary to scroll the display screen on which part of the cooking recipe is displayed. In this case, it is not easy for a user to recognize what part of the cooking recipe the user is seeing.

With the technology disclosed in PTL 1, the character string explaining the procedures of a cooking recipe is so long that it requires scrolling operations.

Reducing the size of characters of the character string explaining the cooking procedures permits the whole of the cooking recipe to be display on the display screen. In this case, in order to confirm the content of the cooking procedures, the image of the cooking recipe needs to be enlarged. That is, an operation for enlarging the screen such as, for example, pinching-out operation of the display screen with fingers is necessary. However, the hands of the user being cooking are often so dirty that it is desirable not to operate the information terminal with the hands during cooking.

An object of the present disclosure is to provide a cooking-recipe display system capable of displaying a cooking recipe on a display screen in an easy-to-see manner without scrolling so much.

A first aspect of the present disclosure provides a cooking-recipe display system. The cooking-recipe display system according to the aspect includes, an information terminal having a display screen and a controller, a data management part, and a determination part. The data management part includes a recipe group master containing a plurality of cooking recipes, each of which contains both a plurality of procedures indicating a way of cooking a dish and a plurality of ingredients of the dish. The determination part determines an allocation display format indicating an arrangement, on the display screen, of the plurality of procedures contained one cooking recipe selected from the plurality of cooking recipes. The controller causes the cooking recipe to be displayed on the display screen in the allocation display format.

A second aspect of the present disclosure provides an information terminal. The information terminal according to the aspect includes a display screen, a determination part, and a controller. The determination part determines an allocation display format indicating an arrangement, on the display screen, of a plurality of procedures contained in one cooking recipe that is selected from a plurality of cooking recipes each of which contains both a plurality of procedures indicating a way of cooking a dish and a plurality of ingredients of the dish. The controller causes the one cooking recipe to be displayed on the display screen in the allocation display format.

A third aspect of the present disclosure provides a method of displaying a cooking method. The method of indicating a cooking method according to the aspect includes a step of determining an allocation display format indicating an arrangement, on a display screen, of a plurality of procedures contained in one cooking recipe, in which the one cooking recipe is selected from a plurality of cooking recipes each of which contains both a plurality of procedures indicating a way of cooking a dish and a plurality of ingredients of the dish. The method includes a step of causing the one cooking recipe to be displayed on the display screen of an information terminal in the allocation display format.

A fourth aspect of the present disclosure provides a program configured to cause a computer to execute the above-described method of displaying a cooking recipe.

In accordance with the present disclosure, a cooking recipe can be displayed on a display screen in an easy-to-see manner without scrolling operations so much.

BRIEF DESCRIPTION OF DRAWINGS

FIG. 3 is a diagram showing one example of a master database according to the first embodiment.

FIG. 4 is a table illustrating one example of an ingredient table.

FIG. 5 is a table illustrating one example of a procedure table (Procedure 1 to Procedure 5).

FIG. 6 is a table illustrating one example of a procedure table (Procedure 6 to Procedure 10).

FIG. 8 is a diagram illustrating one example of a screen of a cooking recipe displayed on a display screen in accordance with the allocation display format of Pattern A shown in FIG. 7.

FIG. 10 is a diagram illustrating one example of a screen of a cooking recipe displayed on a display screen in accordance with the allocation display format of Pattern A shown in FIG. 9.

FIG. 21 is a diagram illustrating one example of screens of a cooking recipe displayed on the display screen in accordance with the allocation display format of Pattern A shown in FIG. 20.

FIG. 22 is a diagram illustrating an allocation display format of Pattern B in portrait mode.

FIG. 23 is a diagram illustrating one example of screens of a cooking recipe displayed on the display screen in accordance with the allocation display format of Pattern B shown in FIG. 22.

FIG. 39 is a diagram illustrating a second specific example for illustrating the cooking-recipe display system according to the modified example of the first embodiment.

FIG. 41 is a diagram illustrating one example of a display cooperation table according to the second embodiment.

FIG. 44 is a diagram illustrating a specific example of the display-mode switching in an information terminal according to the second embodiment.

FIG. 45 is a diagram illustrating a specific example of the display-mode switching among the plurality of information terminals according to the second embodiment.

FIG. 47 is a diagram illustrating a first specific example of a display screen of an information terminal according to the third embodiment.

DESCRIPTION OF EMBODIMENTS

Hereinafter, exemplary embodiments of the present disclosure will be described. The embodiments described below are specific examples of the present disclosure. Numerical values, constituent elements, arrangement or connection manners of the constituent elements, steps, orders of the steps, and so forth that are described in the following embodiments are merely examples.

First Exemplary Embodiment

[Cooking-Recipe Display System]

Figure 1:
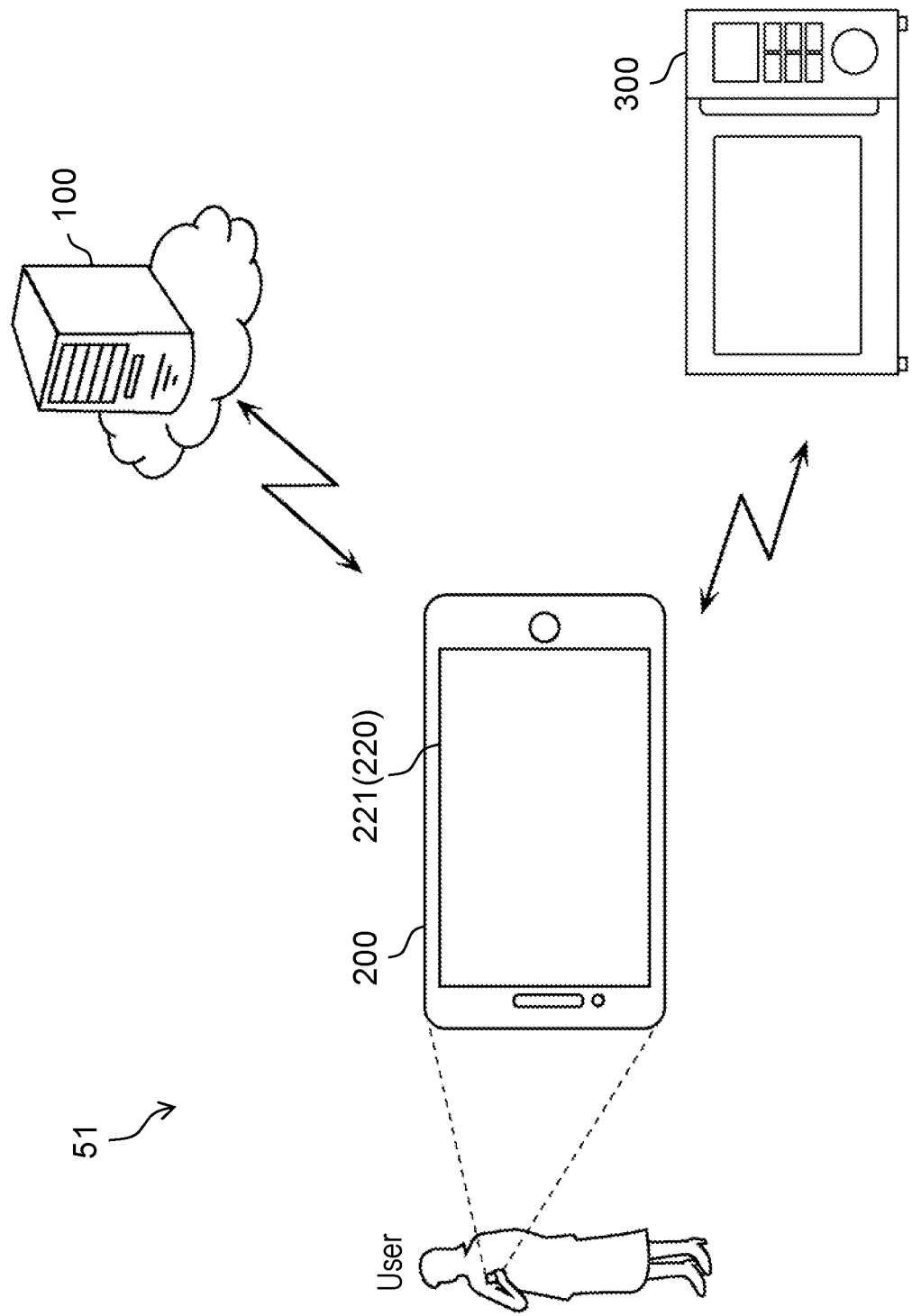
FIG. 1 is a schematic diagram illustrating a cooking-recipe display system according to a first embodiment.
Figure 2:
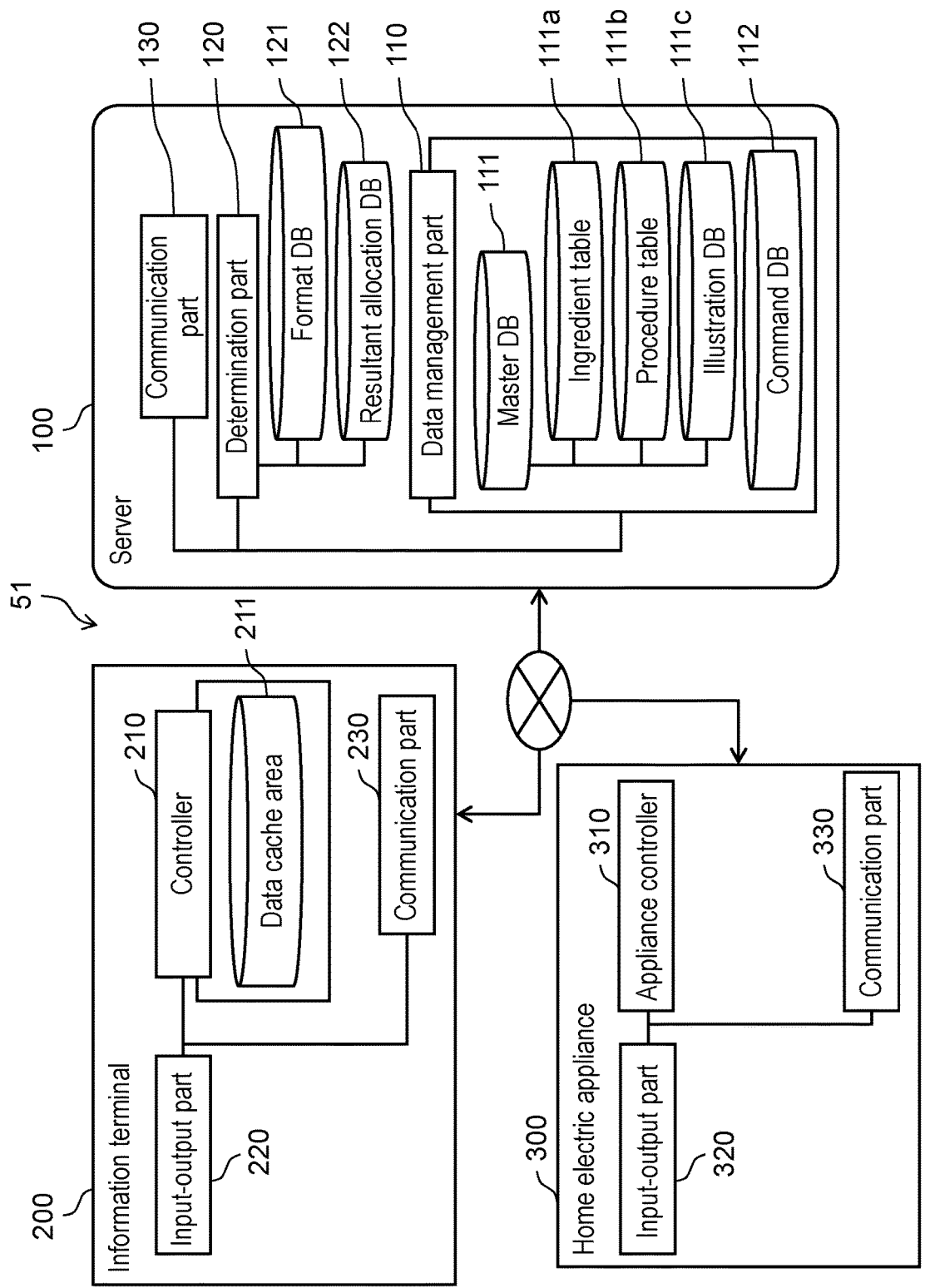
FIG. 2 is a block diagram illustrating a configuration of the cooking-recipe display system according to the first embodiment.

An overall configuration of cooking-recipe display system 51 according to a first exemplary embodiment of the present disclosure will be described with reference to FIGS. 1 and 2. FIG. 1 is a schematic diagram illustrating cooking-recipe display system 51. FIG. 2 is a block diagram illustrating a configuration of cooking-recipe display system 51.

As shown in FIGS. 1 and 2, cooking-recipe display system 51 includes server 100, information terminal 200, and home electric appliance 300. Server 100 is a web server. Server 100, information terminal 200, and home electric appliance 300 are connected to each other via a network such as the Internet.

Server 100 is a recipe-providing server that provides cooking recipes. Server 100 may be any of a cloud server and a physical server. Server 100 may be such that it not only provides cooking recipes but also generates or manages cooking recipes.

As shown in FIG. 2, server 100 includes data management part 110, determination part 120, and communication part 130.

Data management part 110 manages master database 111 and command database 112. For simplicity, the database is abbreviated as DB in the drawings.

Master database 111 contains a plurality of cooking recipes as recipe group masters. Master database 111 contains a plurality of recipe group masters for each of the cooking recipes. In master database 111, the recipe group master of a new cooking recipe may be additionally registered and the recipe group master of an old cooking recipe may be deleted. The recipe group masters regarding cooking recipes contained in master database 111 are updated as necessary. Updating of the recipe group masters is usually performed by a system administrator who manages server 100; however, a user of cooking-recipe display system 51 may perform such an update.

FIG. 3 shows one example of master database 111. As shown in FIG. 3, each of the plurality of cooking recipes, which is contained in master database 111 as recipe-group master data, contains information regarding "recipe ID," "recipe name," "advertising copy," "quantity," and "classification."

In the recipe group master, "recipe ID" indicates the management ID (identifier) of a cooking recipe. "Recipe name" indicates the name of a cooking recipe. "Advertising copy" indicates the summary statement of features of a dish. "Quantity" indicates the amount of the dish that is cooked in accordance with the cooking recipe. "Classification" indicates whether the dish described in the cooking recipe is a main or side dish.

Each of the cooking recipes includes an ingredient list that indicates the ingredients of a dish, and a plurality of procedures (cooking procedures) that indicates a way of cooking the dish. The ingredient list and each of the plurality of procedures contain recipe terms. Such recipe terms contained in the procedures expressed by natural language sentences can be extracted by natural language processing. The cooking recipe may contain an image (e.g., illustration) that evokes associations of dishes. The ingredients of a dish contain not only food materials but also seasoning, water, etc.

Master database 111 has procedure table 111*b* and illustration database 111*c*. They are tables that contain data indicating a cooking recipe.

Ingredient table 111*a* contains information regarding the ingredients of a dish for each of the cooking recipes. Specifically, ingredient table 111*a* contains data of ingredients that constitute the ingredient list indicating the ingredients of the dish. FIG. 4 shows one example of ingredient table 111*a* regarding "Gyoza with Lattice: 2-servings" shown in FIG. 3.

As shown in FIG. 4, the data of ingredients contained in ingredient table 111*a* are information regarding "group," "ingredient ID," "ingredient name," "state," "quantity," and "another name."

In ingredient table 111*a*, "group" indicates the ingredient itself (food material, seasoning, etc.) of a dish or the intermediate ingredient produced from a plurality of ingredients in a cooking process. "Ingredient ID" indicates the management ID of an ingredient. "Ingredient name" indicates the name of an ingredient. "State" indicates the state of an ingredient in a cooking process. "Quantity" indicates the quantity of an ingredient. "Another name" indicates another name of the ingredient or the name of another ingredient usable as a substitute for the ingredient.

Procedure table 111*b* contains a plurality of procedures for each of the cooking recipes. Specifically, procedure table 111*b* contains procedure data that constitute a plurality of procedures (cooking procedures), as procedures for a dish, which indicates a way of cooking the dish. The order of the plurality of procedures is indicated by numerals or the like. A user can cook a desired dish by using ingredients indicated in ingredient table 111*a* and cooking them according to the order of the plurality of procedures indicated in procedure table 111*b*.

FIGS. 5 and 6 are tables illustrating one example of procedure table 111*b* regarding "Gyoza with Lattice: 2-servings" shown in FIG. 3. Procedure table 111*b* shown in FIGS. 5 and 6 contains procedures (cooking processes), Procedures 1 to 10. Procedures 1 to 5 are illustrated in FIG. 5; procedures 6 to 10 are illustrated in FIG. 6.

As shown in FIGS. 5 and 6, the procedure data contained in procedure table 111*b* are information regarding "work content," "number of characters," "illustration," "classification," "work time," "standby time," "appliance cooperation/tip calling," and "ingredient." These pieces of information are displayed for each procedure.

In procedure table 111*b*, "work content" indicates the content of work in this procedure. "Number of characters" indicates the number of characters used in the natural language sentence that expresses the "work content." "Illustration" indicates the name of the file corresponding to an image that will evoke associations with the content of work of this procedure. "Classification" indicates kind of this procedure (cooking process) in one cooking recipe. "Work time" indicates the time required for work in accordance with this procedure. "Standby time" indicates the time required during a standby, when performed, without working after or in the middle of this procedure. "Appliance cooperation/tip calling" indicates either information regarding the cooperation, when performed, with an appliance cooperation system in this procedure information regarding a tip of working in this procedure. "Ingredient" indicates the ingredients used in this procedure.

Each of the plurality of procedures contained in procedure table 111*b* contains character strings. As shown in FIGS. 5 and 6, in each of the plurality of procedures contained in procedure table 111*b*, each of the items, i.e., "work content,"

"classification," "work time," "standby time," "appliance cooperation/tip calling," and "ingredient," is described by a character string.

Illustration database 111c contains data files of illustrations that will evoke associations with the content of work of each of the plurality of procedure in each cooking recipe. The file name of an illustration contained in illustration database 111c corresponds to the file name of the corresponding "illustration" in procedure table 111b. Illustration database 111c may contain the data file of an illustration that will evoke associations with a dish cooked in accordance with the cooking recipe.

Command database 112 contains data for use in transmitting a command to the appliance cooperation system. As shown in FIGS. 1 and 2, the appliance cooperation system is a system that is composed of home electric appliance 300 and both or one of server 100 and information terminal 200. Command database 112 transmits, to home electric appliance 300, a command that causes home electric appliance 300 to perform the work of procedure in accordance with a cooking recipe.

Determination part 120 determines an allocation display format that indicates the arrangement, on the display screen of information terminal 200, of the plurality of procedures in a cooking recipe managed by data management part 110. On the display screen of information terminal 200, the content of the cooking recipe is displayed in accordance with the allocation display format determined by determination part 120.

Specifically, determination part 120 manages format database 121 and resultant allocation database 122.

Format database 121 contains at least one set of data that contains the allocation display format determined by determination part 120. In the present embodiment, format database 121 contains data of a plurality of allocation display formats. Each of the allocation display formats specifies a display restriction table that contains display restriction information (display rule) for restricting an expression displayed on display screen 221 of information terminal 200, with the expression concerning each of the plurality of procedures. The display restriction information is, such as, the number of characters that is specified in advance in the display restriction table. Specific descriptions of the content of the allocation display format will be made later, together with the display restriction table that contains the display restriction information.

Resultant allocation database 122 contains the resultant allocation data generated by determination part 120 in accordance with a predetermined display restriction rule. Resultant allocation database 122 may contain, as resultant allocation data, the result of the allocation display format that is determined by determination part 120.

Communication part 130 communicates with the outside via a network. Communication part 130 is a communication adapter capable of communicating with an external device or an external system. Specifically, communication part 130 can communicate with information terminal 200 or home electric appliance 300.

The communication system adopted in communication part 130 is one that includes a WAN (wide area network), a LAN (local area network), power line communications, infrared communications, short-range radio communications (e.g., Bluetooth [registered trademark]), and mobile communications for mobile phones.

Information terminal 200 is described. Information terminal 200 is an electronic device having a display screen. Information terminal 200 is a portable information-processing device such as a smartphone, tablet terminal, portable television receiver, or notebook personal computer. Information terminal 200 may also be stationary information-processing device such as a desktop personal computer, smart display, or signage.

In the present embodiment, information terminal 200 is, as shown in FIG. 1, a smartphone that includes input-output part 220 including display screen 221.

Information terminal 200 has a network connection function. As shown in FIG. 1, a user can access server 100 by operating information terminal 200. The user can search for dishes, select one cooking recipe from among a plurality of cooking recipes, and cause this one cooking recipe to be displayed on display screen 221 of information terminal 200.

As shown in FIG. 2, information terminal 200 includes controller 210, input-output part 220, and communication part 230.

Controller 210 controls information terminal 200. Controller 210 controls input-output part 220 and communication part 230, thereby causing information terminal 200 to execute various functions. Specifically, controller 210 is a control circuit that includes a storage part, a processor, and various input-output ports. Controller 210 performs various types of control by causing the processor to execute programs such as an application program (hereinafter, referred to as app) stored in the storage part. The processor is composed of an MPU (micro processing unit), a CPU (central processing unit), a DSP (digital signal processor), a GPU (graphical processing unit), an SOC (system on a chip), or the like.

In the present embodiment, controller 210 causes a cooking recipe to be displayed on display screen 221 of input-output part 220 in an allocation display format determined by determination part 120 of server 100. Specifically, controller 210 causes the cooking recipe to be displayed on display screen 221 in the allocation display format, according to the resultant allocation data generated by determination part 120.

Controller 210 has data cache area 211. Data cache area 211 is used as, for example, working memory of controller 210. Controller 210 executes, in response to instructions from the user, desired processing while accumulating information needed for the processing in data cache area 211.

Input-output part 220 is a user interface. Input-output part 220 functions as both an input part for receiving an input and the like from a user and an output part for outputting a result of processing by controller 210. In the present embodiment, input-output part 220 includes display screen 221 composed of a display device such as a liquid crystal display or an organic EL (electroluminescence) display.

In the case where information terminal 200 is a smartphone, display screen 221 is composed of one touch panel. On display screen 221, a GUI (graphical user interface) suitable for touch operations by the user is displayed.

Input-output part 220 may further include a voice input-output device, i.e., a microphone and a loudspeaker, in addition to the display device. In the present embodiment, input-output part 220 is used which functions as both an input part and an output part. However, input-output part 220 may include the input and output parts as separate devices.

Communication part 230 communicates with the outside via a network. Communication part 230 is a communication adapter capable of communicating with an external device including server 100 or an external system. Specifically, communication part 230 can communicate with server 100 and home electric appliance 300.

The communication system adopted in communication part 230 is one that includes a WAN, a LAN, power line communications, infrared communications, short-range radio communications (e.g., Bluetooth [registered trademark]), and mobile communications for mobile phones.

Information terminal 200 may separately include a storage part that stores various data. The storage part may store cooking recipes downloaded from server 100. The storage part includes a primary storage device such as a RAM (random access memory) and a ROM (read only memory). The storage part may include a secondary storage device such as an HDD (hard disc drive) and an SSD (solid state drive) and a tertiary storage device such as an optical disc and an SD card. The storage part may be any of a non-volatile memory and a volatile memory.

Home electric appliance 300 is described. Home electric appliance 300 is a home electric appliance used in a kitchen. The home electric appliance includes a microwave oven, an IH (induction heating) cooking heater, and a refrigerator.

Home electric appliance 300 has a network connection function. Consequently, home electric appliance 300 receives a command from either server 100 or information terminal 200 via a network, and performs processing in accordance with the command.

As shown in FIG. 2, home electric appliance 300 includes appliance controller 310, input-output part 320, and communication part 330.

Appliance controller 310 controls home electric appliance 300. Appliance controller 310 controls input-output part 320 and communication part 330, thereby causing home electric appliance 300 to execute various functions. Specifically, appliance controller 310 is a control circuit that includes a storage part, a processor, and various input-output ports. Appliance controller 310 performs various types of control by causing the processor to execute programs such as an app stored in the storage part. The processor is composed of an MPU, a CPU, a DSP, a GPU, an SOC, or the like. Appliance controller 310 may have a data cache area as working memory.

Input-output part 320 functions as both an input part for receiving an input from the user and an output part for outputting a result of processing by appliance controller 310. Input-output part 320 may be either a display input-output device such as a touch panel or a voice input-output device such as a microphone. Input-output part 320 integrally includes the input and output parts. However, input-output part 320 may include the input and output parts that are separate constituent elements.

Communication part 330 communicates with the outside via a network. Communication part 330 is a communication adapter capable of communicating with an external device including server 100 or an external system. Specifically, communication part 330 can communicate with server 100 and information terminal 200.

The communication system adopted in communication part 330 is one that includes a WAN, a LAN, power line communications, infrared communications, short-range radio communications (e.g., Bluetooth [registered trademark]), and mobile communications for mobile phones.

In cooking-recipe display system 51, determination part 120 of server 100 determines an allocation display format for a plurality of procedures in a cooking recipe that is managed by data management part 110. The allocation display format indicates an arrangement on display screen 221 of information terminal 200. Controller 210 of information terminal 200 causes the cooking recipe to be displayed on display screen 221 of information terminal 200 in the allocation display format determined by determination part 120.

Controller 210 of information terminal 200 causes the cooking recipe to be displayed on display screen 221 of information terminal 200 in the allocation display format, according to the resultant allocation data generated by determination part 120.

With cooking-recipe display system 51 according to the present embodiment, the cooking recipe is displayed on display screen 221 of information terminal 200 in the allocation display format determined by determination part 120. In accordance with the present embodiment, it is possible to reduce the user's burden by reducing scrolling operations as much as possible, and to allow the easy-to-see display of the cooking recipe on display screen 221.

In the present embodiment, determination part 120 of server 100 refers to a recipe group master contained in master database 111, thereby extracting a plurality of procedures that is contained in one cooking recipe selected from procedure table 111b by the user. Determination part 120 compares the information of each of the plurality of thus-extracted procedures with the display restriction information for the corresponding procedure in the display restriction table. Determination part 120 generates resultant allocation data by determining the arrangement of the plurality of procedures on display screen 221 of information terminal 200 such that the information of each extracted procedure satisfies the conditions specified in the display restriction information.

Specifically, determination part 120 generates the resultant allocation data by determining the arrangement of the plurality of procedures on display screen 221 in accordance with both the information of the number of characters contained in each procedure of the plurality of procedures extracted and the display restriction information regarding the number of characters. That is, the arrangement of the plurality of procedures is determined such that the information of each procedure follows the display restriction information regarding the number of characters.

Like this, determination part 120 may generate resultant allocation data by determining the arrangement of the plurality of procedures on display screen 221 in accordance with both the number of illustrations contained in each procedure of the plurality of procedures extracted and the display restriction information regarding the number of illustrations. That is, the arrangement of the plurality of procedures may be determined such that the information of each procedure satisfies the conditions for the number of illustrations, the conditions which are specified in the display restriction information.

In this way, determination part 120 determines the arrangement of the plurality of procedures on the display screen such that the information of each procedure of the plurality of procedures satisfies the conditions specified in the display restriction information. With this configuration, it is possible to obtain the allocation display format easy to see the cooking recipe even without scrolling operations so much.

Determination part 120 compares the information of each extracted procedure with the display restriction information. Determination part 120 determines the arrangement of the plurality of procedures on the display screen such that the information of not smaller than two procedures of the plurality of procedures extracted satisfies not smaller than two conditions specified in the display restriction information. With this configuration, resultant allocation data may be generated. Here, each of the not smaller than two conditions specified in the display restriction information is associated with a corresponding one of at least two procedures. That is, the display restriction information may be specified for at least two procedures.

By specifying the display restriction information for not smaller than two procedures, it is possible to obtain the allocation display format easy to see the cooking recipe even without scrolling operations so much.

Specific Examples of Allocation Display Format

Specific examples of the allocation display format with cooking-recipe display system 51 will be described.
[Patterns A and B]

Figure 7:
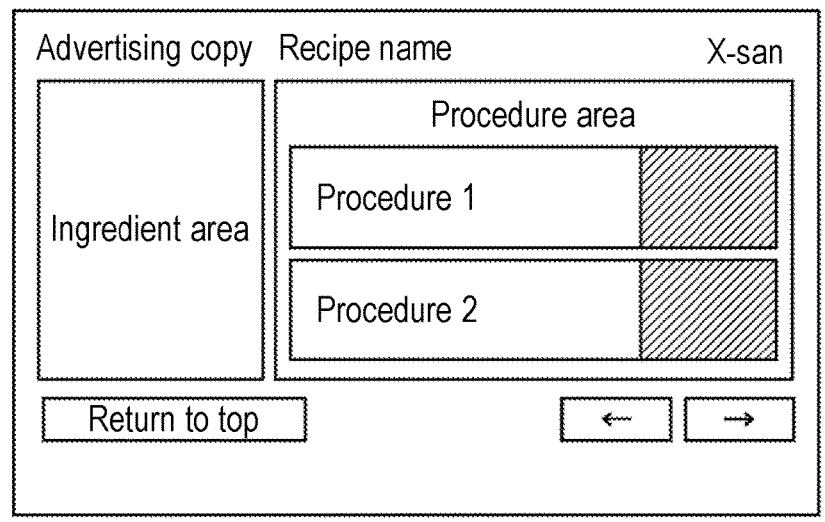
FIG. 7 is a diagram illustrating an allocation display format of Pattern A according to the first embodiment.

An allocation display format of Pattern A is described with reference to FIG. 7. FIG. 7 shows the allocation display format of Pattern A. Diagram (a) of FIG. 7 shows a screen layout on display screen 221 in the allocation display format of Pattern A. Diagram (b) of FIG. 7 shows one example of a display restriction table in the allocation display format of Pattern A.

As shown in diagram (a) of FIG. 7, in the allocation display format of Pattern A, at least one of a plurality of procedures of a cooking recipe is displayed in a procedure area of display screen 221. By operating the operation button with the right-pointing arrow and the operation button with the left-pointing arrow, the plurality of procedures of the cooking recipe can be seen in a frame-by-frame manner.

In the allocation display format of Pattern A shown in diagram (a) of FIG. 7, the procedure area and an ingredient area are displayed on one screen. In the ingredient area, an ingredient list of the cooking recipe is displayed. In the procedure area, the procedures of the cooking recipe are displayed. This allocation display format is a format in landscape mode when information terminal 200 is held horizontally.

As shown in diagram (b) of FIG. 7, the allocation display format of Pattern A specifies the display restriction table. The display restriction table contains display restriction information that restricts an expression on display screen 221 concerning each procedure of the plurality of procedures in the cooking recipe.

As shown in diagram (b) of FIG. 7, the display restriction table according to the present embodiment contains the display restriction information regarding "the number of lines," "the number of characters/line," "the number of characters," "total," and "illustration," for each of a plurality of "areas." In the display restriction table shown in diagram (b) of FIG. 7, "the number of lines" is the display restriction information that indicates the maximum number of lines in one area. "The number of characters/line" is the display restriction information that indicates the maximum number of characters per line. "The number of characters" is the value obtained by multiplying "the number of lines" by "the number of characters/line." "Total" is the display restriction information that indicates the maximum number of characters in the whole of the one area. "Illustration" is the display restriction information that indicates the upper limit of the number of illustrations in the one area.

In the allocation display format of Pattern A shown in FIG. 7, at least one procedure of the plurality of procedures of the cooking recipe is displayed in the procedure area of display screen 221. Specifically, in the procedure area of display screen 221, one or a plurality of procedures is displayed in accordance with the display restriction information in the display restriction table of diagram (b) of FIG. 7. In the example shown in diagram (a) of FIG. 7, two procedures, i.e., Procedure 1 and Procedure 2, are displayed in the procedure area.

Figure 8:
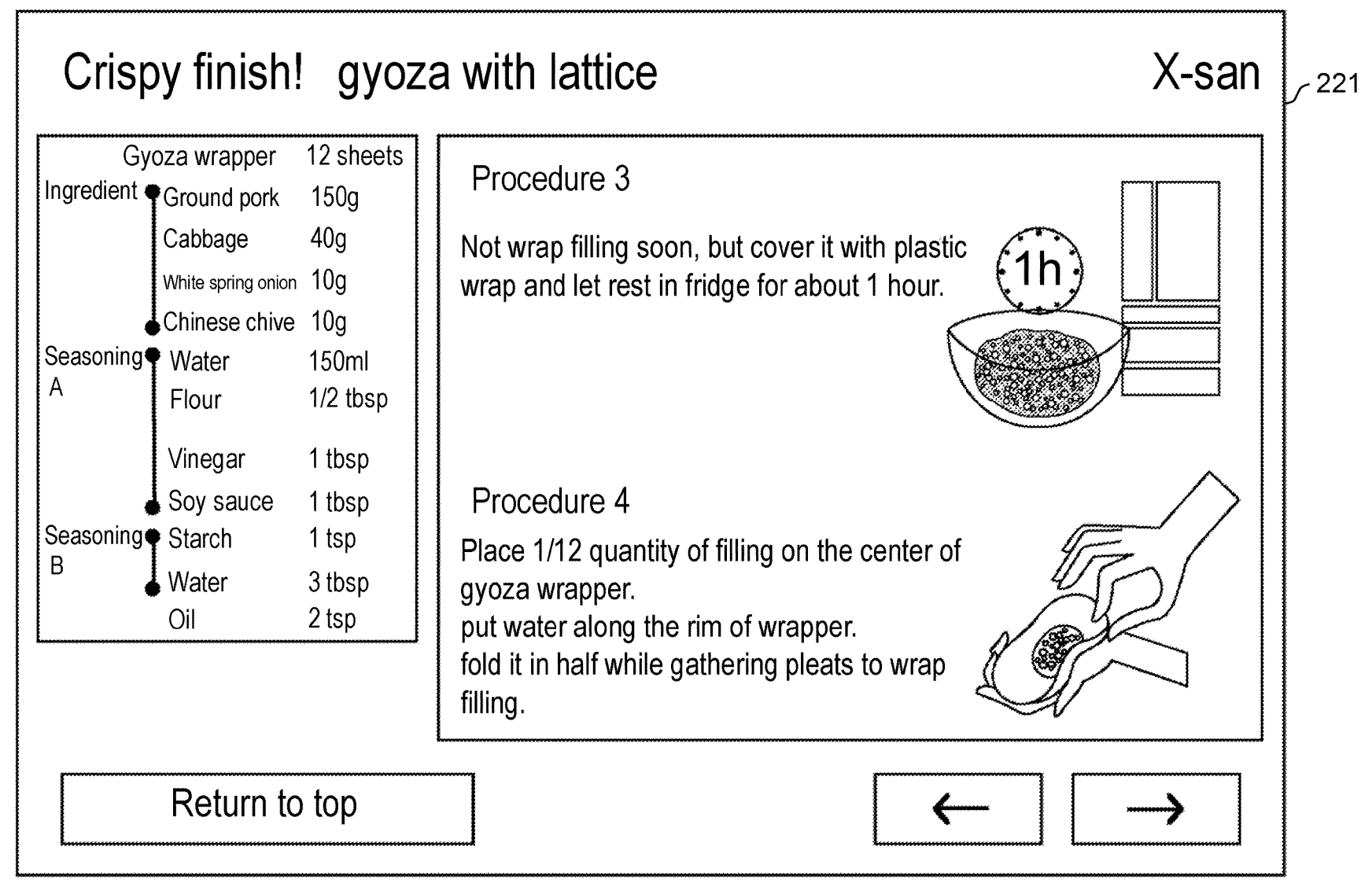

FIG. 8 shows one example of the screen of a cooking recipe displayed on display screen 221 in accordance with the allocation display format of Pattern A shown in FIG. 7. The cooking recipe is one regarding "Gyoza with Lattice: 2-servings" shown in FIG. 3.

As shown in FIG. 8, display screen 221 displays an ingredient list. Along with this, of Procedures 1 to 10 in the cooking recipe, display screen 221 displays Procedure 3 and Procedure 4 in accordance with the display restriction information in the display restriction table shown in diagram (b) of FIG. 7.

In the examples shown in FIGS. 7 and 8, the two procedures are displayed in the procedure area. In the case where the displaying of two procedures in the procedure area will cause the number of characters of the procedures to reach the upper limit of the number of characters described in the display restriction information in the display restriction table, the procedure area displays only one procedure as shown in diagram (a) of FIG. 9.

Figure 9:
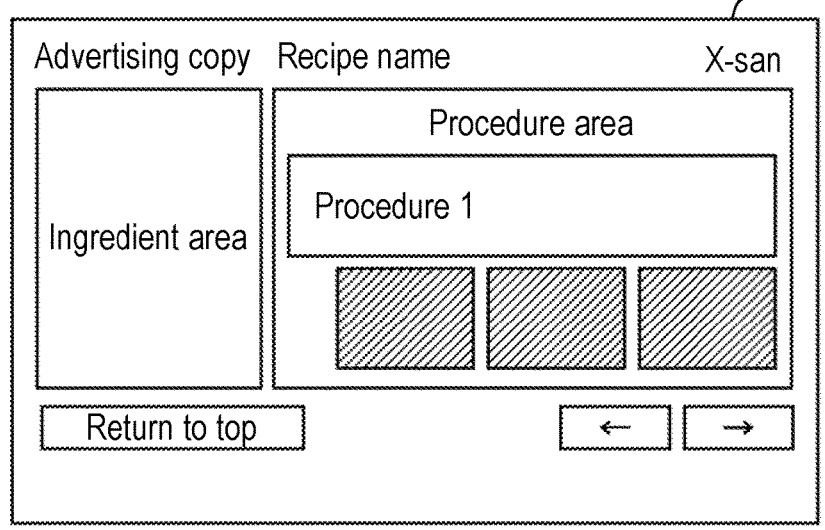
FIG. 9 is a diagram illustrating an allocation display format of Pattern A in the case where the number of characters reaches the upper limit.

Diagram (a) of FIG. 9 shows a screen layout on display screen 221 in the case where, in the allocation display format of Pattern A, if two procedures are displayed in the procedure area, the number of characters of these procedures will reach the upper limit of the number of characters specified in the display restriction information in the display restriction table. Diagram (b) of FIG. 9 shows one example of the display restriction table of the allocation display format of Pattern A in the case of diagram (a) of FIG. 9.

FIG. 10 shows a specific example of a procedure displayed in the procedure area of display screen 221. In this example, a cooking recipe is displayed on display screen 221 of information terminal 200, in accordance with the allocation display format of Pattern A. If two procedures are displayed in the procedure area, the number of characters of these procedures reaches the upper limit of the number of characters described in the display restriction information in the display restriction table shown in diagram (b) of FIG. 9. This cooking recipe is one regarding "Gyoza with Lattice: 2-servings" shown in FIG. 3.

Specifically, regarding the cooking recipe, if Procedures 1 and 2 of Procedures 1 to 10 are displayed, the number of characters of these procedures amounts to 109 in total (see FIG. 5). This figure exceeds 100 that is the display restriction information regarding the total in the display restriction table shown in diagram (b) of FIG. 7. Therefore, as shown in FIG. 10, Procedure 1 only is displayed in the procedure area of display screen 221, in accordance with the allocation display format of Pattern A.

Figure 11:
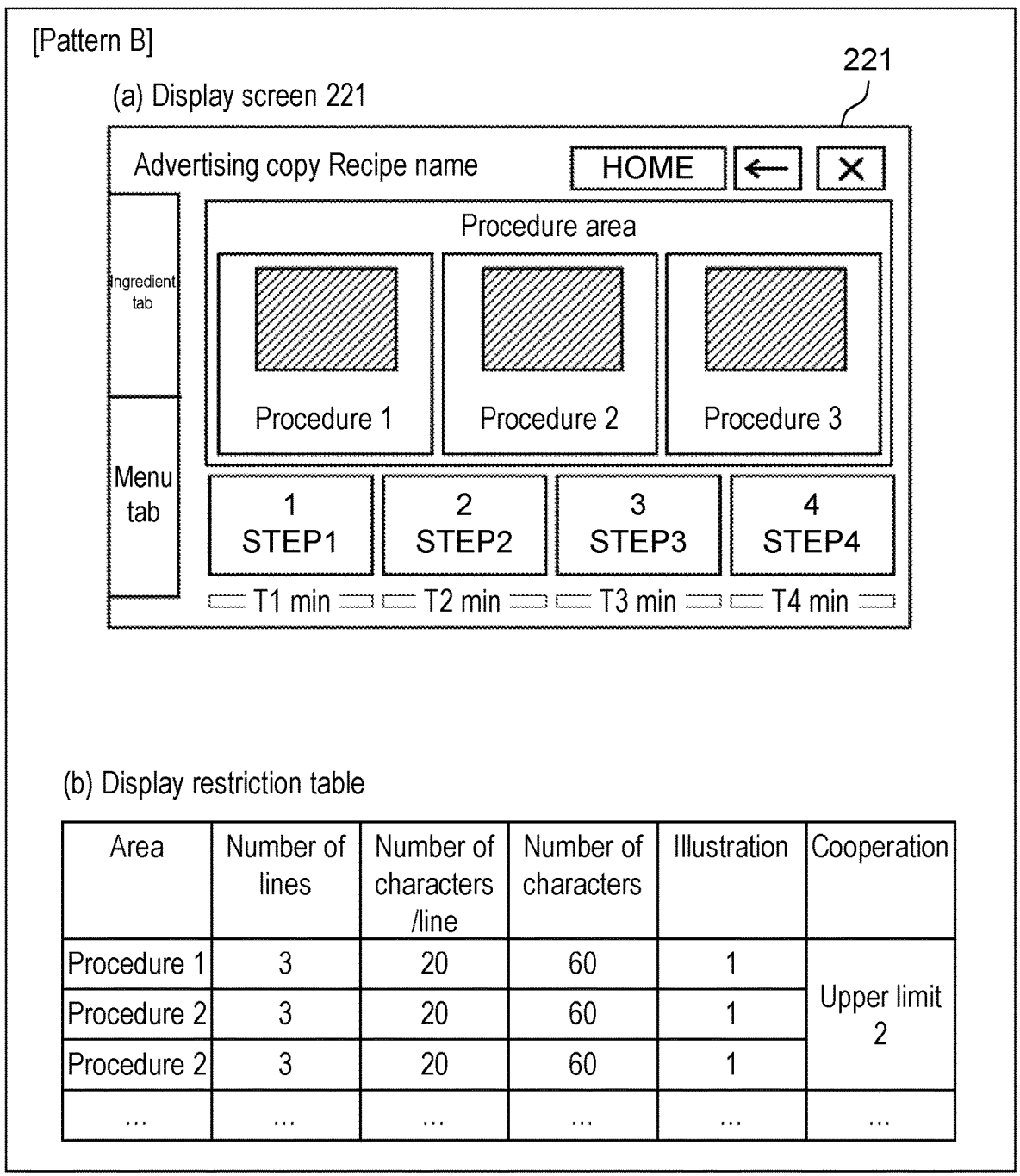
FIG. 11 is a diagram illustrating an allocation display format of Pattern B according to the first embodiment.

An allocation display format of Pattern B is described with reference to FIG. 11. FIG. 11 shows the allocation display format of Pattern B when information terminal 200 is held horizontally. Diagram (a) of FIG. 11 shows a screen layout on display screen 221 in the allocation display format of Pattern B. Diagram (b) of FIG. 11 shows one example of a display restriction table in the allocation display format of Pattern B.

As show in diagram (a) of FIG. 11, the allocation display format of Pattern B is, as in the case of Pattern A, a format in landscape mode when information terminal 200 is held horizontally. However, the allocation display format of Pattern B is different from that of Pattern A such that a plurality of procedures is arranged side-by-side, like a four-frame comic, in the procedure area. A user can see the plurality of procedures without scrolling operation of display screen 221.

As shown in diagram (a) of FIG. 11, the allocation display format of Pattern B is, unlike Pattern A, such that the ingredient area and the procedure area are displayed on different screens. The ingredient list of a cooking recipe is displayed in the ingredient area; the procedures of the cooking recipe are displayed in the procedure area.

Specifically, in the allocation display format of Pattern B, the image of the ingredient screen and the image of the procedure screen can be selected by means of an "ingredient tab" and a "procedure tab," respectively. The image of the ingredient screen is displayed in the ingredient area; the image of the procedure screen is displayed in the procedure area. The image of the ingredient screen also includes a screen, such as, an HTML (hyper text markup language) composed of character strings and images. In the allocation display format of Pattern B, "menu tab" is also set such that the image of a menu screen displaying a menu can be selected. The tabs are used to select an image to be displayed on the display screen, which causes the ingredient or menu to be displayed as a pop-up window in front of the display screen or, alternatively, to be displayed by scrolling automatically. Consequently, the user can see the cooking recipe without scrolling display screen 221.

As shown in diagram (b) of FIG. 11, the allocation display format of Pattern B specifies the display restriction table, as in the case of Pattern A. This display restriction table contains display restriction information that restricts the expression on display screen 221 concerning each of the plurality of procedures of the cooking recipe.

The display restriction table shown in diagram (b) of FIG. 11, unlike the display restriction table shown diagram (b) of FIG. 7, contains display restriction information regarding "cooperation" and the like. In the display restriction table shown in diagram (b) of FIG. 11, "cooperation" indicates the upper limit of the number of appliance cooperation links in one or a plurality of procedures, the appliance cooperation links which constitute the cooperation with home electric appliances in a cooperation system. That is, "cooperation" indicates the maximum number of units of the home electric appliances available for getting the cooperation. The upper limit of "cooperation" may be the number that is obtained by adding the number of tips of "tip calling" shown in FIGS. 5 and 6 to the number of "cooperation" links.

In the allocation display format of Pattern B shown in FIG. 11, at least one procedure of the plurality of procedures of the cooking recipe is displayed in the procedure area of display screen 221. Specifically, in the procedure area of display screen 221, one or a plurality of procedures is displayed in accordance with the display restriction information in the display restriction table of diagram (b) of FIG. 11. In the example shown in diagram (a) of FIG. 11, procedures 1, 2, and 3 are displayed in the procedure area, in this order in a side-by-side arrangement.

Figure 12:
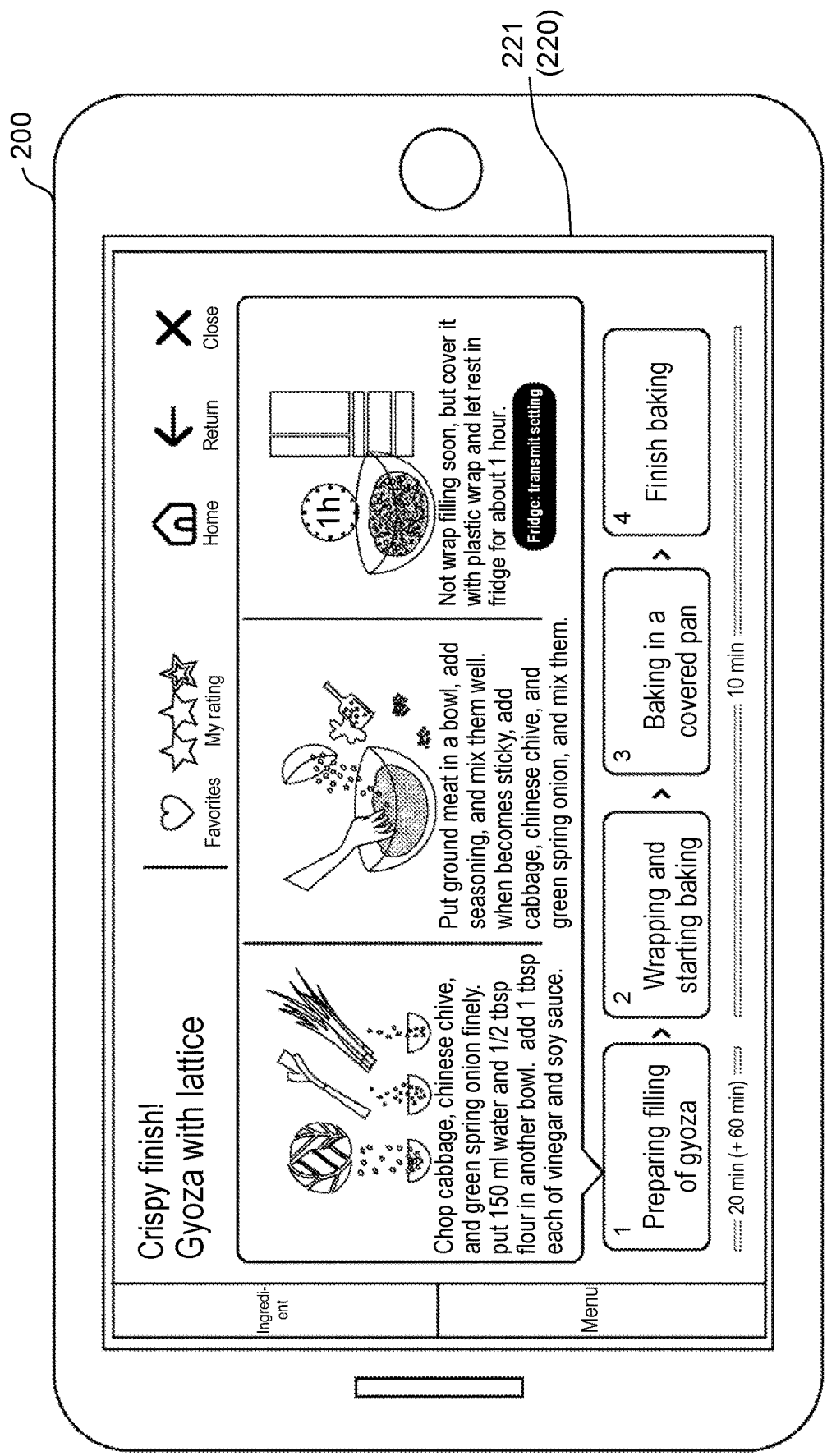
FIG. 12 is a diagram illustrating one example of a screen of a cooking recipe displayed on a display screen in accordance with the allocation display format of Pattern B shown in FIG. 11.

FIG. 12 shows one example of a screen of a cooking recipe displayed on display screen 221 in accordance with the allocation display format of Pattern B shown in FIG. 11. This cooking recipe is one regarding "Gyoza with Lattice: 2-servings" shown in FIG. 3.

As shown in FIG. 12, on display screen 221, Procedures 1 to 3 of Procedures 1 to 10 in the cooking recipe are displayed in accordance with the display restriction information in the display restriction table shown in diagram (b) of FIG. 11.

In the examples shown in FIGS. 11 and 12, three procedures are displayed in the procedure area. In the case where, if the three procedures are displayed in the procedure area, it results in a number that exceeds the upper limit of the number of "cooperation" links specified in the display restriction information, only Procedures 1 and 2 are displayed in the procedure area as shown in diagram (a) of FIG. 13.

Figure 13:
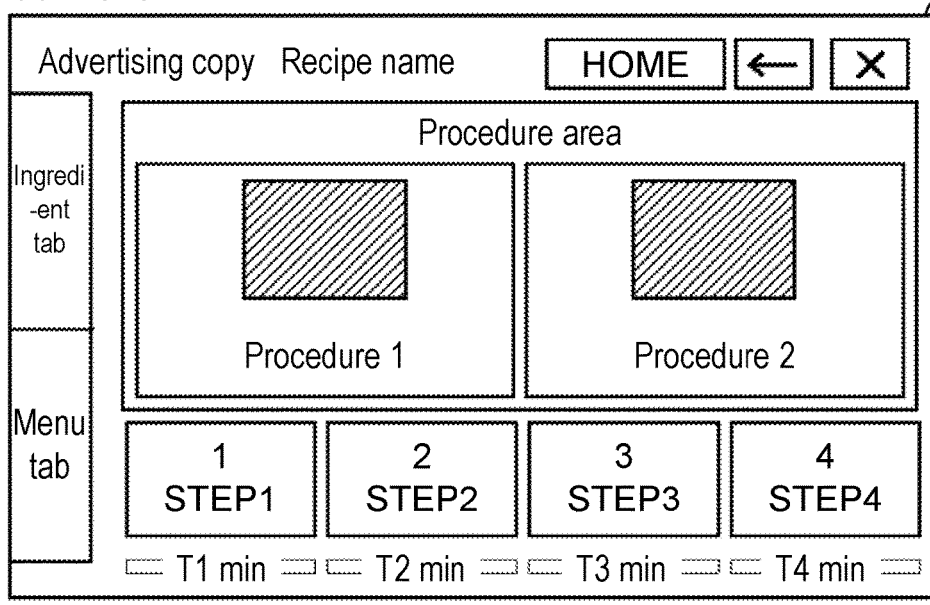
FIG. 13 is a diagram illustrating an allocation display format of Pattern B in the case where the number of appliance cooperation links reaches an upper limit.

Diagram (a) of FIG. 13 shows a screen layout on display screen 221. This shows the case where, if the three procedures are displayed in the procedure area in the allocation display format of Pattern B, the number of "cooperation" links reaches the upper limit of the number of "cooperation" links specified in the display restriction information. Diagram (b) of FIG. 13 shows one example of the display restriction table in the allocation display format of Pattern B in the case of diagram (a) of FIG. 13.

Specifically, if Procedures 1 to 3 of Procedures 1 to 10 are displayed in the procedure area, the number of "cooperation" links exceeds two that is the upper limit of the number of "cooperation" links specified in the display restriction information. Therefore, as shown in diagram (a) of FIG. 13, Procedure 1 and Procedure 2 are displayed in the procedure area of display screen 221.

As shown in diagram (a) of FIG. 11 and diagram (a) of FIG. 13, in the allocation display format of Pattern B, a plurality of procedure groups is specified as "STEPs." Each of the plurality of procedure groups includes one or a plurality of procedures. Specifically, in the examples shown in diagram (a) of FIG. 11 and diagram (a) of FIG. 13, four procedure groups, i.e., "STEP 1" to "STEP 4," are specified.

Hereinafter, a description will be made regarding a processing method used in generating procedure groups from a plurality of procedures.

Determination part 120 of server 100 extracts information regarding a plurality of procedures contained in one cooking recipe that is selected by a user from procedure table 111b, with reference to the recipe group master that is contained in master database 111. Determination part 120 compares the thus-extracted information of each of the plurality of procedures with the display restriction information. In the case where the information of each procedure satisfies the conditions specified in the display restriction information, determination part 120 defines at least two procedures of the plurality of procedures as constituents of one procedure group. If not this case, determination part 120 changes and defines the constituents of the procedure group in accordance with the requirement specified by the allocation display format, and generates, as resultant allocation data, the procedure group having the thus-defined constituents.

In the present embodiment, each procedure of the plurality of procedures contained in procedure table 111b contains a character string. Therefore, by means of character-number restrictions, the plurality of procedures can be divided into a plurality of procedure groups. Determination part 120 compares the information regarding each extracted procedure with the display restriction information. In the case where the number of characters of each extracted procedure is not larger than the value, i.e., number of characters, specified in the display restriction information, determination part 120 adjusts the allocation of the procedure groups.

Examples of the definition of procedure groups by character-number restrictions will be described with reference to FIGS. 14 and 15.

Figure 14:
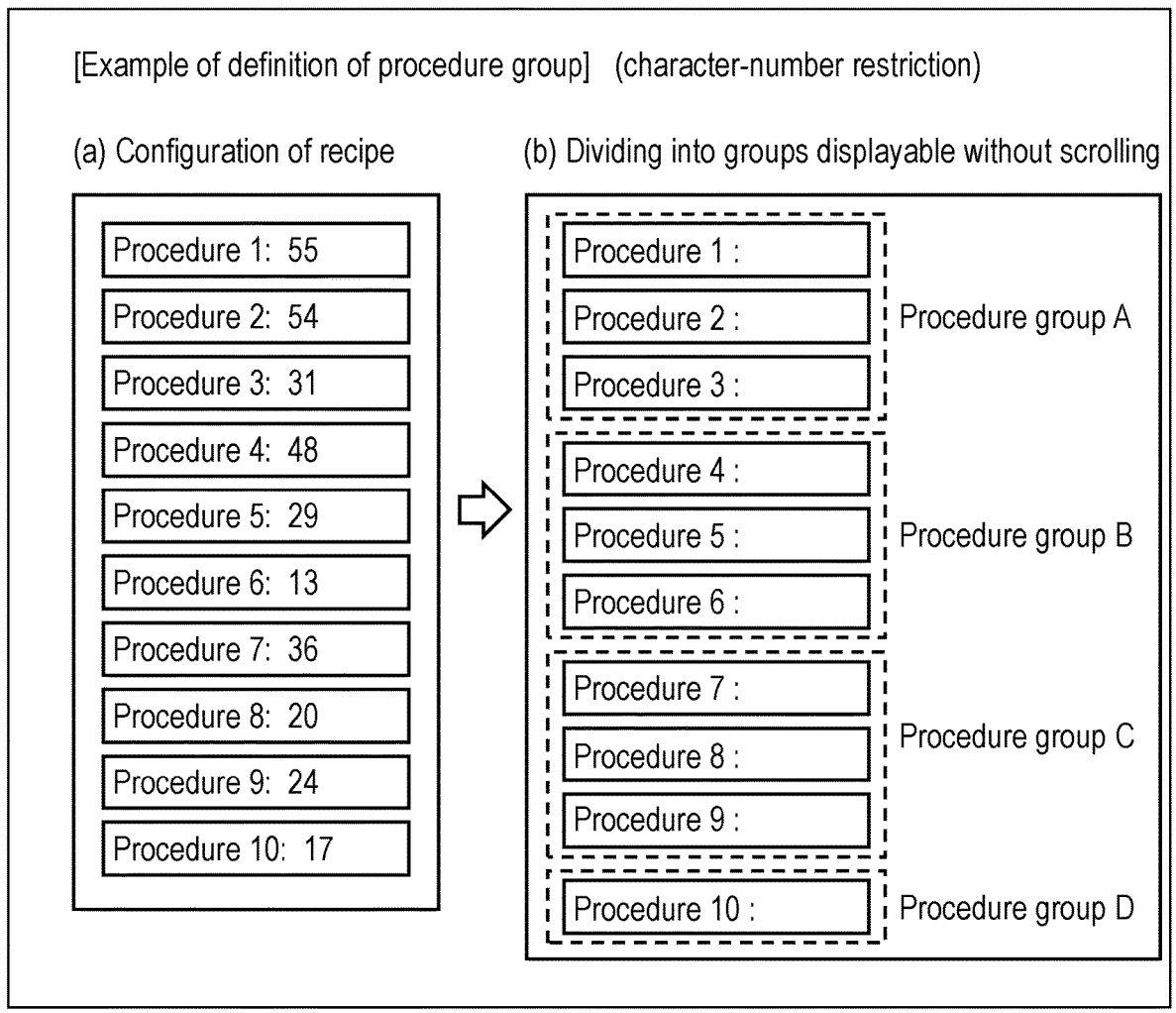
FIG. 14 is a diagram illustrating a first example of definition of procedure groups according to the first embodiment.
Figure 15:
FIG. 15 is a diagram illustrating a second example of definition of procedure groups according to the first embodiment.

As shown in diagram (a) of FIG. 14, in the case where the cooking recipe contains Procedures 1 to 10 as in the case of the cooking recipe shown in FIGS. 5 and 6, the cooking recipe is divided into a plurality of procedure groups in accordance with the character-number restrictions according to the display restriction information in the display restriction table. With this configuration, the whole of each procedure group is displayed on the display screen without scrolling operation. As a result, as shown in diagram (b) of FIG. 14, Procedures 1 to 10 are divided into procedure groups A to D. Procedure group A contains Procedures 1 to 3. Procedure group B contains Procedures 4 to 6. Procedure group C contains Procedures 7 to 9. Procedure group D contains Procedure 10 only.

Procedure groups A to D are set to be "STEP 1" to "STEP 4," respectively. Upon pressing any of operation buttons of "STEP 1" to "STEP 4," the procedures displayed in the procedure area of display screen 221 are changed in response to the pressed button. In the example shown in diagram (a) of FIG. 11, the selection of "STEP 1" results in the display of Procedures 1 to 3 in the procedure area. Upon pressing of the operation button of "STEP 2" while being in this state, Procedures 4 to 6 are then displayed in this procedure area. Upon pressing of the operation button of "STEP 3," Procedures 7 to 9 are then displayed in this procedure area. Upon pressing of the operation button of "STEP 4," Procedure 10 is then displayed in this procedure area.

Further, as one item of the display restriction information in the display restriction table, cooperation-number restrictions as shown in diagram (b) of FIG. 11 may be added on top of the character-number restrictions, thereby dividing the plurality of procedures into a plurality of procedure groups. In this case, as shown in diagram (a) of FIG. 15, when the cooking recipe contains Procedures 1 to 10, the cooking recipe is divided into a plurality of procedure groups in accordance with the character-number restrictions and cooperation-number restrictions of the display restriction table. With this configuration, the whole of each procedure group is displayed on the display screen without scrolling operation. As a result, as shown in diagram (b) of FIG. 15, Procedures 1 to 10 are divided into procedure groups A to D. Procedure group A includes Procedures 1 to 3. Procedure group B includes Procedures 4 to 6. Procedure group C includes Procedures 7 and 8. Procedure group D includes Procedures 9 and 10. That is, in the example shown in FIG. 15, the ten procedures are divided into these groups in accordance with the upper limit in number of cooperation such that each of procedure groups C and D includes two respective procedures.

Figure 16:
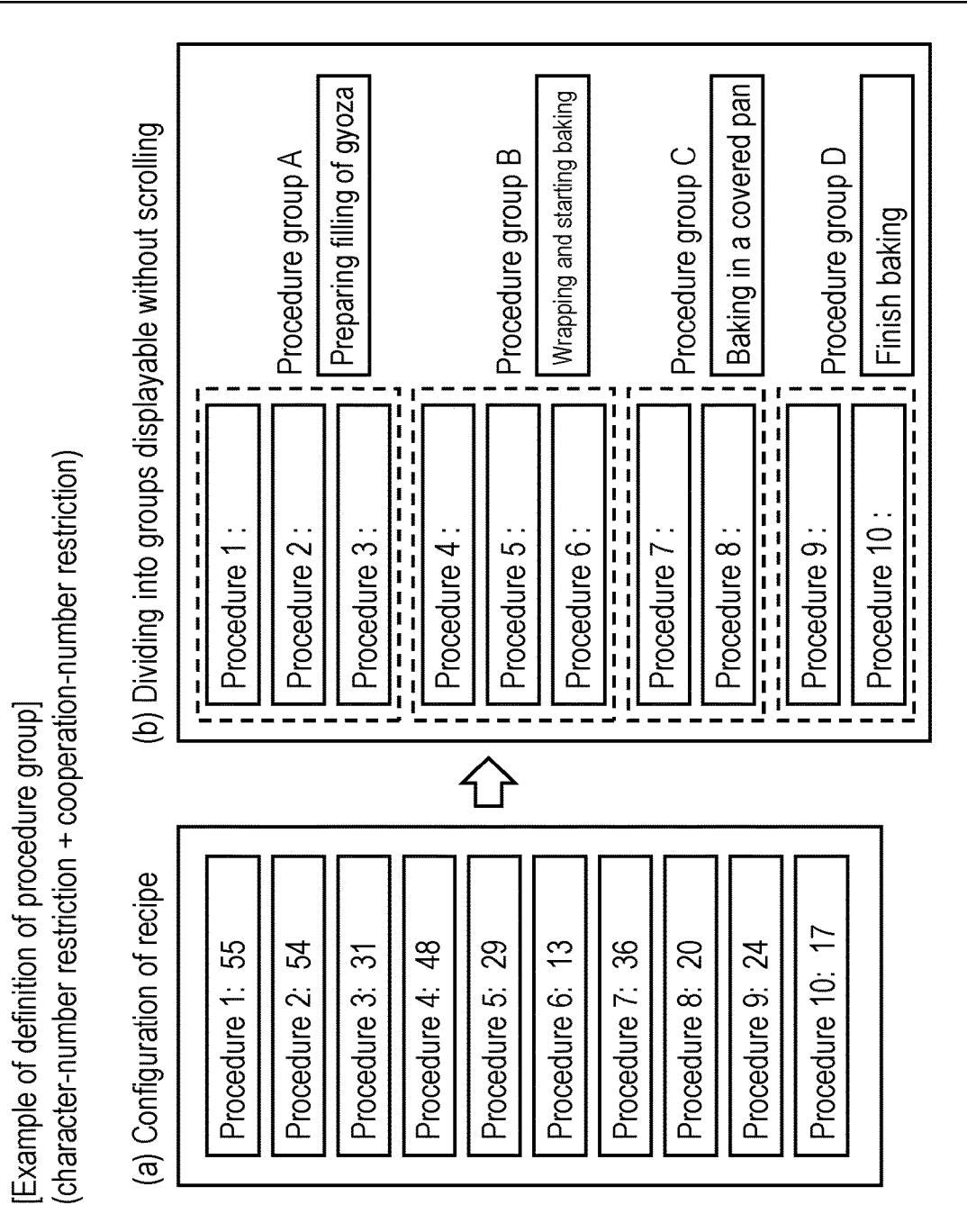
FIG. 16 is a diagram illustrating a third example of definition of procedure groups according to the first embodiment.

As shown in FIG. 16, each of the procedure groups may have a label that indicates its abbreviation. In this case, determination part 120 manages the label for each of the procedure groups, the label which indicates an overview of each of the procedure groups. When a procedure group is displayed on display screen 221, it is desirable for controller 210 or server 100 of information terminal 200 to display its abbreviation, i.e., the label of this procedure group on the display screen. This allows the grasping of content of each procedure group without close reading of a plurality of its procedures. In the example shown in FIG. 16, procedure groups A, B, C, and D have labels, i.e., "Preparing filling of gyoza," "Wrapping and starting baking," "Baking in a covered pan," and "Finish baking," respectively.

In the case where each of the procedure groups is managed with a label, controller 210 or server 100 of information terminal 200 preferably causes the total work time of the procedure groups that have the same label to be displayed on the display screen. That is, it is preferable to display the total work time for each of the procedure groups on the display screen. In this case, determination part 120 calculates the work time required for each of the procedure groups. Controller 210 or server 100 of information terminal 200 causes the thus-calculated work time to be displayed on the display screen for each procedure group. This allows the user to easily grasp the work time required for each procedure group.

When the user selects a procedure group, the work time being displayed on the display screen may vary. In diagram (a) of FIG. 11 and diagram (a) of FIG. 13, upon pressing of an operation button among "STEP 1" to "STEP 4" corresponding to the respective procedure groups, the content of the procedures being displayed in the procedure area may be switched. Along with this, the work time being displayed on the display screen may be switched.

Figure 17:
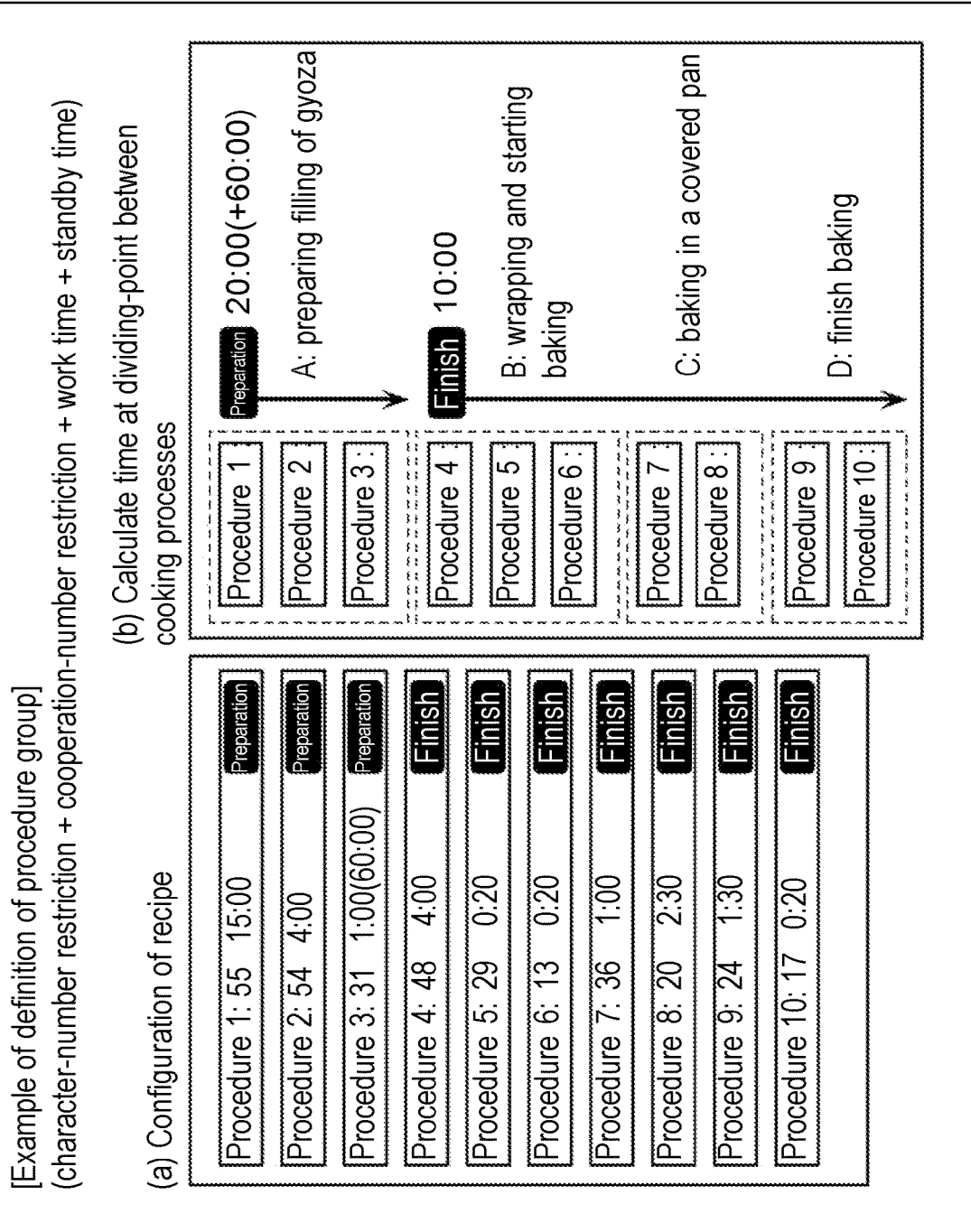
FIG. 17 is a diagram illustrating a fourth example of definition of procedure groups according to the first embodiment.

The time may be displayed not for each procedure group, but in the following manner: That is, as shown in FIG. 17, a plurality of procedure groups is broadly divided at dividing-points between sets of cooking processes. Then the time required for each set of cooking processes specified by the corresponding dividing point is calculated and displayed on the display screen. In the example shown in FIG. 17, as one piece of the display restriction information in the display restriction table, the cooperation-number restrictions are taken into consideration in addition to the character-number restrictions, which thereby divides the plurality of procedures into a plurality of procedure groups. Such a plurality of procedure groups is then further divided, at dividing-points, into sets of cooking processes, and the work time and standby time for each set are displayed on the display screen.

Specifically, in the example shown in FIG. 17, a dividing-point is set between the cooking processes of preparation in procedure group A and the cooking processes of finishing in procedure groups B to D. For the cooking processes of preparation, it is displayed on the display screen that the work time is 20 minutes and that the standby time is 60 minutes. For the cooking processes of finishing, it is displayed on the display screen that the work time is 10 minutes.

Figure 18:
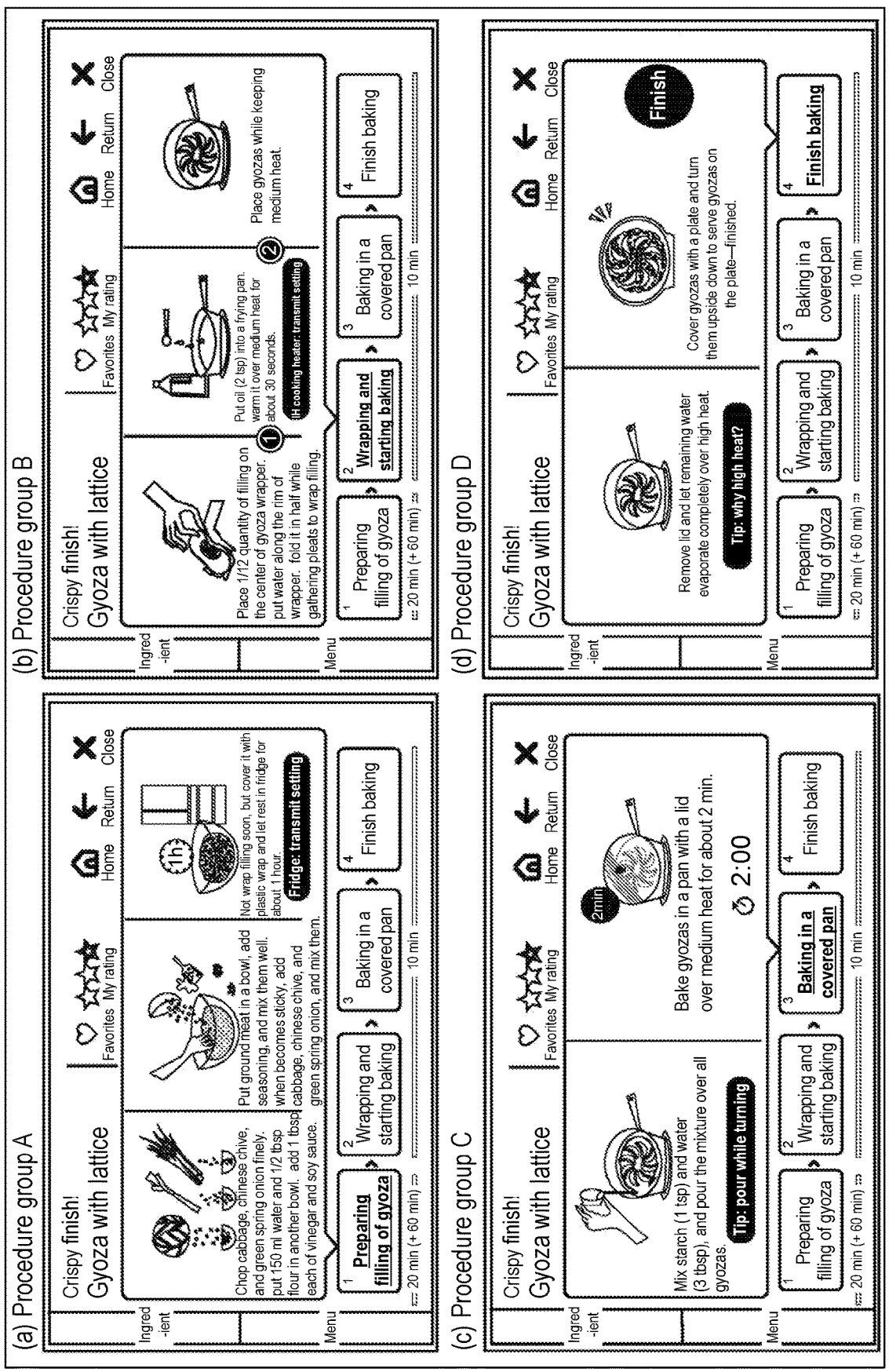
FIG. 18 is a diagram illustrating one example of screens of a cooking recipe displayed on a display screen in accordance with both an allocation display format of Pattern B and display restriction information shown in FIG. 17.

FIG. 18 shows one example of the screens of a cooking recipe displayed on a display screen in accordance with both the allocation display format of Pattern B and the display restriction information shown in FIG. 17. This cooking recipe is one regarding "Gyoza with Lattice: 2-servings" shown in FIG. 3. Specifically, diagram (a) of FIG. 18 shows the screen on which Procedures 1 to 3 contained in procedure group A are displayed in the procedure area of the display screen. Diagram (b) of FIG. 18 shows the screen on which Procedures 4 to 6 contained in procedure group B are displayed in the procedure area of the display screen. Diagram (c) of FIG. 18 shows the screen on which Procedures 7 and 8 contained in procedure group C are displayed in the procedure area of the display screen. Diagram (d) of FIG. 18 shows the screen on which Procedures 9 and 10 contained in procedure group D are displayed in the procedure area of the display screen. As shown in diagrams (a) to (d) of FIG. 18, the labels of procedure groups A to D that respectively correspond to "STEP 1" to "STEP 4" are also displayed on the display screen.

The timer of diagram (c) of FIG. 18 is such that a timer button in which a required timer time is preset is displayed along with its icon. This display is made in accordance with the information "Timer start 2:00" described in the appliance cooperation/tip calling in Procedure 8 of FIG. 6. Upon touching operation of the timer button, it starts performing count-up or count-down of a lapse of time. This operation eliminates the need for starting up, such as, an app having a timer function.

In the case where a plurality of procedures is divided into a plurality of procedure groups, the expression on the display screen may be specified for each of the procedure groups. In this case, either controller 210 or server 100 of information terminal 200 may adjust at least one of the arrangement and size of the procedure displayed on the display screen such that each of the procedure groups can be displayed in a manner that follows the specified expression.

Figure 19:
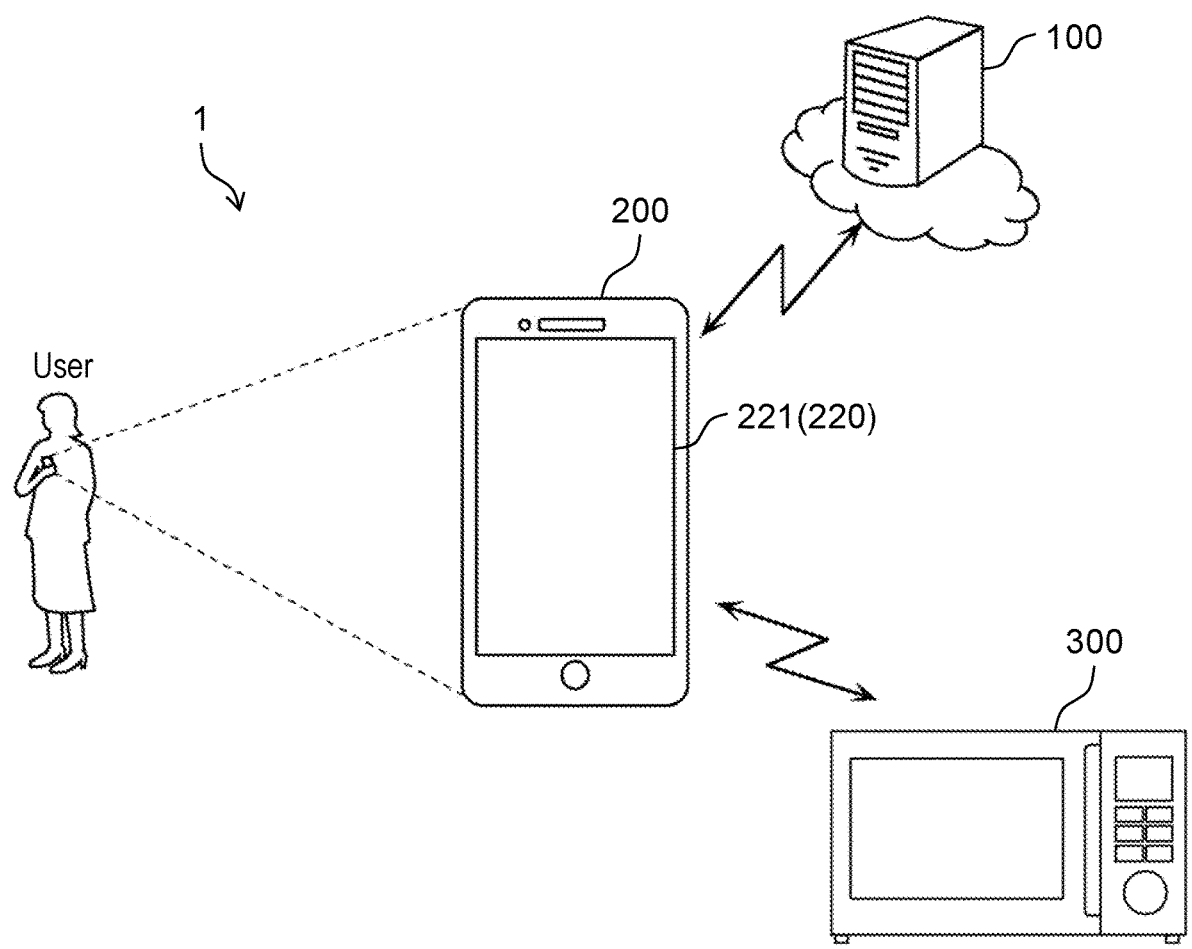
FIG. 19 is a schematic diagram illustrating the cooking-recipe display system according to the first embodiment, in portrait mode when an information terminal is held vertically.

In the present embodiment, the allocation display formats of Patterns A and B are exemplified by the case where information terminal 200 is held horizontally. As shown in FIG. 19, the allocation display formats of Patterns A and B are also applicable to a portrait mode in the case where information terminal 200 is vertically held.

Figure 20:
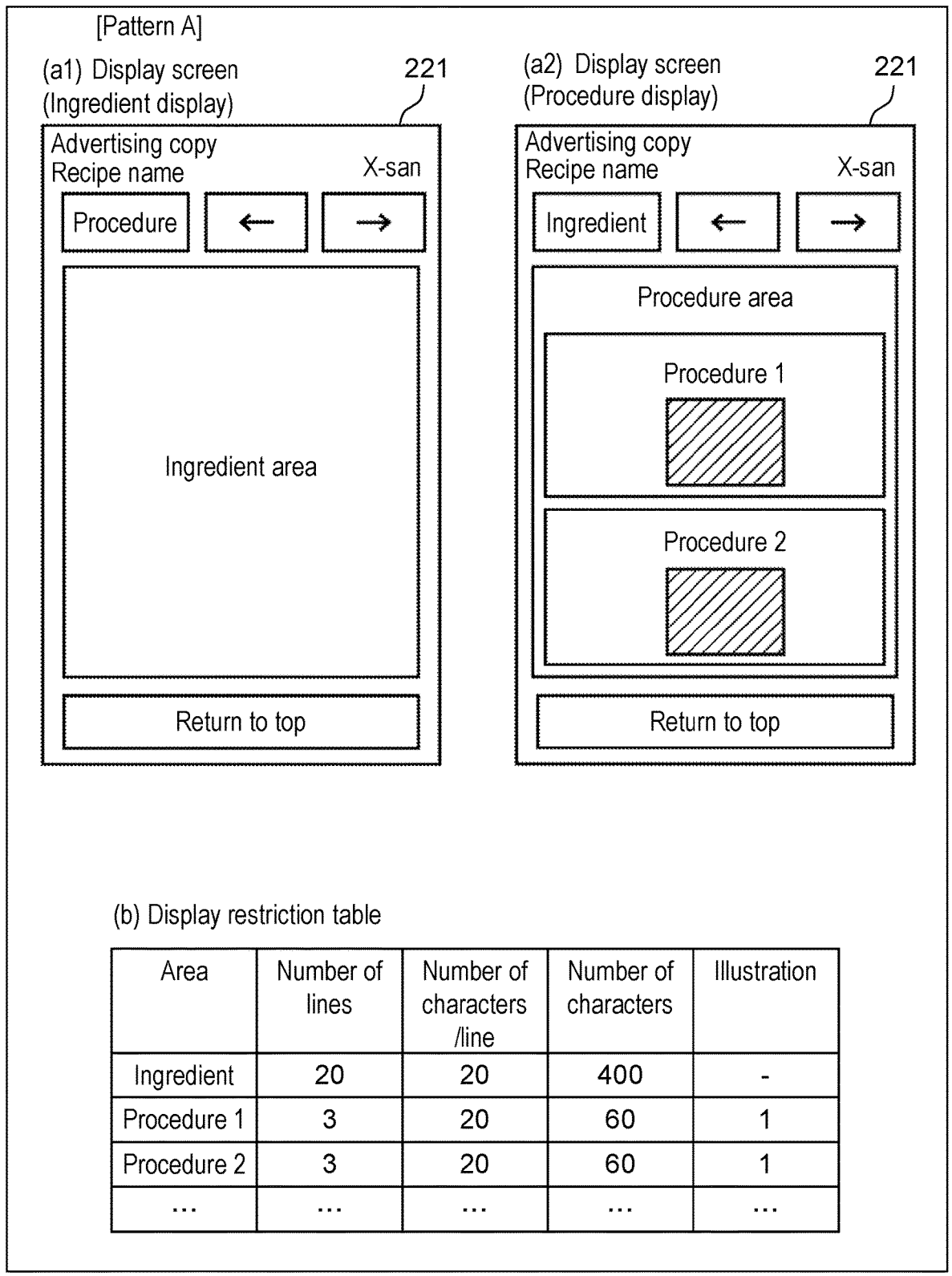
FIG. 20 is a diagram illustrating an allocation display format of Pattern A in portrait mode.

Specifically, in the allocation display format of Pattern A shown in diagrams (a1) and (a2) of FIG. 20, as in the case of the allocation display format of Pattern A shown in diagram (a) of FIG. 7, at least one of the plurality of procedures of a cooking recipe is displayed in the procedure area of display screen 221. By operating the operation button with the right-pointing arrow and the operation button with the left-pointing arrow, the plurality of procedures of the cooking recipe can be seen in a frame-by-frame manner.

In the allocation display format of Pattern A shown in diagrams (a1) and (a2) of FIG. 20, unlike the allocation display format of Pattern A shown in diagram (a) of FIG. 7, the ingredient area and the procedure area are displayed separately on the different screens.

In the ingredient area, the ingredient list of the cooking recipe shown in diagram (a1) of FIG. 20 is displayed. In the procedure area, the procedures of the cooking recipe shown in diagram (a2) of FIG. 20 are displayed. For this reason, the allocation display format of Pattern A shown in diagrams (a1) and (a2) of FIG. 20 have the operation buttons of "procedure" and "ingredient," respectively. By pressing these buttons, it is possible to switch between the screen displaying the plurality of procedures of the cooking recipe and the screen displaying the ingredient list of the cooking recipe.

As shown in diagram (b) of FIG. 20, the allocation display format of Pattern A shown in diagrams (a1) and (a2) of FIG. 20 specifies a display restriction table, as in the case of the allocation display format of Pattern A shown in diagram (a) of FIG. 7. The display restriction table contains the display restriction information that restricts the expression on display screen 221 concerning each of the plurality of procedures of the cooking recipe.

In the allocation display format of Pattern A shown in FIG. 20, as shown in diagram (a2) of FIG. 20, at least one procedure of the plurality of procedures of the cooking recipe is displayed in the procedure area of display screen 221. Specifically, in the procedure area of display screen 221, one or a plurality of procedures is displayed in accordance with the display restriction information in the display restriction table of diagram (b) of FIG. 20. In the case shown in diagram (a2) of FIG. 20, two procedures, i.e., Procedure 1 and Procedure 2 are displayed in the procedure area.

FIG. 21 shows one example of the screens of a cooking recipe displayed on display screen 221 in accordance with the allocation display format of Pattern A shown in FIG. 20. This cooking recipe is one regarding "Gyoza with Lattice: 2-servings" shown in FIG. 3.

As shown in diagram (a1) of FIG. 21, the ingredient list is displayed on the ingredient displaying screen. As shown in diagram (a2) of FIG. 21, Procedures 1 and 2 of Procedures 1 to 10 of the cooking recipe are displayed in accordance with the display restriction information in the display restriction table shown in diagram (b) of FIG. 20.

With reference to FIG. 22, a description is made regarding an allocation display format of Pattern B in portrait mode when information terminal 200 is held vertically. FIG. 22 shows the allocation display format of Pattern B when information terminal 200 is held vertically. Diagrams (a1) and (a2) of FIG. 22 show screen layouts on display screen 221 in the allocation display format of Pattern B. Diagram (b) of FIG. 22 shows one example of the display restriction table in the allocation display format of Pattern B.

In the allocation display format of Pattern B shown in diagrams (a1) and (a2) of FIG. 22, a plurality of operation buttons that indicates a plurality of procedure groups is arranged side-by-side, like a four-frame comic. This format makes possible the selection of the plurality of procedure groups in a frame-by-frame manner. In diagram (a2) of FIG. 22, there are displayed "1," "2," "3," and "4" for the plurality of respective operation buttons that indicates four procedure groups.

In the allocation display format of Pattern B shown in diagrams (a1) and (a2) of FIG. 22, unlike the allocation display format of Pattern B shown in diagram (a) of FIG. 11, the ingredient area and the procedure area are displayed separately on the different screens. In the ingredient area, the ingredient list of the cooking recipe shown in diagram (a1) of FIG. 22 is displayed. In the procedure area, the procedures of the cooking recipe shown in diagram (a2) of FIG. 22 are displayed. For this reason, the allocation display format of Pattern A shown in diagrams (a1) and (a2) of FIG. 22 have the buttons of "procedure" and "ingredient," respectively, as in the case of the allocation display format of Pattern B shown in diagrams (a1) and (a2) of FIG. 20. By pressing these buttons, it is possible to switch between the screen displaying the plurality of procedures of the cooking recipe and the screen displaying the ingredient list of the cooking recipe.

As shown in diagram (b) of FIG. 22, the allocation display format of Pattern B shown in diagrams (a1) and (a2) of FIG. 22 specify a display restriction table, as in the case of the allocation display format of Pattern B shown in diagram (a) of FIG. 11. The display restriction table contains the display restriction information that restricts the expression on display screen 221 concerning each of the plurality of procedures of the cooking recipe.

In the allocation display format of Pattern B shown in FIG. 22, as shown in diagram (a2) of FIG. 20, at least one procedure of the plurality of procedures of the cooking recipe is displayed in the procedure area of display screen 221. Specifically, in the procedure area of display screen 221, one or a plurality of procedures is displayed in accordance with the display restriction information in the display restriction table of diagram (b) of FIG. 22. In the case shown in diagram (a2) of FIG. 22, two procedures, i.e., Procedure 1 and Procedure 2 are displayed in the procedure area.

FIG. 23 shows one example of the screens of a cooking recipe displayed on display screen 221 in accordance with the allocation display format of Pattern B shown in FIG. 22. This cooking recipe is one regarding "Gyoza with Lattice: 2-servings" shown in FIG. 3.

As shown in diagram (a1) of FIG. 23, the ingredient list is displayed on the ingredient displaying screen. As shown in diagram (a2) of FIG. 23, Procedures 1 and 2 of Procedures 1 to 10 of the cooking recipe are displayed in accordance with the display restriction information in the display restriction table shown in diagram (b) of FIG. 22.

As described above, the cooking recipe is displayed on display screen 221 in accordance with the allocation display formats of Patterns A and B. This allows the plurality of procedures of a cooking recipe to be seen in a frame-by-frame manner or like a four-frame comic. Therefore, the cooking recipe can be seen without scrolling operation.

[Patterns C and D]

An allocation display format of Pattern C will be described.

Figure 24:
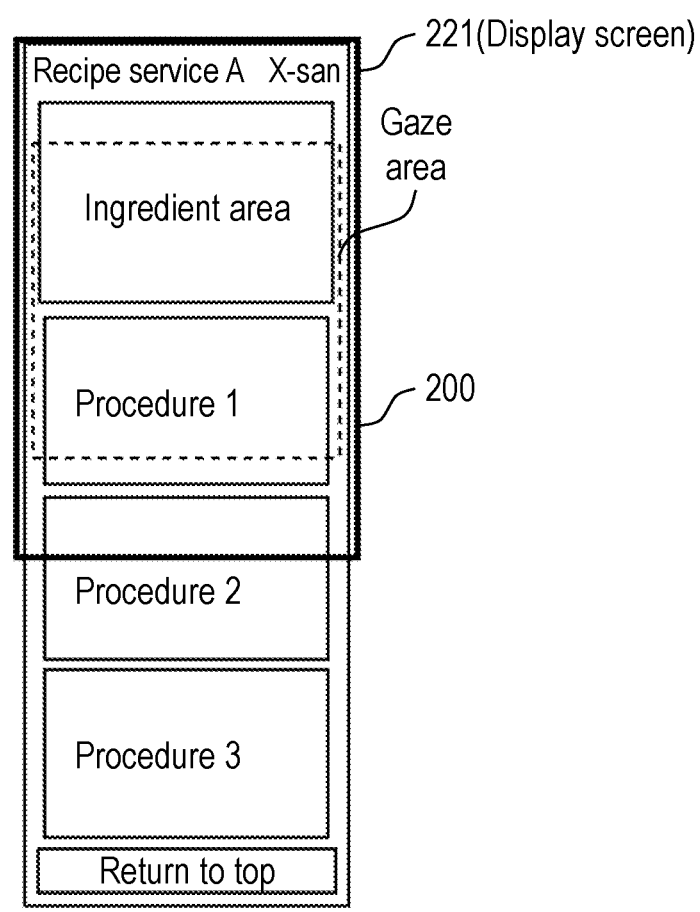
FIG. 24 is a diagram illustrating the relationship between the display screen of the information terminal and the cooking recipe.

As shown in FIG. 24, display screen 221 of information terminal 200 has a gaze area into which a user gazes. Display screen 221 of small-size information terminal 200 such as a smartphone is so small that only a part of the cooking recipe can be displayed.

Figure 25:
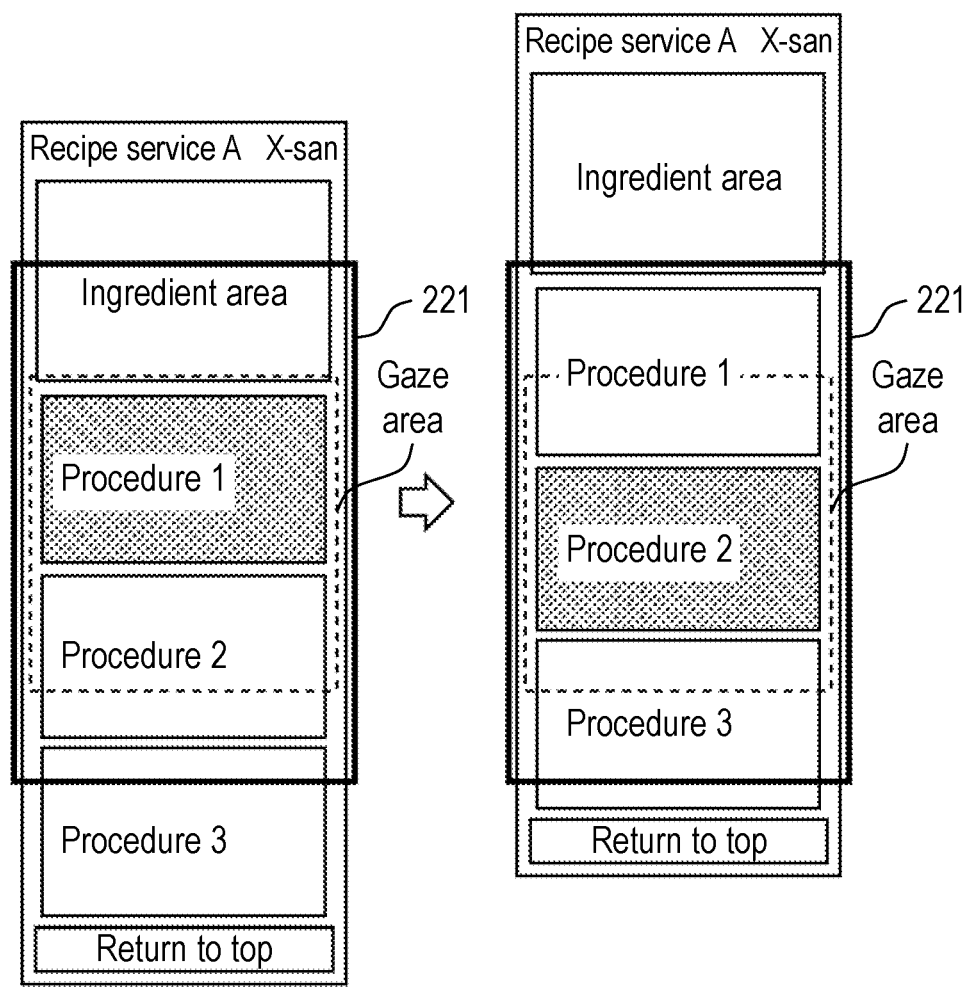
FIG. 25 is a diagram illustrating behavior of scrolling the cooking recipe displayed on the display screen of the information terminal.

As shown in FIG. 25, when using small-size information terminal 200 to see a cooking recipe, the user scrolls the cooking recipe displayed on display screen 221, thereby causing a want-to-see part of the cooking recipe to be displayed in the gaze area of display screen 221. Specifically, in the case shown in FIG. 25, when Procedure 1 is being displayed in the gaze area, the user can scroll the cooking recipe upward such that Procedure 2 moves into the gaze area.

In this case, since the ingredient list of the cooking recipe moves out of display screen 221, it causes the user to be unable to see the ingredient list while seeing Procedure 2.

Figure 26:
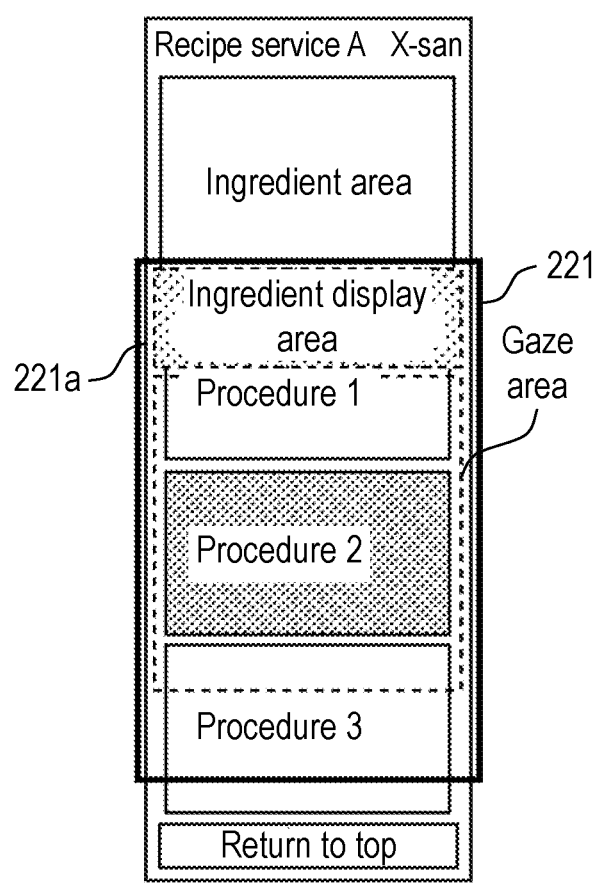
FIG. 26 is a diagram illustrating an allocation display format of Pattern C according to the first embodiment.

Hence, as shown in FIG. 26, the allocation display format of Pattern C has ingredient display area 221a at a peripheral portion of display screen 221 on which some procedures of the plurality of procedures are being displayed. In ingredient display area 221a, at least part of the ingredient list is displayed. That is, in ingredient display area 221a, information associated with recipe terms used in the ingredient list is superposed and displayed.

In the present embodiment, ingredient display area 221a is located at an upper portion of display screen 221. Ingredient display area 221a is temporally displayed only when the ingredient list is out of display screen 221. However, the present disclosure is not limited to this.

Figure 27:
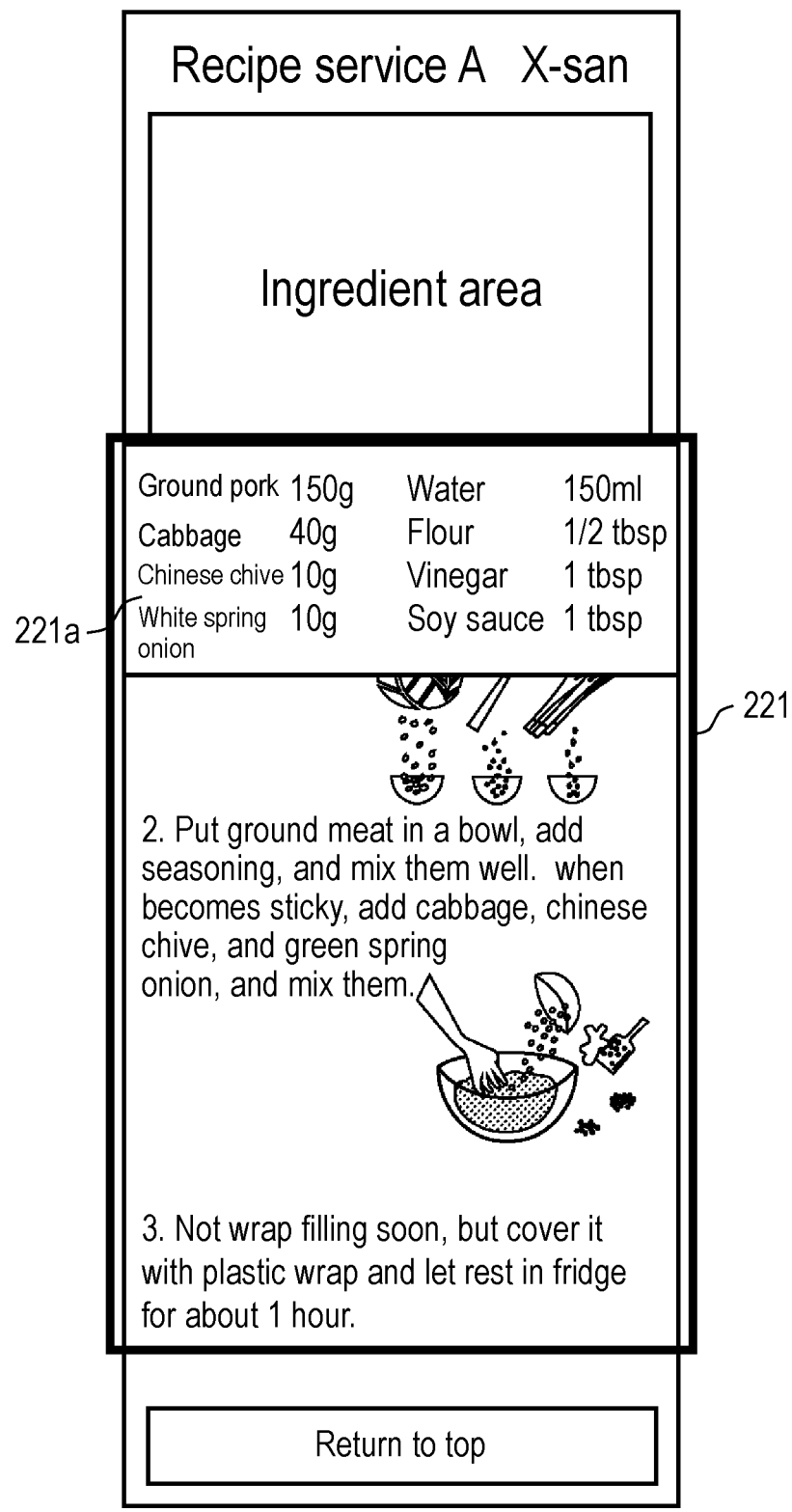
FIG. 27 is a diagram illustrating one example of a screen of a cooking recipe displayed on the display screen in accordance with the allocation display format of Pattern C shown in FIG. 26.

FIG. 27 shows one example of the screen on which the cooking recipe regarding "Gyoza with Lattice: 2-servings" shown in FIG. 3 is displayed in accordance with the allocation display format of Pattern C. As shown in FIG. 27, in ingredient display area 221a located on the upper portion of display screen 221, the ingredient list of the cooking recipe is displayed.

In this way, in accordance with the allocation display format of Pattern C, the cooking recipe is displayed on display screen 221. When some procedures of the plurality of procedures are being displayed on display screen 221 and even when the ingredient list of the cooking recipe moves out of display screen 221, the ingredient list is displayed on ingredient display area 221a. With this configuration, the user can see the ingredient list while seeing the procedures. Since ingredient display area 221a is located at the peripheral portion of display screen 221, it is possible to display the ingredient list on display screen 221 while preventing the interference with the gaze area.

In ingredient display area 221a, all ingredients in the ingredient list may be displayed or, alternatively, only some ingredients in the ingredient list may be displayed. In ingredient display area 221a, there may be displayed only ingredients used in a procedure being displayed in the gaze area or, alternatively, only ingredients used in procedures consisting of a procedure being displayed in the gaze area, the preceding procedure, and the next procedure.

Figure 28:
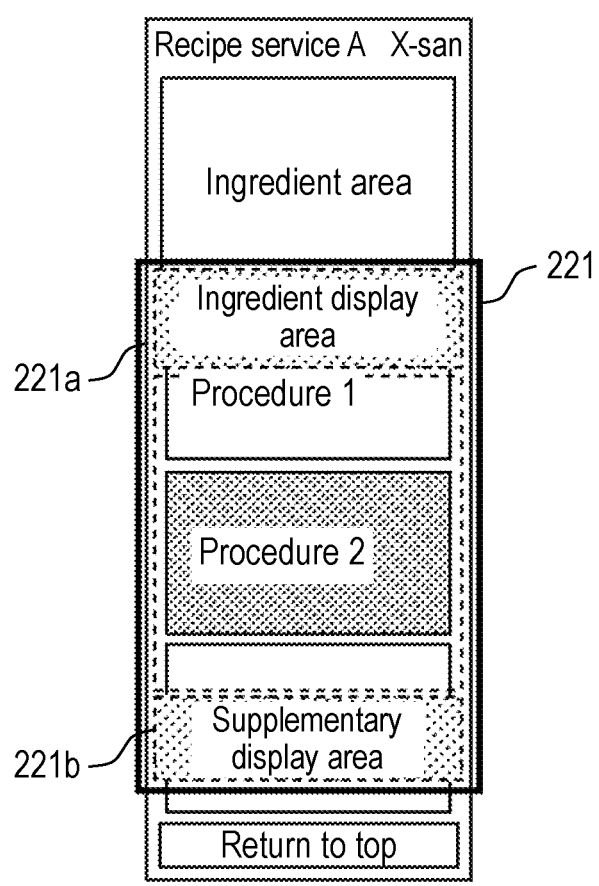
FIG. 28 is a diagram illustrating a first modified example of the allocation display format of Pattern C according to the first embodiment.

As shown in FIG. 28, the allocation display format of Pattern C may have supplementary display area 221b at a peripheral portion of display screen 221, in addition to ingredient display area 221a. In this format, the gaze area is sandwiched between supplementary display area 221b and ingredient display area 221a. With this configuration, while preventing interference with the gaze area, both ingredient display area 221a and supplementary display area 221b can be displayed simultaneously in display screen 221. In the example shown in FIG. 28, ingredient display area 221a is disposed in an upper portion of display screen 221 and supplementary display area 221b is disposed in a lower portion of display screen 221.

In supplementary display area 221b, part of the ingredient list is displayed. That is, in the case where the ingredient list of the cooking recipe is out of display screen 221, ingredients in the ingredient list may be divided and displayed separately in ingredient display area 221a and supplementary display area 221b. With this configuration, in the case where there are so many ingredients to be posted in the ingredient list, even such ingredients in the ingredient list can be displayed on display screen 221.

Figure 29:
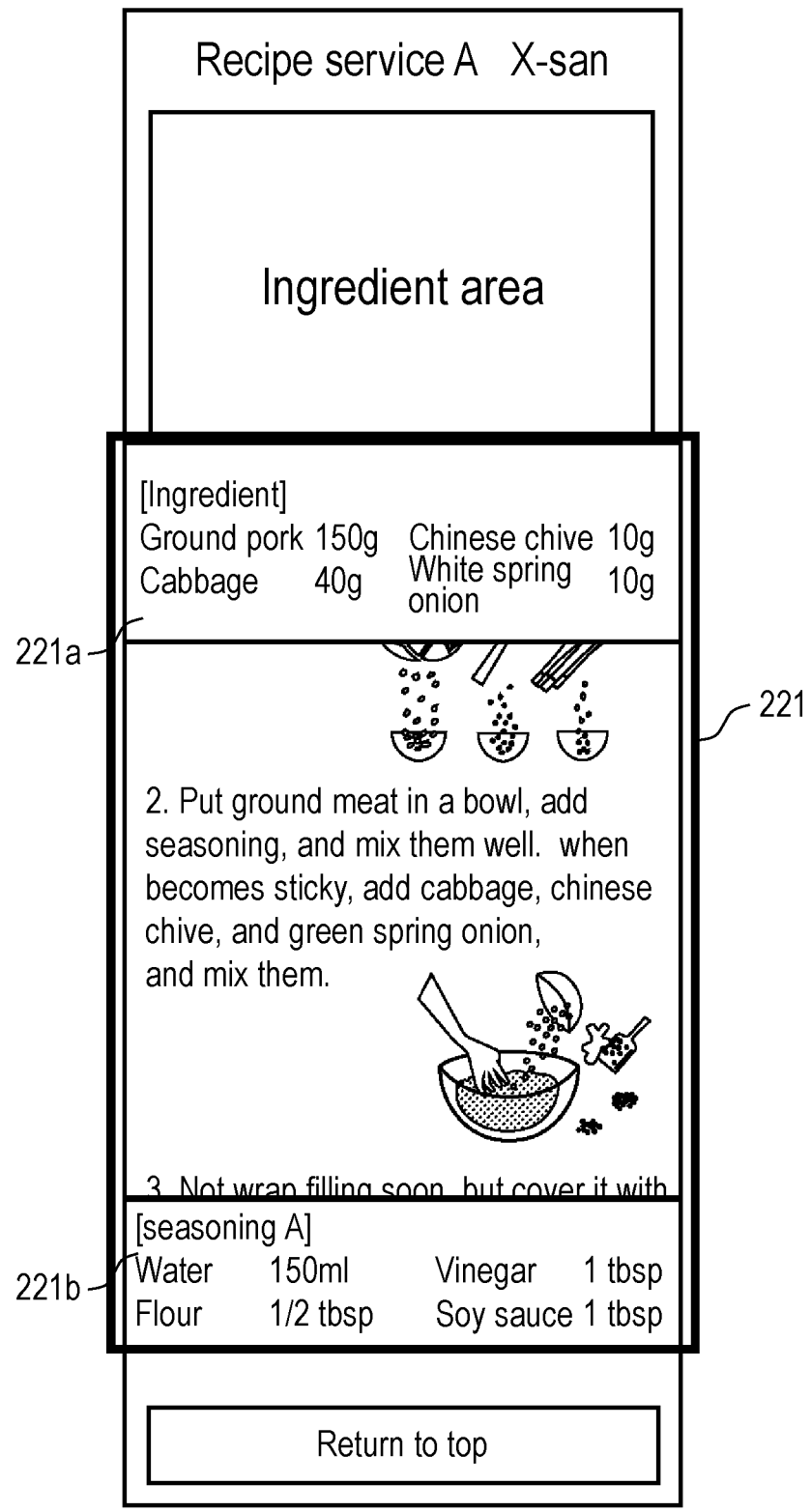
FIG. 29 is a diagram illustrating one example of the screen of the cooking recipe displayed on the display screen in accordance with the first modified example of the allocation display format of Pattern C shown in FIG. 28.

FIG. 29 shows one example of the screen on which the cooking recipe regarding "Gyoza with Lattice: 2-servings" shown in FIG. 3 is displayed in accordance with the allocation display format of Pattern C. As shown in FIG. 29, in the upper portion of display screen 221, there is displayed ingredient display area 221a in which food materials in the ingredient list of the cooking recipe are posted. In the lower portion of display screen 221, there is displayed supplementary display area 221b in which seasonings and water in the ingredient list of the cooking recipe are posted.

Figure 30:
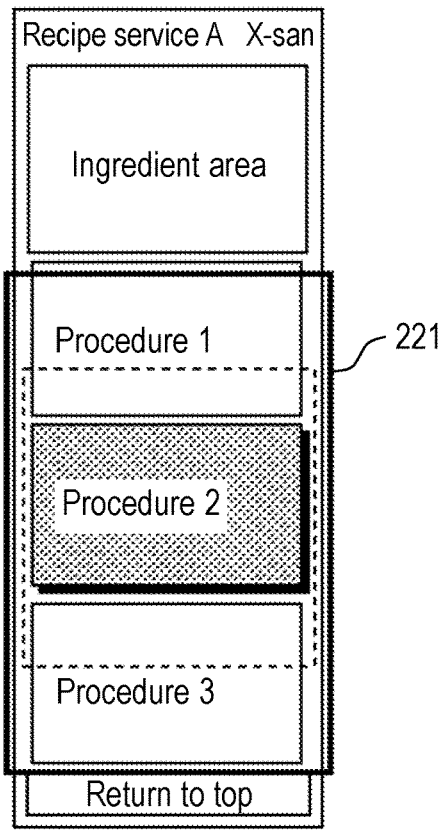
FIG. 30 is a diagram illustrating a second modified example of the allocation display format of Pattern C according to the first embodiment.

As shown in FIG. 30, in the allocation display format of Pattern C, a procedure that should attract gaze may be highlighted and displayed. In the example shown in FIG. 30, of the plurality of procedures of the cooking recipe, the procedure to be displayed in the gaze area is highlighted by adding a shadow to the frame that surrounds this procedure. Such highlighting can enhance the ease of seeing the procedure into which the user should gaze.

Figure 31:
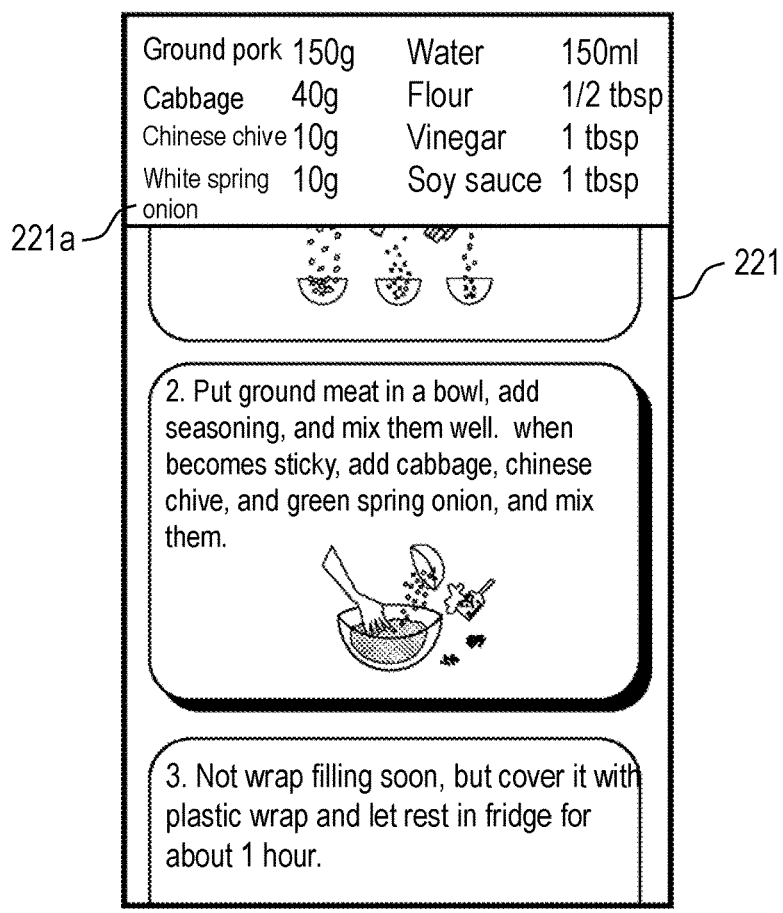
FIG. 31 is a diagram illustrating one example of the screen of the cooking recipe displayed on the display screen in accordance with the second modified example of the allocation display format of Pattern C shown in FIG. 30.

FIG. 31 shows the example in which the cooking recipe regarding "Gyoza with Lattice: 2-servings" shown in FIG. 3 is displayed in accordance with the allocation display format of Pattern C. As shown in FIG. 31, Procedure 2 located in the gaze area is highlighted by adding a shadow to the frame that surrounds this procedure.

Figure 32:
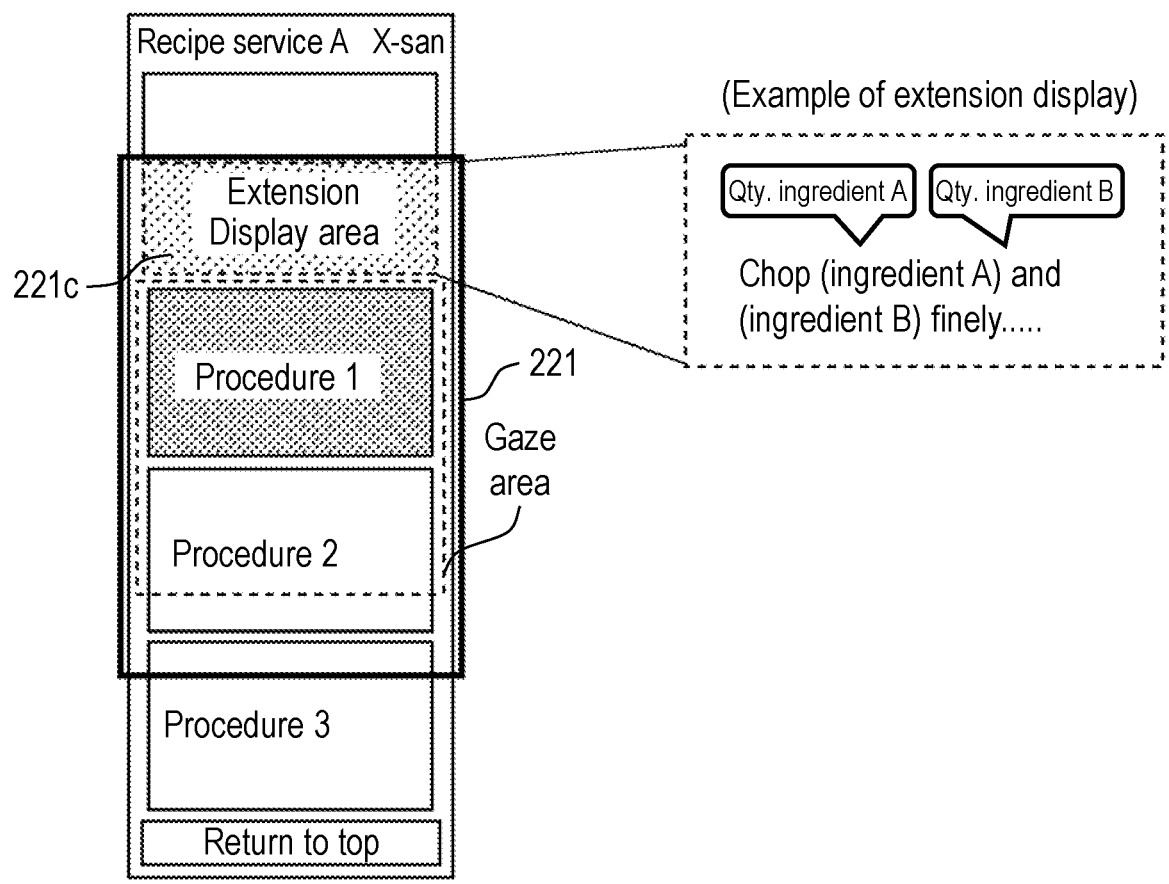
FIG. 32 is a diagram illustrating an allocation display format of Pattern D.

With reference to FIG. 32, an allocation display format of Pattern D will be described. FIG. 32 is a diagram illustrating the allocation display format of Pattern D.

As shown in FIG. 26, the allocation display format of Pattern C has ingredient display area 221a at the peripheral portion of display screen 221 on which some procedures of the plurality of procedures are being displayed. As shown in FIG. 32, the allocation display format of Pattern D has extension display area 221c at a peripheral portion of display screen 221 on which some procedures of the plurality of procedures are being displayed, with the extension display area being intended to display the quantities of ingredients of the cooking recipe. That is, in extension display area 221c, information associated with the quantities of ingredients of the cooking recipe is superposed and displayed.

In the present embodiment, extension display area 221c is located at an upper portion of display screen 221. Extension display area 221c is temporally displayed only when the ingredient list is out of display screen 221. However, the present disclosure is not limited to this.

As shown in FIG. 32, the quantity of an ingredient located in extension display area 221c is displayed in a pop-up window with a word balloon shape, the pop-up window which appears above this ingredient.

Figure 33:
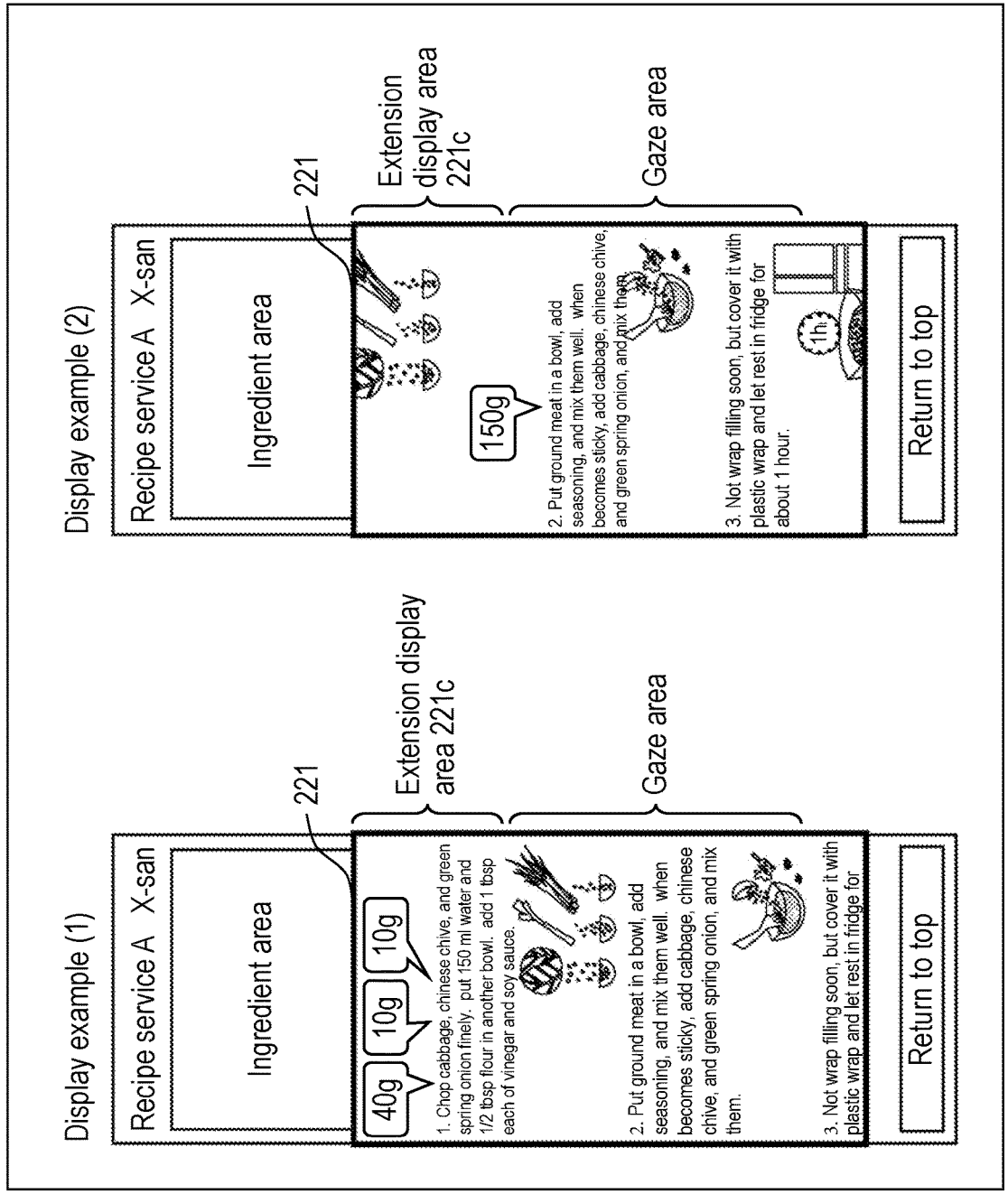
FIG. 33 is a diagram illustrating one example of a screen of a cooking recipe displayed on the display screen in accordance with the allocation display format of Pattern D shown in FIG. 32.

FIG. 33 shows one example of the screen layout in which the cooking recipe regarding "Gyoza with Lattice: 2-servings" shown in FIG. 3 is displayed in accordance with the allocation display format of Pattern D. As shown in FIG. 33, pop-up windows with a word balloon shape are displayed at above ingredients of the cooking recipe located in extension display area 221c at the upper portion of display screen 221. In such pop-up windows, the quantities of these respective ingredients are displayed. In display example (1) of FIG. 33, the quantities of cabbage, Chinese chive, and green spring onion are displayed in extension display area 221c. In display example (2) of FIG. 33, the quantity of ground meat is displayed in extension display area 221c.

In this way, in accordance with the allocation display format of Pattern D, the cooking recipe is displayed on display screen 221. With this configuration, in the case where some procedures of the plurality of procedures are being displayed on display screen 221, even when the ingredient list of the cooking recipe is out of display screen 221, the quantities of the ingredients are displayed in extension display area 221c. As a result, the user can recognize the quantities of the ingredients while seeing the procedures without scrolling. Since extension display area 221c is displayed at the peripheral portion of display screen 221, the quantities of the ingredients can be displayed on display screen 221 while preventing interference with the gaze area.

Figure 34:
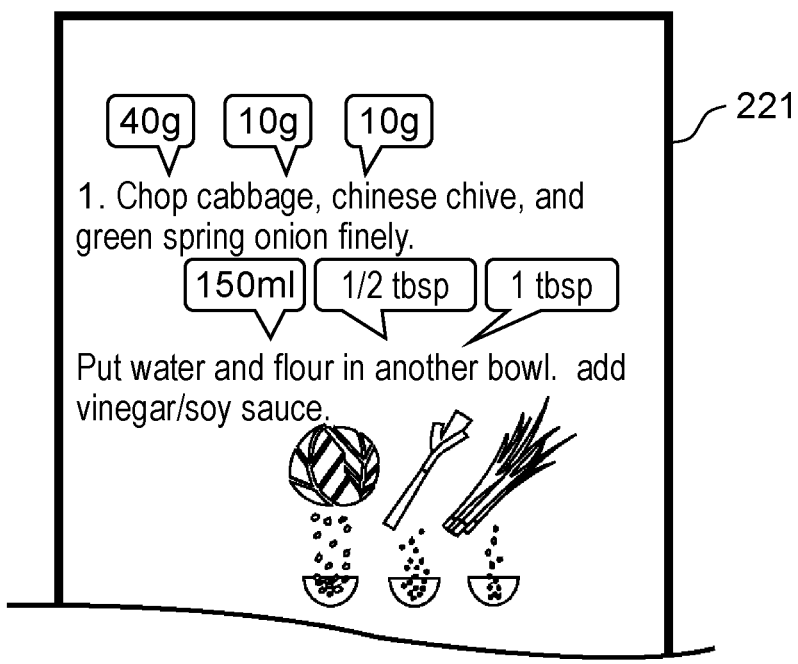
FIG. 34 is a diagram illustrating a modified example of the allocation display format of Pattern D.

Of the ingredients displayed in extension display area 221c, the quantities of only ingredients that are being displayed in the top line may be displayed. However, as shown in FIG. 34, the quantities of ingredients may be displayed over a plurality of lines from above (in FIG. 34, two lines from the top) in extension display area 221c.

As described above, the displaying of a cooking recipe on display screen 221 in accordance with the allocation display formats of Patterns C and D allows the cooking recipe to be displayed on display screen 221 in an easy-to-see manner without scrolling so much.

[Pattern E]

An allocation display format of Pattern E will be described.

Figure 35:
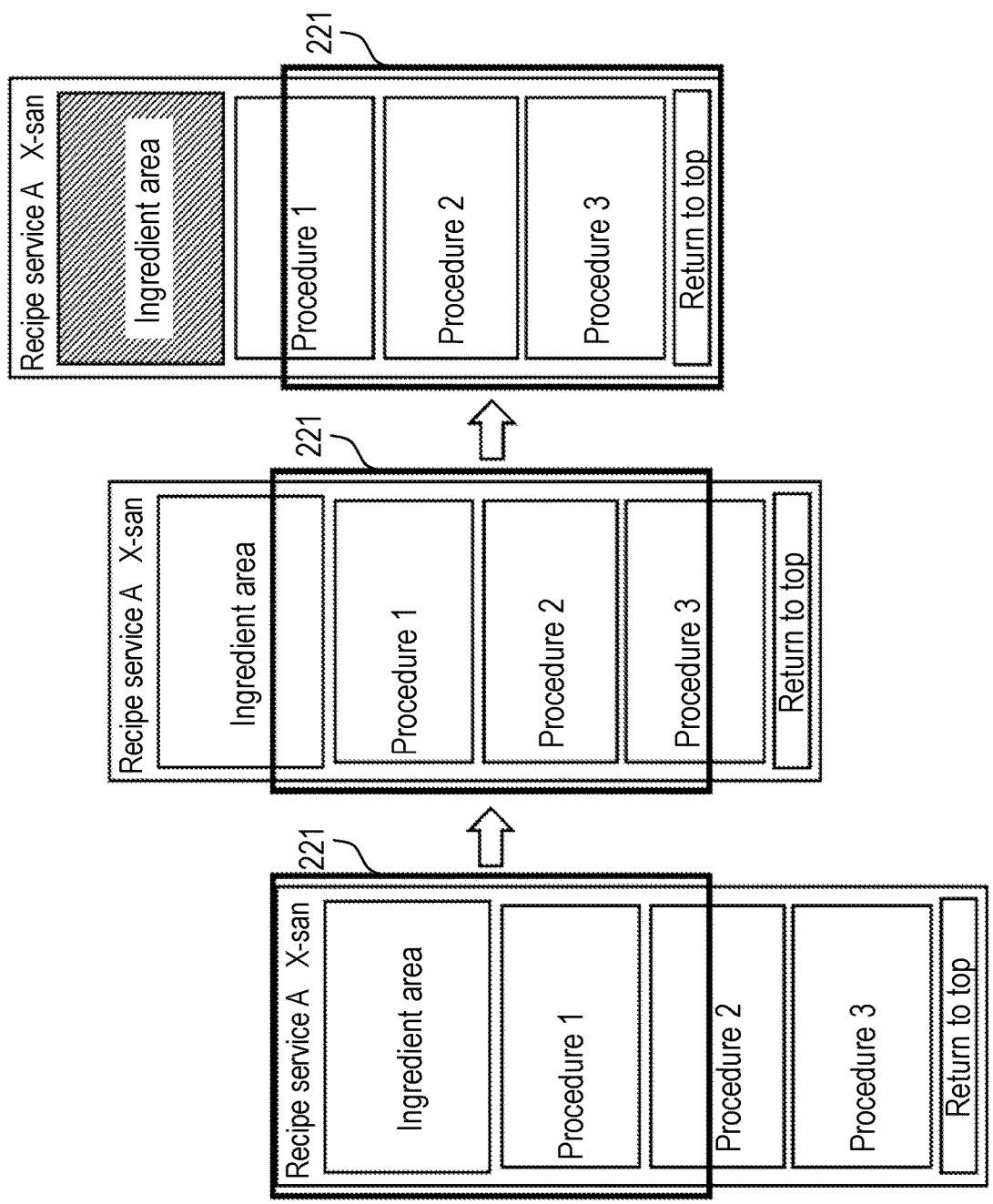
FIG. 35 is a diagram illustrating behavior of scrolling the cooking recipe displayed on the display screen of the information terminal.

As shown in FIG. 35, display screen 221 of a small-size information terminal such as a smartphone is so small that only a part of the cooking recipe can be displayed. Consequently, a user is required to see, while scrolling operation, the cooking recipe displayed on display screen 221. In the example shown in FIG. 35, in order to see the cooking recipe from top to bottom, display screen 221 is subjected to scrolling operation such that the cooking recipe moves upward. In this case, however, since the ingredient list of the cooking recipe moves out of display screen 221, the user becomes unable to see the ingredient list.

Figure 36:
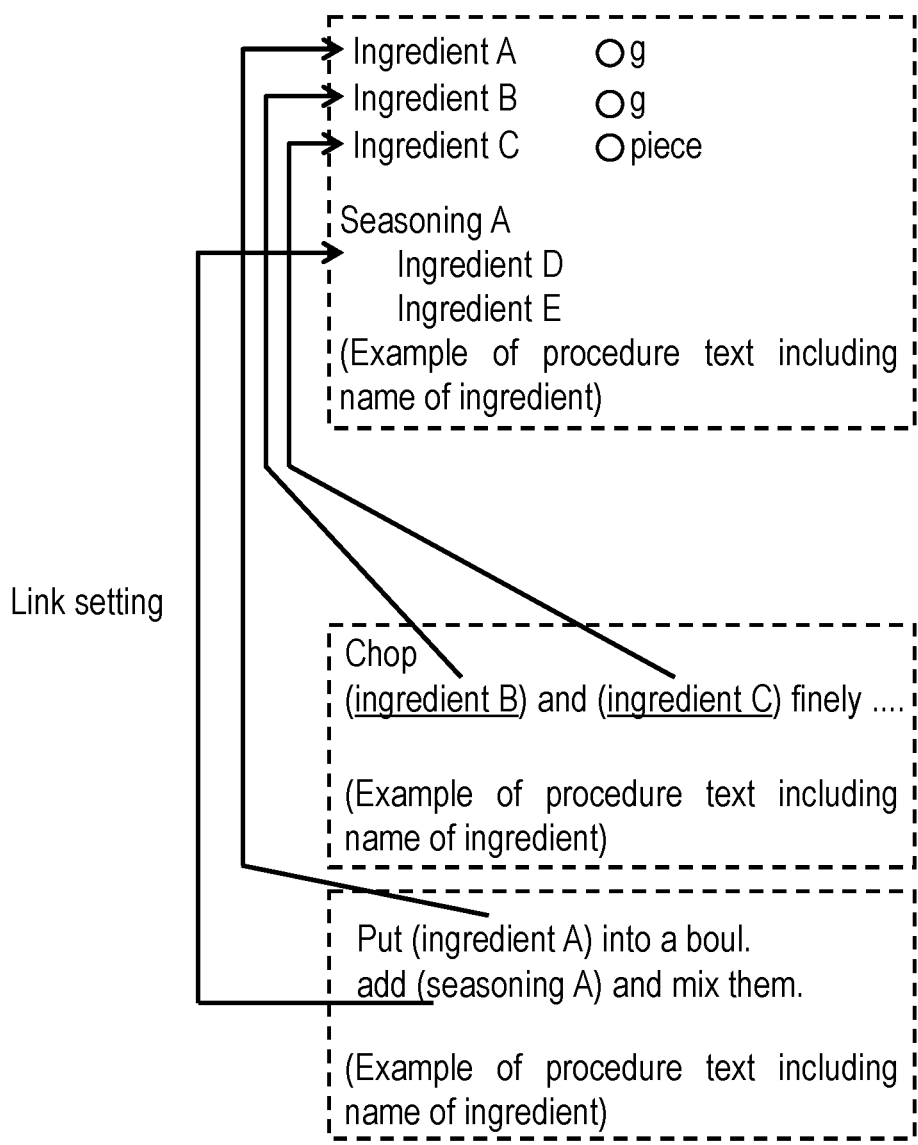
FIG. 36 is a diagram illustrating link setting in an allocation display format of Pattern E.

Therefore, as shown in FIG. 36, in the allocation display format of Pattern E, link setting is made, in advance, between the ingredients in the ingredient list and the ingredients appearing in the procedures. For example, underlining the ingredients appearing in the procedures allows the user to know that such ingredients in the ingredient list are associated, in advance, with the ingredients appearing in the procedures.

Figure 37:
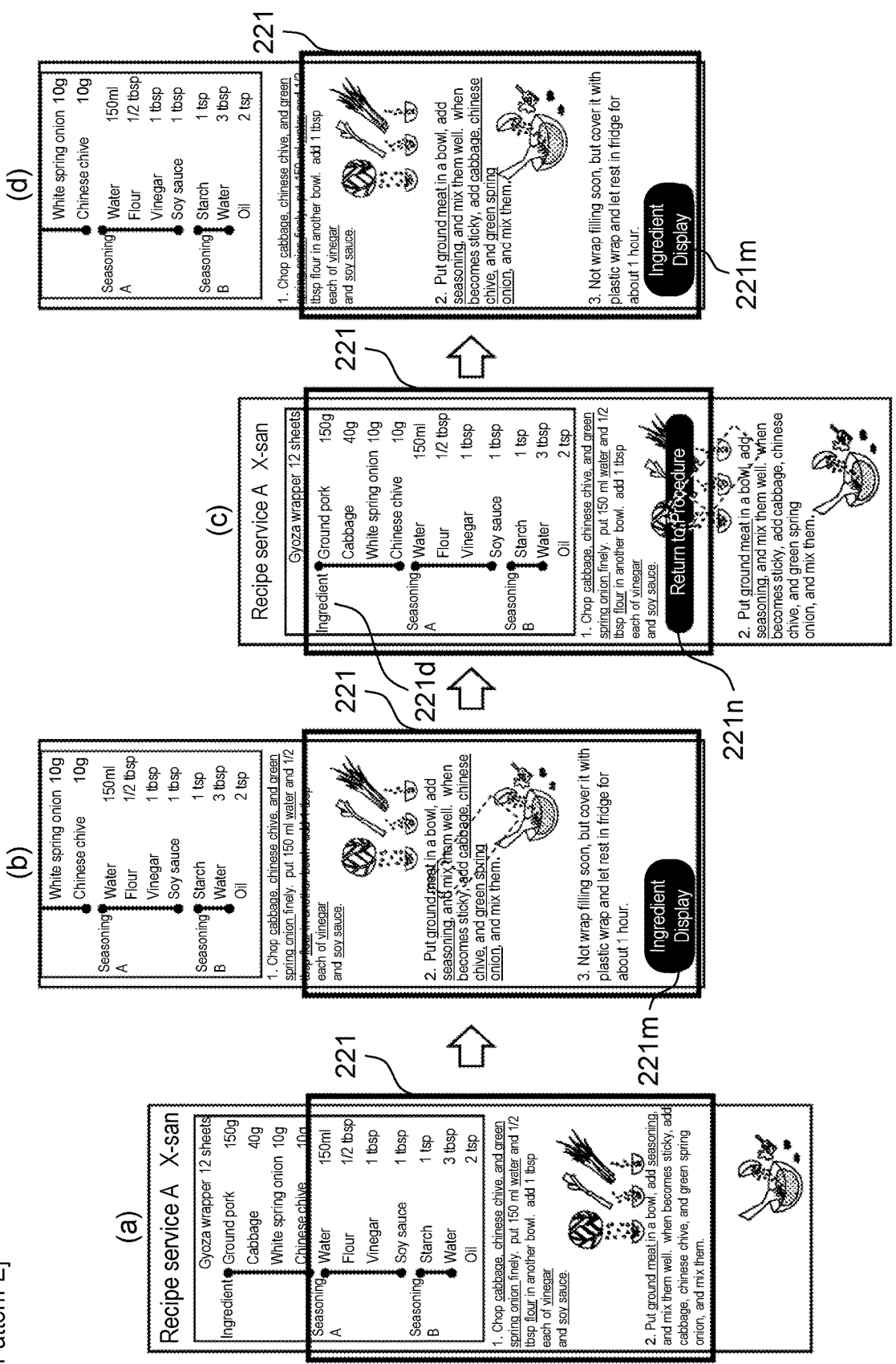
FIG. 37 is a diagram illustrating the allocation display format of Pattern E.

As shown in FIG. 37, the allocation display format of Pattern E has, at an upper portion of display screen 221, link-destination guide display area 221d in which the ingredients in the ingredient list are displayed. The format has procedure return button 221n for returning to the original procedure.

When the user scrolls the cooking recipe and so the ingredient list goes out of sight (see diagram (a) of FIG. 37), the user will tap an ingredient (in FIG. 37, ground meat) appearing in the procedure being displayed (see diagram (b) of FIG. 37). Then display screen 221 is automatically scrolled, thereby causing the ingredient list to be displayed on display screen 221 (see diagram (c) of FIG. 37). That is, upon the user's tapping on the linked ingredient, it causes a jump by scrolling to the ingredient list, thereby displaying the ingredient list on display screen 221. In this case, the ingredient tapped by the user is preferably displayed in the top line of display screen 221. For ease of recognition, the characters indicating the ingredient tapped are preferably subjected to highlighting, such as, coloring, adding a background color, and changing the thickness and font.

Simultaneously with the displaying of the ingredient list, procedure return button 221n is displayed. When the user taps on procedure return button 221n, display screen 221 is automatically scrolled to the original procedure that had been displayed before the linked ingredient was tapped (see diagram (d) of FIG. 37). That is, upon user's tapping on procedure return button 221n, the screen jumps to the original procedure and displays it on display screen 221.

The allocation display format of Pattern E may have ingredient display button 221m, as shown in FIG. 37, that is intended to cause the ingredient list to be displayed on display screen 221. In the case where the ingredient list is not displayed on display screen 221, user's tapping on ingredient display button 221m causes display screen 221 to be automatically scrolled, resulting in displaying of the ingredient list on display screen 221. That is, upon tapping on ingredient display button 221m, it causes a jump by scrolling to the ingredient list, thereby displaying the ingredient list on display screen 221.

As described above, the displaying of a cooking recipe on display screen 221 in accordance with the allocation display format of Pattern E allows the cooking recipe to be displayed on display screen 221 in an easy-to-see manner without scrolling so much.

Modified Examples of First Exemplary Embodiment

Modified examples of the first exemplary embodiment will be described.

In the first embodiment, in the case where the ingredient list and the procedures are simultaneously displayed, all ingredients are displayed in the ingredient list in the same manner even though not all ingredients are shown in the procedures. However, the present disclosure is not limited this.

Figure 38:
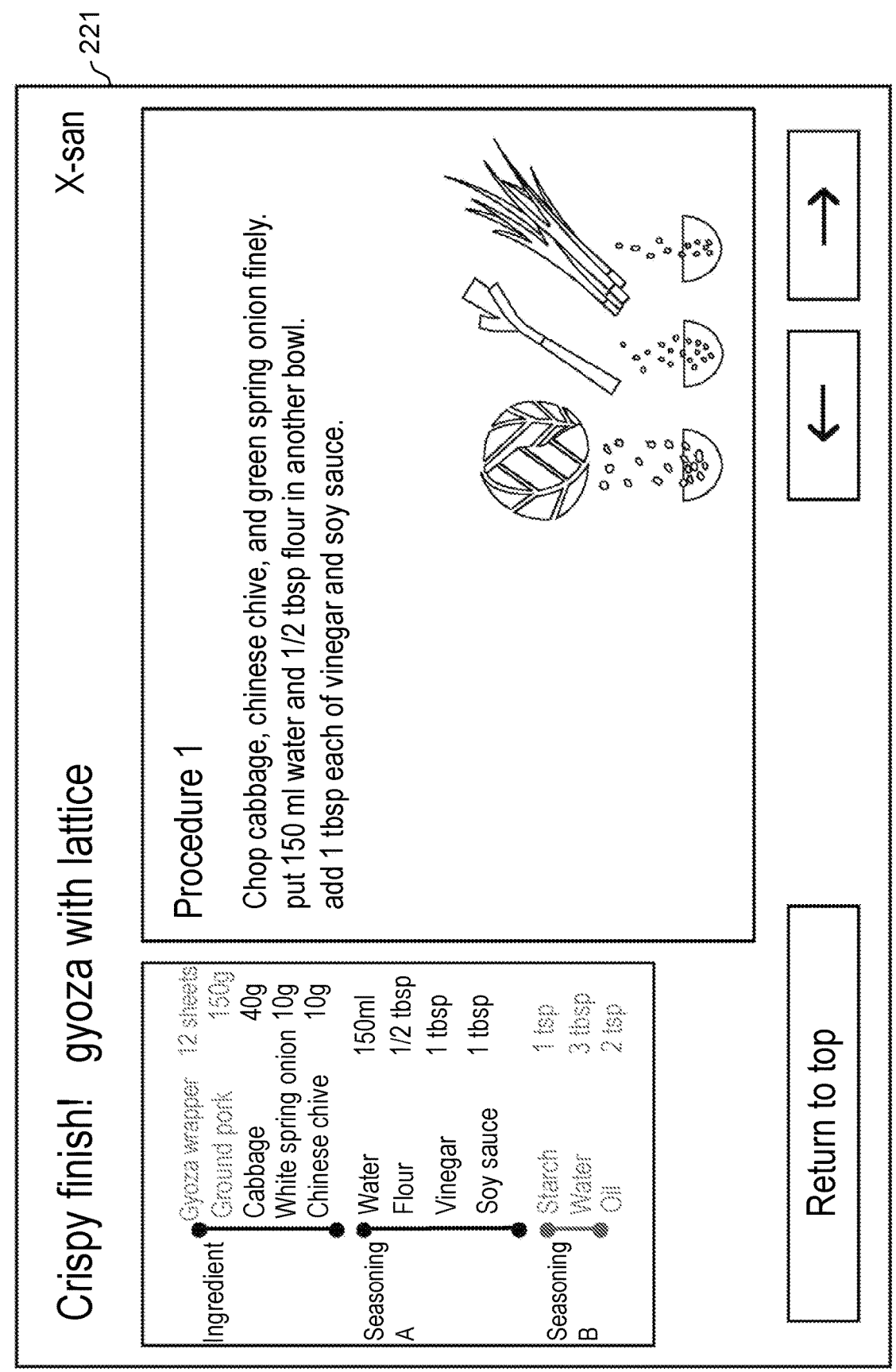
FIG. 38 is a diagram illustrating a first specific example for illustrating a cooking-recipe display system according to a modified example of the first embodiment.

Specifically, as shown in FIGS. 38 and 39, of a plurality of the ingredients in the ingredient list, ingredients (ingredients unnecessary for a procedure) which are not contained in the procedure being displayed on display screen 221 may be non-highlighted. That is, in the case where the ingredient list and procedures are simultaneously displayed, the cooking recipe is displayed on display screen 221 while non-highlighting unnecessary ingredients, in which case the unnecessary ingredients are, of a plurality of the ingredients in the ingredient list, ones that do not appear in the procedure being displayed in display screen 221.

FIGS. 38 and 39 show the examples in which the cooking recipe regarding "Gyoza with Lattice: 2-servings" shown in FIG. 3 is displayed in accordance with the allocation display format of Pattern A in landscape mode. In this case, in FIG. 38, only Procedure 1 is displayed in the procedure area. That is, of the ingredients in the ingredient list, "gyoza wrapper," "ground pork," "starch," "water," and "oil" are unnecessary ingredients that do not appear in Procedure 1. Therefore, the characters of the ingredients and information regarding them are dimmed. In FIG. 39, only Procedures 3 and 4 are displayed in the procedure area. That is, of the ingredients in the ingredient list, the ingredients except "gyoza wrapper" are unnecessary ingredients that do not appear in Procedures 3 and 4. Therefore, the characters of the ingredients except "gyoza wrapper" and the information regarding them are dimmed.

In this way, of a plurality of the ingredients in the ingredient list, the user can easily understand the necessary ingredients that appear in the procedure being displayed on display screen 221, by non-highlighting the ingredients unnecessary for the procedure.

The method of non-highlighting includes dimming these displayed characters that indicate the ingredient unnecessary for a procedure, as shown in FIGS. 38 and 39. However, the present disclosure is not limited to this. The non-highlighting may be made by reducing the size of the characters that indicate the ingredient unnecessary for the procedure, or by displaying the characters by dashed lines. Alternatively, the ingredient unnecessary for the procedure may be not displayed. Server 100 or controller 210 of information terminal 200 can performing such processing.

Second Exemplary Embodiment

Cooking-recipe display system 52 according to a second exemplary embodiment of the present disclosure will be described. In the embodiment, elements having configurations identical to those in the first embodiment are designated by the same numerals and symbols, and their duplicate explanations are omitted.

Figure 40:
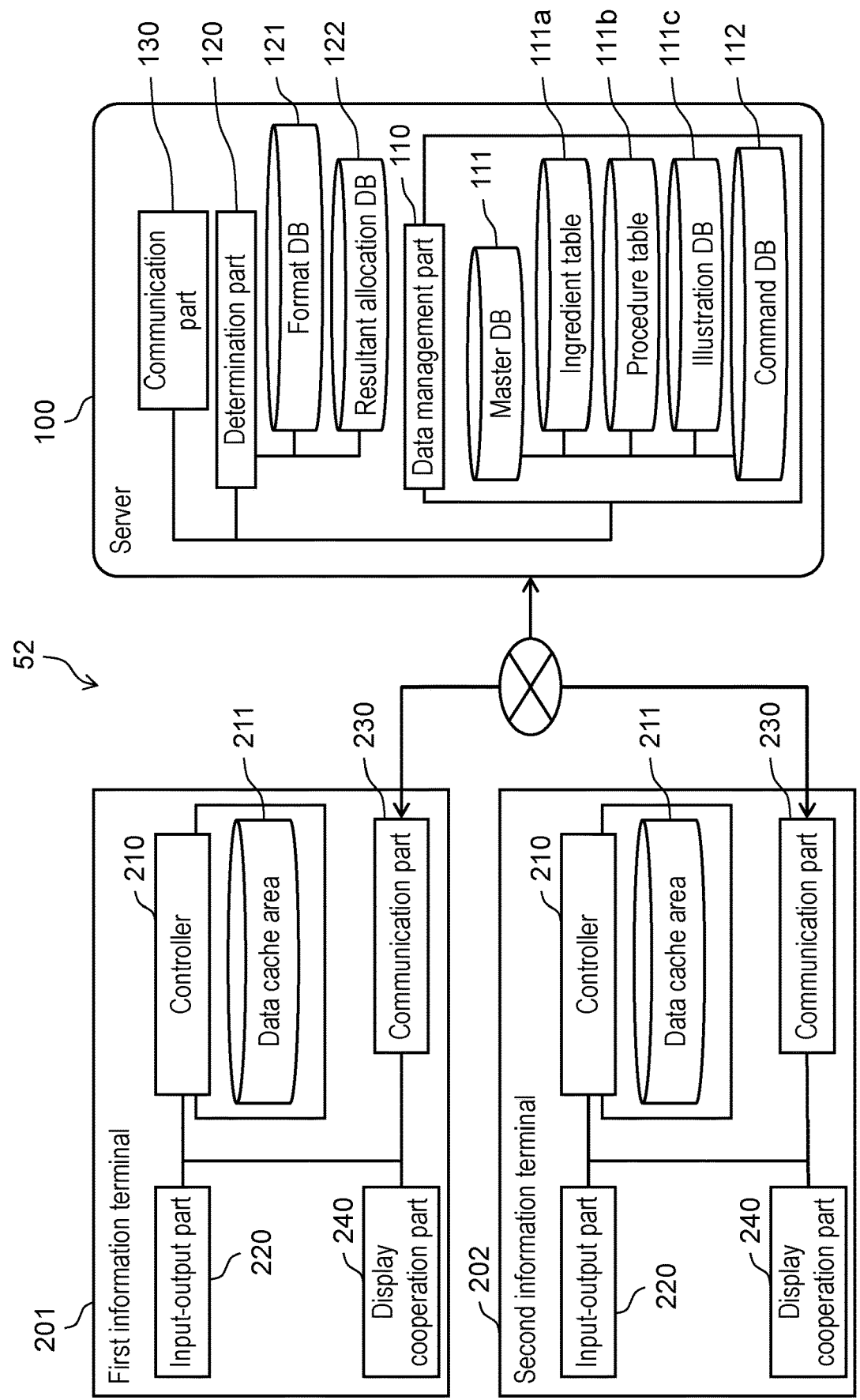
FIG. 40 is a block diagram illustrating a configuration of a cooking-recipe display system according to a second embodiment.

With reference to FIG. 40, an overall configuration of cooking-recipe display system 52 is described. FIG. 40 is a block diagram illustrating the configuration of cooking-recipe display system 52.

As shown in FIG. 40, cooking-recipe display system 52 includes server 100, first information terminal 201, and second information terminal 202. Although not shown, cooking-recipe display system 52 as well may include home electric appliance 300.

Server 100, first information terminal 201, and second information terminal 202 are connected to each other via a network such as the Internet.

Cooking-recipe display system 52 can also perform the same processing as cooking-recipe display system 51 according to the first embodiment. Therefore, as in the case of cooking-recipe display system 51, a cooking recipe can be displayed on display screen 221 in an easy-to-see manner without scrolling so much.

In cooking-recipe display system 52, first information terminal 201 and second information terminal 202 each have a different configuration from that of information terminal 200 according to the first embodiment. Each of first information terminal 201 and second information terminal 202 further includes display cooperation part 240 in addition to the configuration of information terminal 200.

Display cooperation part 240 in first information terminal 201 performs both display cooperation inside first information terminal 201 and display cooperation between first information terminal 201 and second information terminal 202. Display cooperation part 240 in second information terminal 202 performs both display cooperation inside second information terminal 202 and display cooperation between second information terminal 202 and first information terminal 201.

Although not shown, cooking-recipe display system 52 may include a third information terminal that has the same configuration as those of first information terminal 201 and second information terminal 202. That is, cooking-recipe display system 52 includes a plurality of information terminals.

Cooking-recipe display system 52 is characterized in that display cooperation parts 240 perform display cooperation inside the individual information terminals or among the plurality of information terminals.

With cooking-recipe display system 52, the display cooperation is performed inside the individual information terminals or among the plurality of information terminals, thereby switching display mode in accordance with the display cooperation table shown in FIG. 41. That is, of Patterns A to E, it is determined which pattern in the allocation display format is used to display the cooking recipe. The display restriction table shown in FIG. 41 is stored in server 100 or in first information terminal 201 and second information terminal 202.

In FIG. 41, the smartphone, tablet terminal, and smart display are each any one of first information terminal 201 and second information terminal 202.

Figure 42:
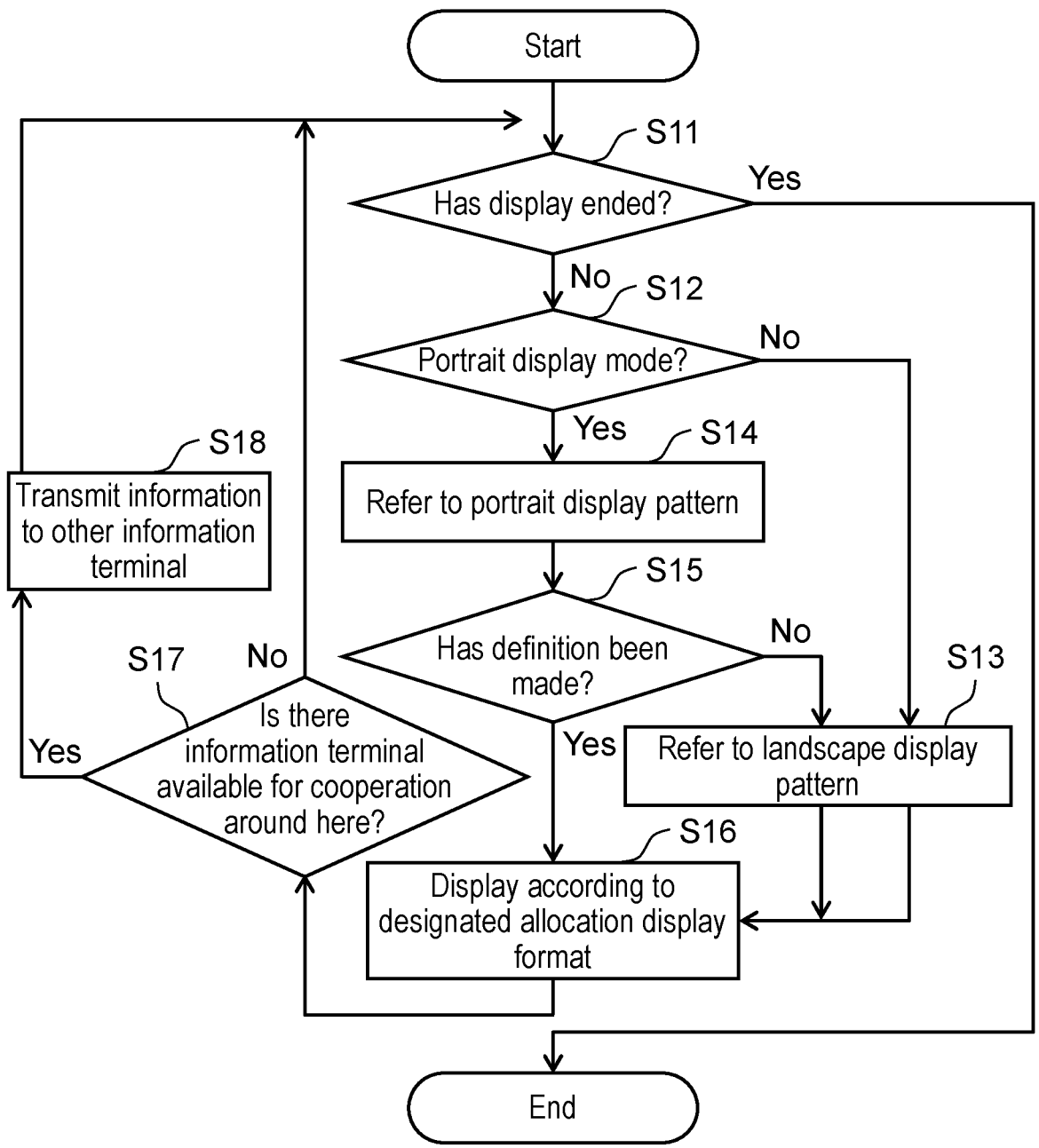
FIG. 42 is a flowchart illustrating display-mode switching processing according to the second embodiment.
Figure 43:
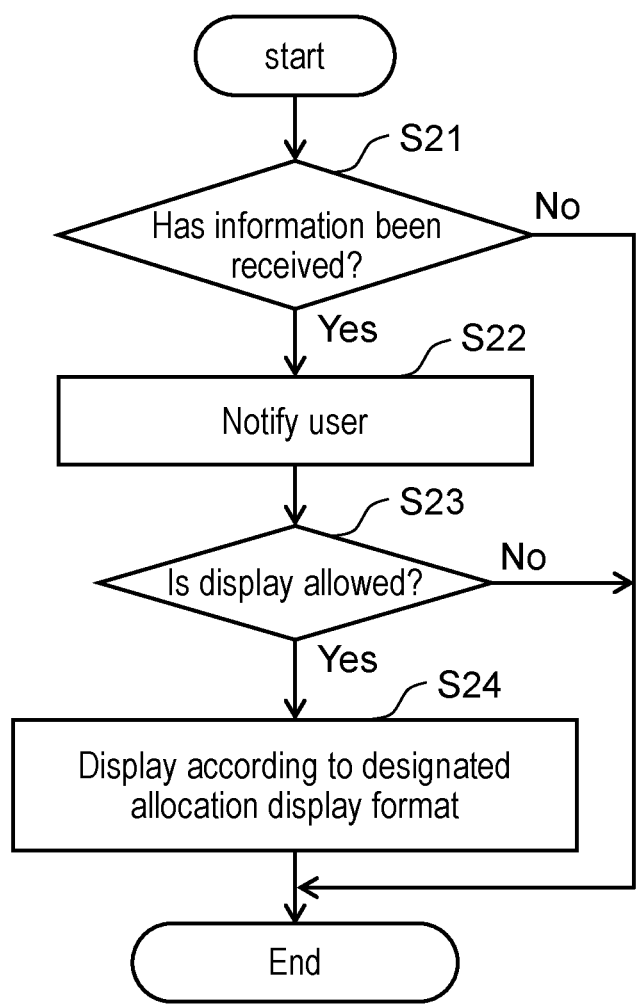
FIG. 43 is a flowchart illustrating cooperation processing among a plurality of information terminals according to the second embodiment.

FIG. 42 is a flowchart of display-mode switching processing in the present embodiment. FIG. 43 is a flowchart of cooperation processing among a plurality of information terminals in the present embodiment. According to these flowcharts, the display cooperation is performed inside the individual information terminals or among the plurality of information terminals, thereby switching the display mode. The processing described below is performed by display cooperation parts 240, shown in FIG. 40, of first information terminal 201 and second information terminal 202.

As shown in FIG. 42, in Step S11, display cooperation part 240 of first information terminal 201 determines whether the display on the first information terminal has ended or not. In the case where the display on the first information terminal has ended (in the case of "Yes" in Step S11), the switching processing of display mode is caused to end.

In the case where the display has not ended ("No" in Step S11), in Step S12, display cooperation part 240 of first information terminal 201 determines whether the current display mode of first information terminal 201 is a portrait mode or not. In the case where the current display mode of first information terminal 201 is not a portrait mode (in the case of "No" in Step S12), in Step S13, a landscape-mode pattern of the allocation display format is referred to. In Step S16, display cooperation part 240 of first information terminal 201 executes display in accordance with the designated allocation display format.

In the case where the current display mode of first information terminal 201 is a portrait mode (in the case of "Yes" in Step S12), in Step S14, a portrait-mode pattern of the allocation display format is referred to. In Step S15, display cooperation part 240 of first information terminal 201 determines whether a portrait-mode pattern has been defined in first information terminal 201 or not.

In the case where a portrait-mode pattern is not defined (in the case of "No" in Step S15), in Step S13, a landscape-mode pattern of the allocation display format is referred to. In Step S16, display cooperation part 240 of first information terminal 201 executes the display in accordance with the designated allocation display format.

In the case where a portrait-mode pattern is defined (in the case of "Yes" in Step S15), in Step S16, display cooperation part 240 of first information terminal 201 executes the display in accordance with the designated allocation display format.

After the processing of Step S16, in Step S17, display cooperation part 240 of first information terminal 201 determines whether there exists, around first information terminal 201, second information terminal 202 which is another information terminal available for getting the cooperation.

In the case where second information terminal 202 does not exist around there (in the case of "No" in Step S17), display cooperation part 240 of first information terminal 201 performs the display-mode switching processing again.

In the case, in Step S17, where second information terminal 202 exists around there (in the case of "Yes" in Step S17), in Step S18, display cooperation part 240 of first information terminal 201 transmits information containing the recipe ID to second information terminal 202.

As shown in FIG. 43, in Step S21, display cooperation part 240 of second information terminal 202 determines whether the information containing the recipe ID has been received from first information terminal 201 or not. In the case where second information terminal 202 has not received the information containing the recipe ID from first information terminal 201 (in the case of "No" in Step S21), display cooperation part 240 of second information terminal 202 causes the cooperation processing between first information terminal 201 and second information terminal 202 to end.

In the case where the information has been received from first information terminal 201 (in the case of "Yes" in Step S21), in Step S22, display cooperation part 240 of second information terminal 202 notifies the user of a query whether to display the cooking recipe in accordance with the information containing this recipe ID. That is, the user of second information terminal 202 is notified of the query whether to display the cooking recipe also on second information terminal 202, with the cooking recipe being currently displayed on first information terminal 201.

In Step S23, the user of second information terminal 202 decides whether to allow the display or not. In the case where the display is not allowed (in the case of "No" in Step S23), display cooperation part 240 of second information terminal 202 causes the cooperation processing between first information terminal 201 and second information terminal 202 to end.

In the case where the display is allowed (in the case of "Yes" in Step S23), in Step S24, display cooperation part 240 of second information terminal 202 causes this cooking recipe to be displayed on the display screen of the second information terminal in accordance with the designated allocation display format.

FIGS. 44 and 45 shows specific examples of the processing described above. In the examples shown in FIGS. 44 and 45, the display mode is switched in accordance with the display cooperation table shown in FIG. 41.

FIG. 44 shows the example in which the user changes the display mode in one smartphone (first information terminal 201).

Diagram (a) of FIG. 44 illustrates the situation where the user, during moving, is viewing the procedures of the cooking recipe that has been acquired by searching with the smartphone. The cooking recipe shown in FIG. 44 is one regarding "Gyoza with Lattice: 2-servings" shown in FIG. 3. In diagram (a) of FIG. 44, the smartphone displays the cooking recipe in the allocation display format of Pattern B in portrait mode.

After that, as shown in diagram (b) of FIG. 44, by switching the display mode in the smartphone during moving, the cooking recipe is then displayed in the allocation display format of Pattern B in landscape mode.

In this way, with the same information terminal, it is possible to switch the display mode while inheriting the pattern.

FIG. 45 shows an example in which the user, during moving, causes a tablet terminal (second information terminal 202) to inherit the setting of the allocation display format from the smartphone (first information terminal 201).

As in the case of diagram (a) of FIG. 44, diagram (a) of FIG. 45 illustrates the situation where the user is viewing, during moving, the procedures of the cooking recipe that has been acquired by searching with the smartphone. The cooking recipe shown in FIG. 45 is the same as that shown in FIG. 44. In diagram (a) of FIG. 45, the smartphone displays the cooking recipe in the allocation display format of Pattern B in portrait mode.

Then after return home, as shown in diagram (b) of FIG. 45, when using a tablet terminal to view the procedures of the cooking recipe, the user can transfer the pattern of display mode of the smartphone to the tablet terminal, which allows the tablet terminal to display the cooking recipe in the allocation display format of Pattern B in landscape mode.

In this way, it is possible to inherit the pattern of display mode between first information terminal 201 and second information terminal 202.

Third Exemplary Embodiment

Cooking-recipe display system 53 according to a third exemplary embodiment of the present disclosure will be described. In the embodiment, elements having configurations identical to those in the first and second embodiments are designated by the same numerals and symbols, and their duplicate explanations are omitted.

Figure 46:
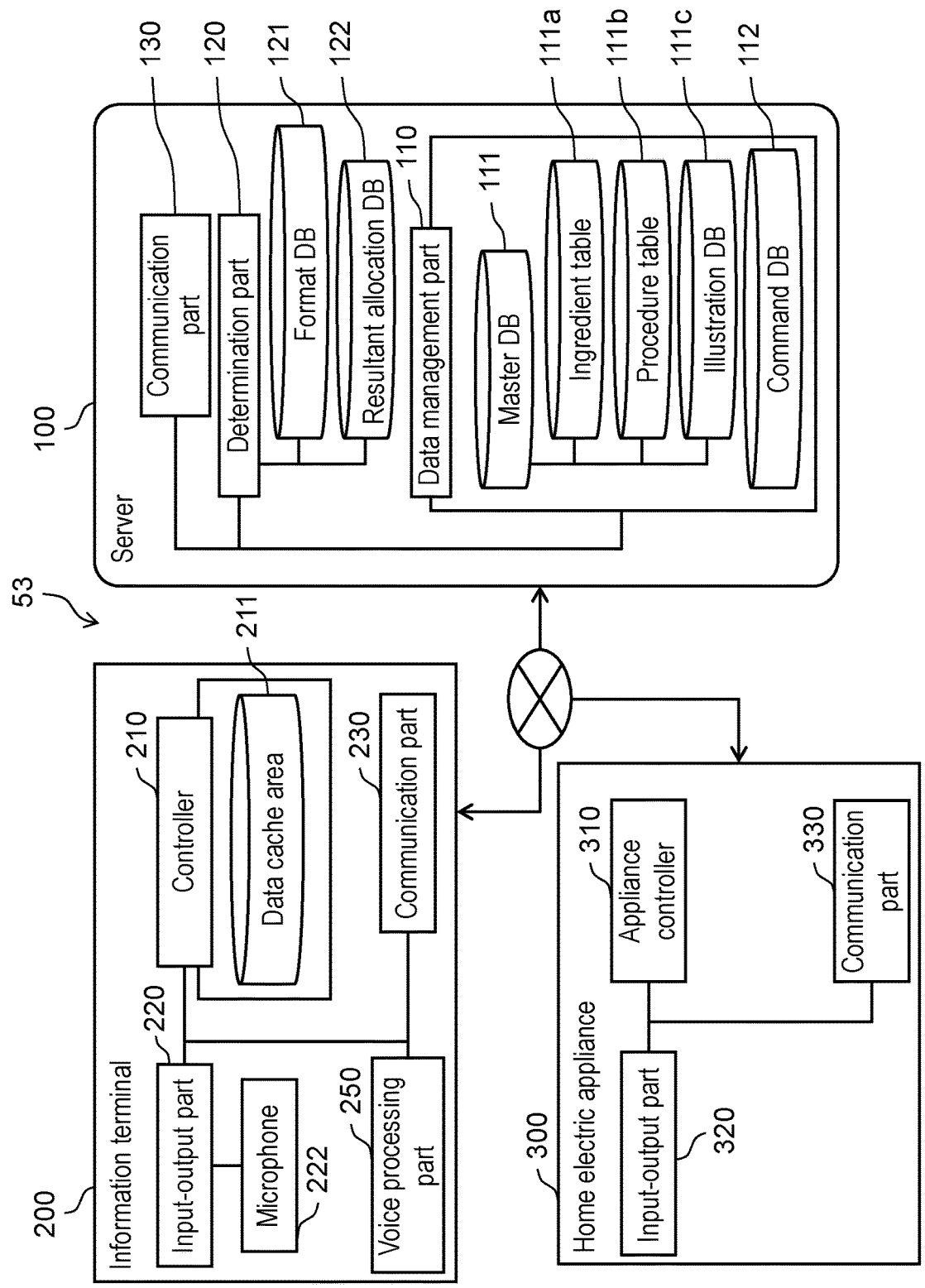
FIG. 46 is a block diagram illustrating a configuration of a cooking-recipe display system according to a third embodiment.

With reference to FIG. 46, an overall configuration of cooking-recipe display system 53 is described. FIG. 46 is a block diagram illustrating the configuration of cooking-recipe display system 53.

As shown in FIG. 46, cooking-recipe display system 53 includes, as in the case of the first embodiment, server 100, information terminal 200, and home electric appliance 300.

Cooking-recipe display system 53 can also perform the same processing as cooking-recipe display system 51 according to the first embodiment. Therefore, as in the case of cooking-recipe display system 51, a cooking recipe can be displayed on display screen 221 in an easy-to-see manner without scrolling so much.

In cooking-recipe display system 53, first information terminal 200 has a configuration different from that of information terminal 200 according to the first embodiment. Information terminal 200 according to the embodiment further includes, in addition to the configuration of information terminal 200 according to the first embodiment, microphone 222 and voice processing part 250.

Microphone 222 is one example of an input part for receiving sound information such as voice uttered by a user. Voice processing part 250 performs predetermined control processing in accordance with the sound information received by microphone 222.

Cooking-recipe display system 53 is characterized in that voice processing part 250 performs various types of processing on the sound information received by microphone 222.

Figure 47:
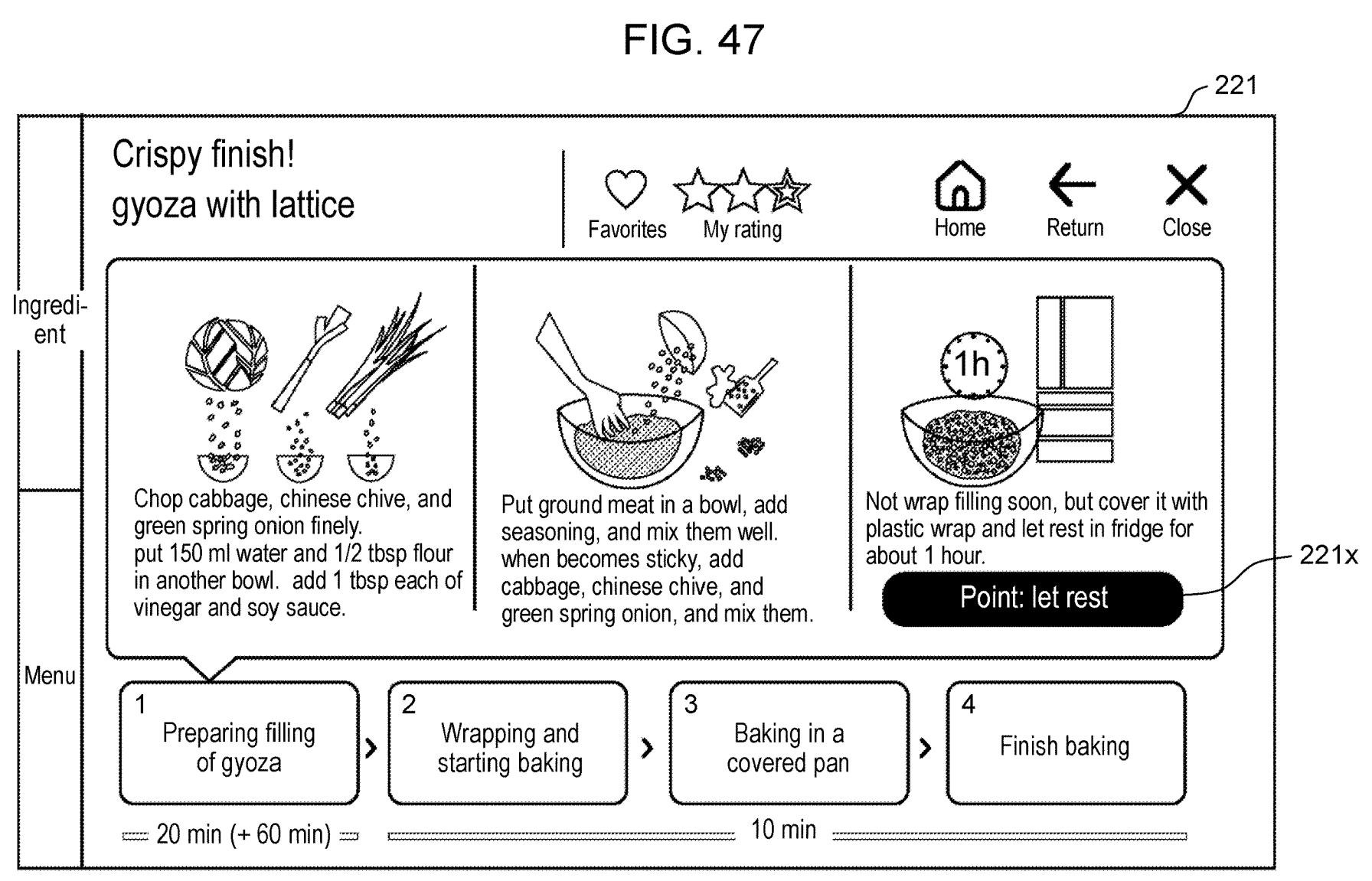

As shown in FIG. 47, when designation mark 221x is displayed on display screen 221, with the designation mark indicating a tip or point of cooking contained in the procedures of the cooking recipe, a link instruction is given, by a voice, regarding the tip or point of cooking contained in the procedures. Designation mark 221x is associated with the information that indicates the meaning and the like of the character string constituting designation mark 221x.

In the example shown in FIG. 47, display screen 221 displays designation mark 221x consisting of the character string "Point: Let rest." In this case, the user utters a character string constituting designation mark 221x or, alternatively, another character string similar to this character string. Such another character string similar to this string is, for example, "Point, let it sit." Information terminal 200 receives the user's voice via microphone 222. Voice processing part 250 analyzes the thus-received voice, and thereby recognizes that the user has uttered the voice relating to the character string described in designation mark 221x. With this configuration, information terminal 200 outputs, as a voice from a loudspeaker, the information that indicates the meaning and the like of the character string constituting designation mark 221x. Specifically, the information is point information that shows the purpose or the like of letting the filling rest in a refrigerator for about one hour. That is, the uttering of designation mark 221x gives the link instruction by voice.

Designation mark 221x may be an operation button. In this case, when the user taps designation mark 221x, information terminal 200 may output point information by voice from a loudspeaker. When designation mark 221x being an operation button is tapped, information terminal 200 may display point information by characters on the display screen along with outputting the point information by voice or, alternatively, without outputting it by voice. The link instruction relating to the character string constituting designation mark 221x contained in the procedure, may be given not by voice but by user's gesture.

Figure 48:
FIG. 48 is a diagram illustrating a second specific example of the display screen of the information terminal according to the third embodiment.

The character string that gives a link instruction is not limited to that indicating a tip or point of cooking. The example shown in FIG. 48 is such that, in the procedure of a cooking recipe, display screen 221 displays designation mark 221y that indicates cooperation with an appliance cooperation system. In this case, the link instruction may be given by voice for the appliance cooperation system included in the procedure. Designation mark 221y is associated with the appliance cooperation system that designation mark 221y includes.

In the example shown in FIG. 48, display screen 221 displays designation mark 221y consisting of the character string "Refrigerator: Transmit temperature setting." In this case, the user utters a character string constituting designation mark 221y or, alternatively, another character string similar to this character string. Such another character string similar to this string is, for example, "Refrigerator, Temperature setting, Transmission." Information terminal 200 receives the user's voice via microphone 222. Voice processing part 250 analyzes the thus-received voice, and thereby recognizes that the user has uttered the voice relating to the character string described in designation mark 221y. With this configuration, information terminal 200 utters the character string constituting designation mark 221y, thereby transmitting the command to the appliance cooperation system. That is, the link instruction is given by voice. Specifically, in the example shown in FIG. 48, information terminal 200 transmits, to the refrigerator, the temperature setting command that contains temperature information necessary for the procedure. Upon receiving the temperature setting command, the refrigerator adjusts the temperature inside the refrigerator in accordance with the set temperature indicated by the temperature setting command.

Designation mark 221y may be an operation button. In this case, when the user taps designation mark 221y, the temperature setting command is transmitted to the refrigerator. The link instruction relating to the character string constituting designation mark 221y contained in the procedure, may be given not by voice but by user's gesture.

Figure 49:
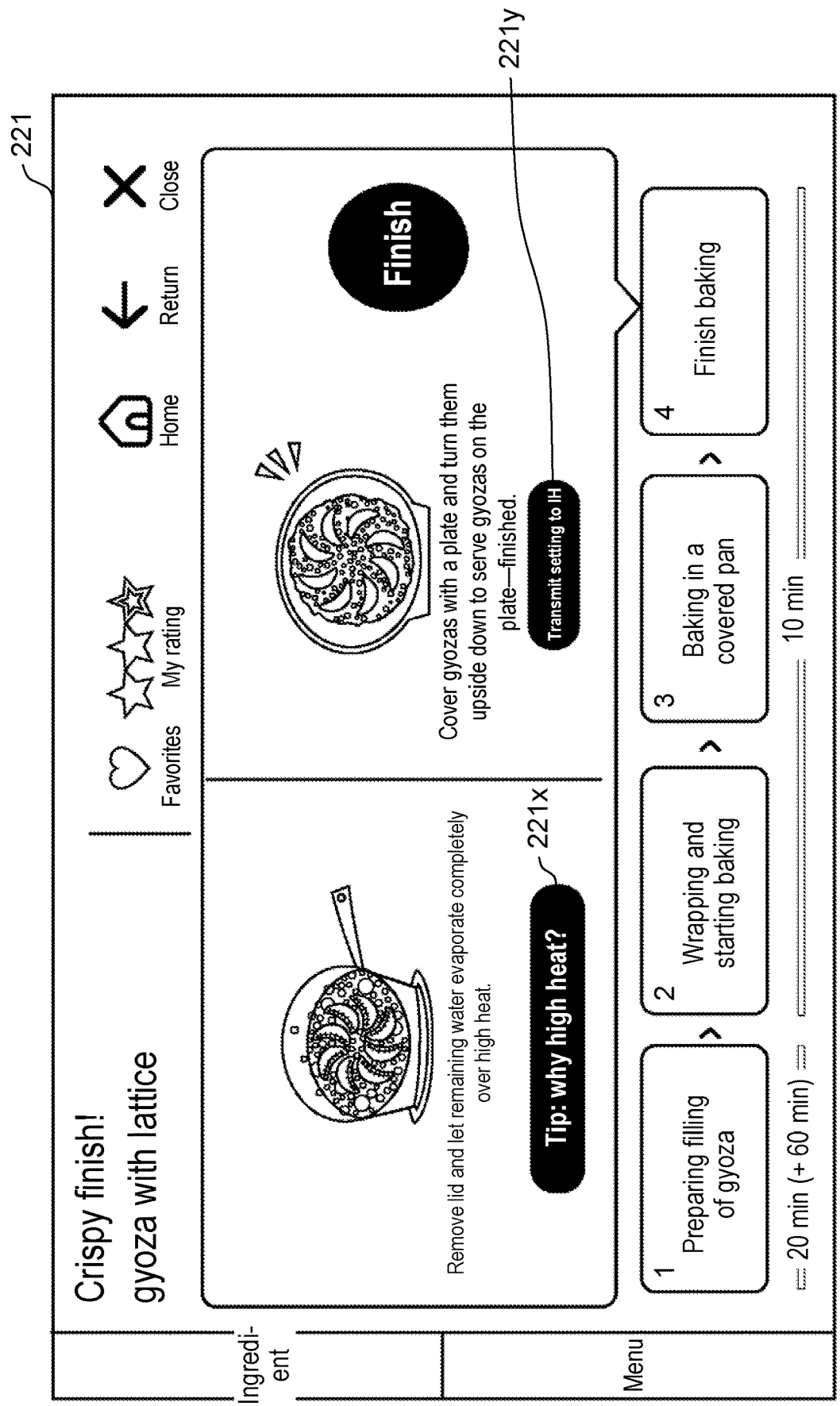
FIG. 49 is a diagram illustrating a third specific example of the display screen of the information terminal according to the third embodiment.

In the example shown in FIG. 49, designation mark 221x and designation mark 221y are displayed. Designation mark 221x indicates a tip consisting of the character string "Tip: Why high heat?" Designation mark 221y indicates the cooperation with an appliance cooperation system expressed by the character string "Transmit setting to IH." Even in this case, the user can give the link instruction, like one described above, by uttering these character strings or other character strings similar to these character strings.

Figure 50:
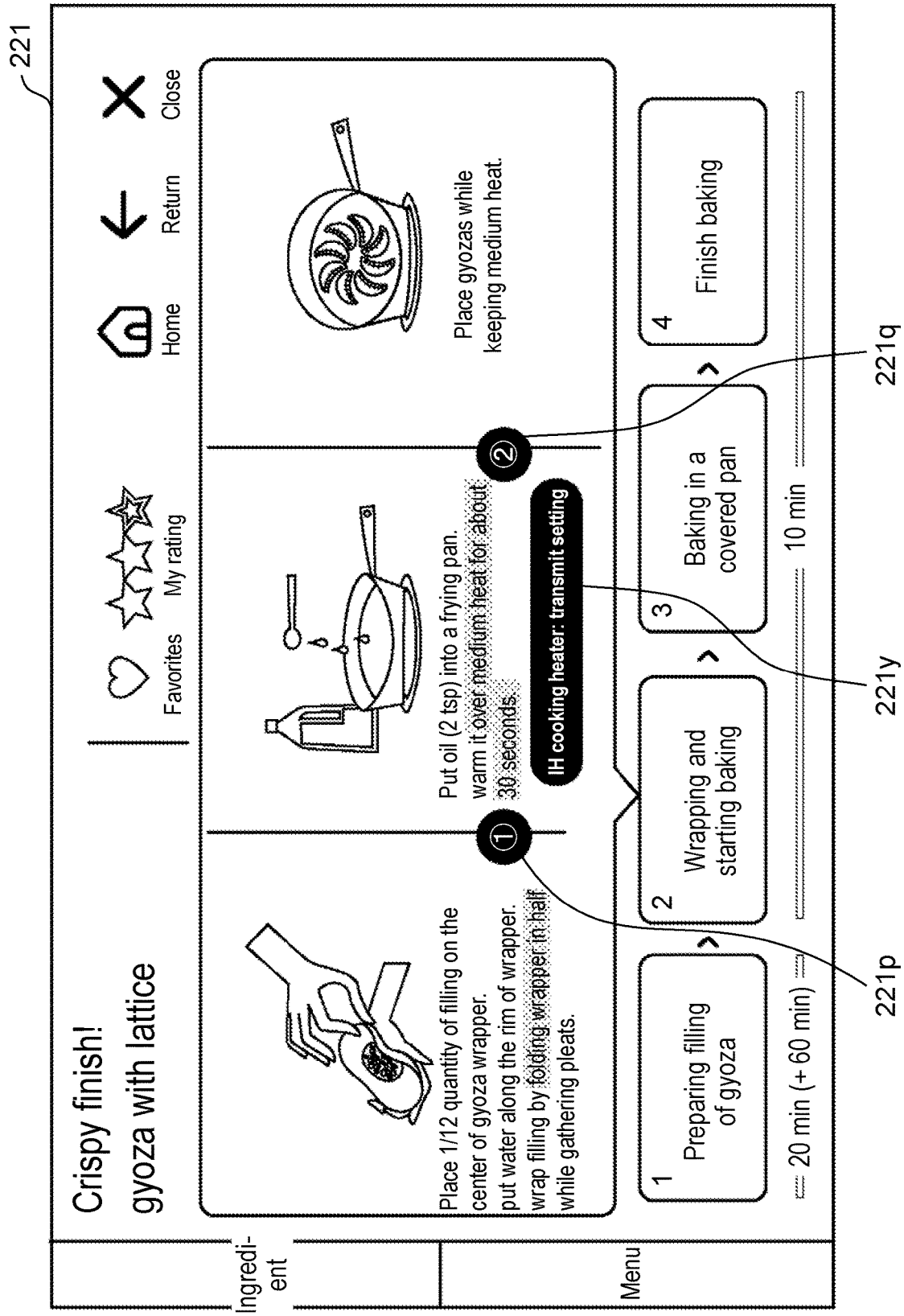
FIG. 50 is a diagram illustrating a fourth specific example of the display screen of the information terminal according to the third embodiment.

In the example shown in FIG. 50, the user utters characters relating to icons 221p and 221q that are disposed around character strings contained in the procedures displayed on display screen 221, thereby giving link instructions relating to these character strings. Specifically, user's uttering of icon 221p, i.e., the numeral FIG. 1 circled (for example, uttering "Tell me about 1") results in the outputting by voice or the displaying by characters of information regarding a tip of "Fold in half" that is a character string located around this icon 221p. Like this, user's uttering of icon 221q, i.e., the numeral FIG. 2 circled (for example, uttering "Tell me about 2") results in the outputting by voice or the displaying by characters of information regarding a tip of "Over medium heat for about 30 seconds" that is a character string located around this icon 221q. As to the information regarding the tips, "Fold in half" and "Over medium heat for about 30 seconds," it is preferable to change the color, font, or size, etc. of the characters, or to change the background color of the characters (highlighted display or the like).

Of the character strings contained in the procedures displayed on display screen 221, the user may utter a decorated character string, thereby giving the link instruction relating to this decorated character string. In the example shown in FIG. 50, the character strings, "Fold in half" and "Over medium heat about 30 seconds," are decorated by a background color. When the user utters these character strings or other ones similar to these character strings, the information regarding a tip of "Fold in half" or "Over medium heat about 30 seconds" is output by voice or displayed by characters.

Also, in the example shown in FIG. 50, designation mark 221y consisting of the character string "IH cooking heater: Medium heat Transmission" is displayed. In this case, designation mark 221y indicates the cooperation with the appliance cooperation system. By uttering the character string, the user can give the link instruction regarding the temperature setting to the IH cooking heater.

Other Modified Examples

Up to this point, the present disclosure has been described in accordance with the first to third embodiments. However, the present disclosure is not limited to the first to third embodiments.

In the first to third embodiments, the display restriction table of an allocation display format is such that the display restriction information of each of the plurality of procedures is the number of characters contained in the procedure, the number of illustrations contained in the procedure, or the number of home electric appliances in an appliance cooperation system contained in the procedure. However, the present disclosure is not limited to this. Specifically, the display restriction information of each of the plurality of procedures may include any one of a tip of cooking, a timer, a substitute-food material, and an appliance cooperation link. In this case, controller 210 of information terminal 200 preferably adjusts the procedures displayed on display screen 221. Specifically, the number of each of the tip of cooking, the timer, the substitute-food material, and the appliance cooperation link which appear on display screen 221 is restricted to not larger than the upper limit specified in the display restriction information.

In the first to third embodiments, the switching between various displays is performed by tapping a button displayed on display screen 221 of information terminal 200. Such switching between various displays includes, such as, switching between displays of the ingredient area and procedure area, switching between displays of the ingredient tab and procedure tab, and switching between displays of the procedures displayed in the procedure area. However, the present disclosure is not limited to this. By uttering either the character string described at an operation button displayed on display screen 221 or a character string relating to an icon disposed around the character string of a procedure, the switching of the displays regarding these character strings may be performed.

In the first to third embodiments, the allocation display format specifies the arrangement, on display screen 221, of the procedures of the cooking recipe and the ingredients of the cooking recipe. However, the present disclosure is not limited to this. Other than the procedures of the cooking recipe and the ingredients of the cooking recipe, the allocation display format may also specify the arrangement, on display screen 221, of the name of the cooking recipe, the summary statement of features of a dish described in the cooking recipe, and the buttons. That is, it is only required for the allocation display format to specify the arrangement of at least the procedures of the cooking recipe. Therefore, other than the procedures of the cooking recipe, the allocation display format may specify the arrangement of at least one of the name of the cooking recipe, the summary statement of features of a dish described in the cooking recipe, the ingredients of the cooking recipe, and the buttons.

In the first to third embodiments, the cooking recipe relates to food. However, the present disclosure is not limited to this. The cooking recipe may also relate to drink.

The cooking-recipe display systems according to the first to third embodiments may be each configured with an aspect of method of displaying a cooking recipe. The method of displaying this cooking recipe is such that, from a plurality of cooking recipes each of which contains both a plurality of procedures indicating a way of cooking and a plurality of ingredients of the cooking, one cooking recipe containing a plurality of procedures is selected, in which case an allocation display format is determined that indicates an arrangement, on a display screen, of the plurality of procedures of the one cooking recipe. This allocation display format is used in displaying this cooking recipe on the display screen of an information terminal.

The cooking-recipe display systems according to the first to third embodiments may be each configured as a program for causing a computer to execute the above-mentioned method of displaying a cooking recipe. The program of this aspect may be stored in a computer-readable recording medium. The recording medium may be a ROM, CD-ROM (compact disc read only memory), magnetic tape, flexible disk, hard disk, DVD (digital versatile disc), BD (blu-ray disc), or semiconductor memory.

INDUSTRIAL APPLICABILITY

The cooking-recipe display system according to the present disclosure is useful in cases where an information terminal is used for cooking.

REFERENCE MARKS IN THE DRAWINGS

51, 52, 53 cooking-recipe display system
100 server
110 data management part
111 master database
111*a* ingredient table
111*b* procedure table
111*c* illustration database
112 command database
120 determination part
121 format database
122 resultant allocation database
130, 230, 330 communication part
200 information terminal
201 first information terminal
202 second information terminal
210 controller
211 data cache area
220, 320 input-output part
221 display screen
221*a* ingredient display area
221*b* supplementary display area
221*c* extension display area
221*d* link-destination guide display area
221*m* ingredient display button
221*n* procedure return button
221*p*, 221*q* icon
221*x*, 221*y* designation mark
222 microphone
240 display cooperation part
250 voice processing part
300 home electric appliance
310 appliance controller

The invention claimed is:

1. A cooking-recipe display system, comprising:
an information terminal including:
  a display screen; and
  a controller configured to control:
a data management part including a recipe group master containing a plurality of cooking recipes, each of the plurality of cooking recipes containing both a plurality of procedures indicating a way of cooking a dish and a plurality of ingredients of the dish; and
a determination part configured to determine an allocation display format indicating an arrangement, on the display screen, of the plurality of procedures and ingredients contained in one cooking recipe selected from the plurality of cooking recipes,
wherein the allocation display format specifies a display restriction table containing display restriction information restricting an expression, on the display screen, concerning each of the plurality of procedures and ingredients, and wherein the controller is configured to cause the one cooking recipe to be displayed on the display screen in the allocation display format.

2. The cooking-recipe display system according to claim 1, wherein the recipe group master contains a procedure table having the plurality of procedures for each of the plurality of cooking recipes, wherein the determination part is configured to:

extract, from the procedure table, the plurality of procedures contained in the one cooking recipe with reference to the recipe group master, compare information regarding each of the plurality of procedures extracted with the display restriction information, and generate a resultant allocation data by determining the arrangement of the plurality of procedures on the display screen such that the information regarding each of the plurality of procedures extracted satisfies a condition specified in the display restriction information, and wherein the controller is configured to cause the one cooking recipe to be displayed on the display screen in the allocation display format in accordance with the resultant allocation data generated by the determination part.

3. The cooking-recipe display system according to claim 2, wherein each of the plurality of procedures contained in the procedure table contains a character string, and wherein the determination part is configured to generate, in accordance with both a number of characters of each of the plurality of procedures extracted and the display restriction information regarding the number of characters, the resultant allocation data by determining the arrangement of the plurality of procedures on the display screen such that the information regarding each of the plurality of procedures satisfies the condition specified in the display restriction information.

4. The cooking-recipe display system according to claim 2, wherein, when the information regarding each of the plurality of procedures satisfies the condition specified in the display restriction information, the determination part defines, as constituents of a procedure group, at least two procedures of the plurality of procedures, wherein, when the information regarding each of the plurality of procedures does not satisfy the display restriction information, the determination part changes and defines the constituents of the procedure group in accordance with a requirement specified by the allocation display format, and wherein the determination part generates, as the resultant allocation data, the procedure group having the defined constituents.

5. The cooking-recipe display system according to claim 4, wherein each of the plurality of procedures contained in the procedure table contains a character string, and wherein, when a number of characters of each of the plurality of procedures extracted is not larger than an upper limit to the number of characters, the upper limit being specified in the display restriction information, the determination part adjusts an allocation of the procedure group.

6. The cooking-recipe display system according to claim 4, wherein the determination part calculates work time required for each of the procedure groups, and wherein the controller causes the calculated work time to be displayed on the display screen for each of the procedure groups.

7. The cooking-recipe display system according to claim 6, wherein the determination part manages, for each of the procedure groups, a label indicating an overview of each of the procedure groups, and wherein the controller causes a total of work times to be displayed on the display screen, each of the work times being required for the procedure group having an identical label.

8. The cooking-recipe display system according to claim 6, wherein selecting of the procedure group by a user causes the work time displayed on the display screen to vary.

9. The cooking-recipe display system according to claim 4, wherein an expression on the display screen is specified for each of the procedure groups, and wherein the controller adjusts at least one of the arrangement of the procedure displayed on the display screen and a size of the procedure displayed on the display screen such that each of the procedure groups satisfies the specified expression.

10. The cooking-recipe display system according to claim 1, wherein the display restriction information of each of the plurality of procedures contains information regarding any one of a tip of the cooking, a timer, a substitute-food material, and an appliance cooperation link, and wherein the controller adjusts the procedure displayed in the display screen such that a number of items appearing on the display screen is not larger than an upper limit to a number of the appliance cooperation links, the items including the tip of the cooking, the timer, the substitute-food material, and the appliance cooperation link, the upper limit being specified in the display restriction information.

11. The cooking-recipe display system according to claim 2, wherein the determination part generates, in accordance with both a number of illustrations contained in each of the plurality of procedures extracted and the display restriction information regarding the number of illustrations, the resultant allocation data by determining the arrangement of the plurality of procedures on the display screen such that the information regarding each of the plurality of procedures satisfies a condition for the number of illustrations, the condition being specified in the display restriction information.

12. The cooking-recipe display system according to claim 2, wherein the determination part generates the resultant allocation data by determining the arrangement of the plurality of procedures on the display screen such that not smaller than two procedures of the plurality of procedures extracted satisfies not smaller than two conditions specified in the display restriction information corresponding to the not smaller than two procedures of the plurality of procedures extracted.

13. The cooking-recipe display system according to claim 1, wherein the allocation display format specifies an arrangement of, other than the procedures of the one cooking recipe, at least one of a name of the one cooking recipe, a summary statement of a feature of the dish described in the one cooking recipe, an ingredient of the one cooking recipe, and a button.

14. The cooking-recipe display system according to claim 1, wherein the controller causes, of the plurality of ingredients, an ingredient not contained in the procedures displayed on the display screen either to be non-highlighted or to be not displayed.

15. The cooking-recipe display system according to claim 1, configured to perform, in response to an instruction either by voice or by gesture, either switching of a display mode of the display screen or calling of a link of a character string contained in the procedures.

16. The cooking-recipe display system according to claim 1, configured to perform switching of a display by uttering either a character string written on a button displayed on the display screen or a character string associated with an icon arranged around a character string of the procedures.

17. The cooking-recipe display system according claim 1, configured to give a link instruction relating to one of character strings contained in the procedures displayed on the display screen, by uttering either a decorated character string when the one of the character strings is the decorated character string or an icon arranged around the one of the character strings.

18. The cooking-recipe display system according to claim 1, wherein the allocation display format has an ingredient display area at a peripheral portion of the display screen on which the procedures are displayed, the ingredient display area being for displaying at least a part of the plurality of ingredients.

19. The cooking-recipe display system according to claim 1, wherein the allocation display format has an extension display area at a peripheral portion of the display screen on which the procedures are displayed, the extension display area being for displaying a quantity of the ingredients of the one cooking recipe.

20. The cooking-recipe display system according to claim 1, wherein the allocation display format has both a link-destination guide display area at an upper portion of the display screen, the link-destination guide display area being for displaying at least a part of the plurality of ingredients, and a procedure return button for returning an original procedure.

21. An information terminal, comprising:
a display screen;
a controller configured to:
control a determination part configured to determine an allocation display format indicating an arrangement, on the display screen, of a plurality of procedures and ingredients contained in one cooking recipe, wherein the one cooking recipe is selected from a plurality of cooking recipes each of which contains both a plurality of procedures indicating a way of cooking a dish and a plurality of ingredients of the dish, the allocation display format specifies a display restriction table containing display restriction information restricting an expression, on the display screen, concerning each of the plurality of procedures and ingredients; and
cause the one cooking recipe to be displayed on the display screen in the allocation display format.

22. A method of displaying a cooking recipe, the method comprising the steps of:
determining an allocation display format indicating an arrangement, on a display screen, of a plurality of procedures and ingredients contained in one cooking recipe, wherein the one cooking recipe is selected from a plurality of cooking recipes each of which contains both a plurality of procedures indicating a way of cooking a dish and a plurality of ingredients of the dish, the allocation display format specifies a display restriction table containing display restriction information restricting an expression, on the display screen, concerning each of the plurality of procedures and ingredients; and
causing the one cooking recipe to be displayed on the display screen of an information terminal in the allocation display format.

23. A program stored on a non-transitory medium configured to cause a computer to execute a method of displaying a cooking recipe as set forth in claim 22.

* * * * *